US012688265B2

(12) United States Patent
Milici et al.

(10) Patent No.: US 12,688,265 B2
(45) Date of Patent: Jul. 21, 2026

(54) ELECTRONIC VAPING DEVICES, CARTRIDGES, AND ACCESS CONTROL SYSTEMS

(71) Applicant: NJOY, LLC, Scottsdale, AZ (US)

(72) Inventors: Justin Milici, Baraboo, WI (US); Aj Hackert, Elkhart Lake, WI (US); Jose Bonet, Candler, NC (US); Jeremy Lincoln, Baraboo, WI (US); Dave Schuler, Scottsdale, AZ (US)

(73) Assignee: NJOY, LLC, Scottsdale, AZ (US)

( * ) Notice: Subject to any disclaimer, the term of this patent is extended or adjusted under 35 U.S.C. 154(b) by 7 days.

(21) Appl. No.: 18/588,408

(22) Filed: Feb. 27, 2024

(65) Prior Publication Data

US 2024/0289425 A1     Aug. 29, 2024

Related U.S. Application Data

(60) Provisional application No. 63/502,948, filed on May 18, 2023, provisional application No. 63/502,941, (Continued)

(51) Int. Cl.
*G06F 21/30*          (2013.01)
*A24F 40/42*          (2020.01)
(Continued)

(52) U.S. Cl.
CPC ............ *G06F 21/305* (2013.01); *A24F 40/42* (2020.01); *A24F 40/51* (2020.01); *A24F 40/53* (2020.01);
(Continued)

(58) Field of Classification Search
CPC ........ G06F 21/305; A24F 40/42; A24F 40/51; A24F 40/53; A24F 40/57; A24F 40/60; A24F 40/65
See application file for complete search history.

(56) References Cited

U.S. PATENT DOCUMENTS

2015/0181945 A1*   7/2015   Tremblay ................ A24F 40/65
                                                                      131/328
2016/0345628 A1    12/2016   Sabet
(Continued)

FOREIGN PATENT DOCUMENTS

EP            3 840 166 A1      6/2021
WO        2021/061360 A1      4/2021

OTHER PUBLICATIONS

International Search Report and Written Opinion dated Jul. 8, 2024 issued in International Application No. PCT/US2024/017429.
(Continued)

*Primary Examiner* — El Hadji M Sall
(74) *Attorney, Agent, or Firm* — Harness, Dickey & Pierce, P.L.C.

(57)          ABSTRACT
An e-vaping device includes wireless communications circuitry and processing circuitry coupled to the wireless communications circuitry The processing circuitry is configured to receive authorization information via wireless communications circuitry, the authorization information indicating whether the e-vaping device is authorized to activate a docked removable cartridge, and conditionally activate the docked removable cartridge based on the authorization information.

10 Claims, 45 Drawing Sheets

Related U.S. Application Data filed on May 18, 2023, provisional application No. 63/502,954, filed on May 18, 2023, provisional application No. 63/487,189, filed on Feb. 27, 2023, provisional application No. 63/487,112, filed on Feb. 27, 2023, provisional application No. 63/487,182, filed on Feb. 27, 2023, provisional application No. 63/487,204, filed on Feb. 27, 2023, provisional application No. 63/487,155, filed on Feb. 27, 2023, provisional application No. 63/487,125, filed on Feb. 27, 2023, provisional application No. 63/487,133, filed on Feb. 27, 2023, provisional application No. 63/487,199, filed on Feb. 27, 2023, provisional application No. 63/487,102, filed on Feb. 27, 2023.

(51) Int. Cl.
*A24F 40/51*      (2020.01)
*A24F 40/53*      (2020.01)
*A24F 40/57*      (2020.01)
*A24F 40/60*      (2020.01)
*A24F 40/65*      (2020.01)

(52) U.S. Cl.
CPC .............. *A24F 40/57* (2020.01); *A24F 40/60* (2020.01); *A24F 40/65* (2020.01)

(56) References Cited

U.S. PATENT DOCUMENTS

2022/0346458 A1   11/2022   Zominy
2022/0400775 A1* 12/2022   Adair ..................... A24F 40/65

OTHER PUBLICATIONS

International Preliminary Report on Patentability dated Aug. 28, 2025 issued in International Application No. PCT/US2024/017429.

* cited by examiner

2300

2305

3500

APPLY 1<sup>st</sup> AMT OF POWER TO A
HEATING ASSEMBLY
3503

CHANGE IN REQUESTED DRAW?
3505

NO

YES

ADJUST POWER APPLIED TO
HEATING ASSEMBLY BASED ON
CHANGE IN REQUESTED DRAW
3507

ADJUST AIR INTAKE BASED ON
CHANGE IN REQUESTED DRAW
3509

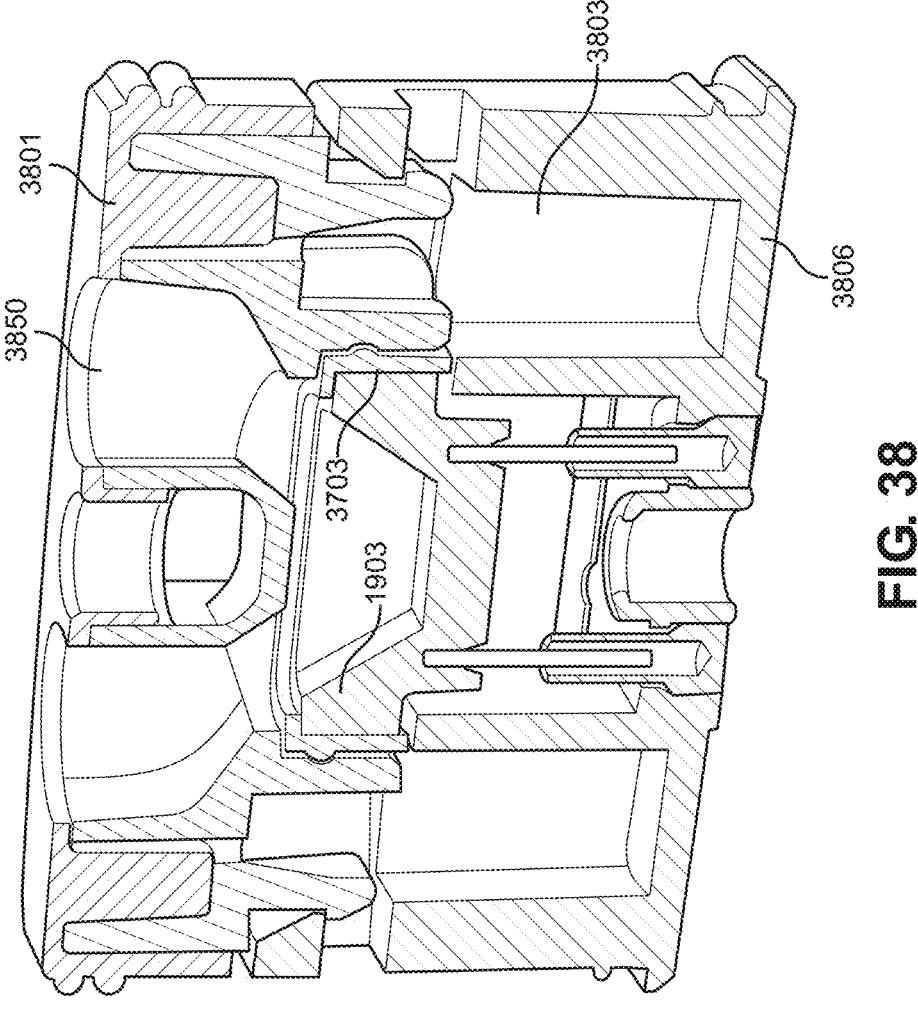
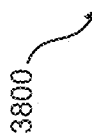
FIG. 38

ELECTRONIC VAPING DEVICES, CARTRIDGES, AND ACCESS CONTROL SYSTEMS

CROSS-REFERENCE TO RELATED APPLICATION

This application claims benefit under 35 U.S.C. 119(e) of the following prior-filed U.S. Provisional Applications, each of which is incorporated herein by reference in its entirety for all purposes: U.S. Provisional Application No. 63/487,102 entitled, "Device, Systems, And Methods For Bluetooth Enabled Electronic Cigarette," filed on Feb. 27, 2023; U.S. Provisional Application No. 63/487,112 entitled, "Mems Sensor Implementation In Ends Products," filed on Feb. 27, 2023; U.S. Provisional Application No. 63/487,125 entitled, "Novel Way Of Combining Multiple Functional Requirements Into A Single Component," filed on Feb. 27, 2023; U.S. Provisional Application No. 63/487,133 entitled, "Method For Controlling/Trapping E-Liquid In ENDS devices," filed on Feb. 27, 2023; U.S. Provisional Application No. 63/487,155 entitled, "Rigid-Flex PCBA Designed Simplified Assembly," filed on Feb. 27, 2023; U.S. Provisional Application No. 63/487,182 entitled, "Leadless Atomizer Technology," filed on Feb. 27, 2023; U.S. Provisional Application No. 63/487,189 entitled, "Alternate Ceramic Atomizer Technology," filed on Feb. 27, 2023; U.S. Provisional Application No. 63/487,199 entitled, "ENDS device Variable Flow And Power Delivery," filed on Feb. 27, 2023; U.S. Provisional Application No. 63/487,204 entitled, "Detecting Loss Of Liquid Flow During Use," filed on Feb. 27, 2023; U.S. Provisional Application No. 63/502,941 entitled, "Alternate Airpath And Liquid Trapping," filed on May 18, 2023; U.S. Provisional Application No. 63/502,948 entitled, "Plastic On Plastic Sealing Rib For Increased Manufacturability And Increased Quality," filed on May 18, 2023; and U.S. Provisional Application No. 63/502,954 entitled, "Pod ID Alternate Access Restriction Functionality," filed on May 18, 2023.

BACKGROUND

Field

The present disclosure relates to electronic vaping devices, cartridges, and/or access control systems for electronic vaping devices and cartridges.

Description of Related Art

An electronic vaping ("e-vaping") device generally includes an on-board power source, such as a battery, which is electrically connected to a heating element that converts a pre-vapor formulation stored in a cartridge to a vapor. The vapor exits the e-vaping device through a mouthpiece including at least one outlet. E-vaping devices are generally either disposable as a unit, in which case the pre-vapor formulation is housed in the disposable unit, or partially disposable, in which case a re-usable battery section can be attached to disposable cartridge housing the pre-vapor formulation.

SUMMARY

As used herein, unless otherwise required by context or explicitly noted, the term "e-vaping device" is used to refer to either a complete e-vaping device, or to a non-disposable portion of an e-vaping device. In contrast, the terms "cartridge," "removable cartridge," and similar terms are used to refer to a removable portion of an e-vaping device that stores a pre-vapor formulation, unless otherwise required by context or explicitly noted.

Various example embodiments of e-vaping devices disclosed herein include wirelessly-enabled e-vaping devices. Wirelessly enabled e-vaping devices can be used to institute and enforce access restrictions that limit the use of the e-vaping device to appropriate adult consumers. Operation of some such e-vaping devices can be fully or partially disabled subject to verification that the e-vaping device, including a docked removable cartridge is being used by an authorized adult consumer.

Various example embodiments disclosed herein provide a Bluetooth enabled e-vaping device that includes a replaceable, closed, non-refillable e-liquid cartridge, a battery power unit with Bluetooth® or other wireless technology, referred to herein as a wireless e-vaping device, a smartphone application, and a backend server that operates in conjunction with the smartphone application and the wireless e-vaping device to prevent improper use of the wireless e-vaping devices and cartridges docked to the wireless e-vaping device. An example embodiment of a wireless e-vaping device includes device access restriction features that may be implemented using Bluetooth® Low Energy technology (BLE), a specialized smartphone application, and a cloud-based, backend application server, sometimes referred to herein as an Server).

According to some example embodiments, the backend application server implementing adult consumer-account procedures can be used in conjunction with wirelessly-enabled e-vaping devices and the smartphone application to assist in preventing the use of counterfeit removable cartridges, sharing of removable cartridges with inappropriate adult consumers, and other misuses of the wireless e-vaping device.

In an example embodiment, an e-vaping device includes wireless communications circuitry, processing circuitry coupled to the wireless communications circuitry, and memory coupled to the processing circuitry, and wireless communications circuitry coupled to the memory. wherein the processing circuitry is configured to receive authorization information via wireless communications circuitry, wherein the authorization information indicates whether the e-vaping device is authorized to activate a docked removable cartridge, and conditionally activate the docked removable cartridge based on the authorization information.

In an example embodiment, the authorization information includes an approved list indicating one or more onboard cartridge identifiers associated with one or more authorized removable cartridges. The processing circuitry is further configured to store the authorization information in the memory, and to conditionally activate a docked removable cartridge based on the authorization information stored in the memory. In some example embodiments, the authorization information further includes an authorization time limit associated with the one or more authorized removable cartridges.

In various example embodiments, the processing circuitry is further configured to obtain an onboard cartridge identifier of the docked removable cartridge from the docked removable cartridge. The processing circuitry may permit power to be delivered to the docked removable cartridge in response to determining that the onboard cartridge identifier of the docked removable cartridge is included in the approved list, and/or prevent power from being applied to the docked removable cartridge in response to determining that the onboard cartridge identifier of the docked removable cartridge is not included in the approved list.

In some example embodiments, the processing circuitry obtains updated authorization information, via the wireless communications circuitry, in response to determining that the onboard cartridge identifier of the docked removable cartridge is not included in the approved list, and the processing circuitry conditionally permits power to be applied to the docked removable cartridge based on the updated authorization information.

In various example embodiments, the processing circuitry in the e-vaping device is further configured to receive the authorization information via the wireless communications circuitry and from an adult consumer mobile device connected to a server device hosting an account associated with an authenticated adult consumer of the e-vaping device. The authorization information is generated by the server device based on one or more scanned product identification codes linked to the one or more onboard cartridge identifiers. The authorization information may be received via a personal area network In example embodiments, the processing circuitry is further configured to control a feedback element, the feedback element providing at least one of a tactile, auditory, or visual indication indicating an activation status of the docked removable cartridge.

In some example embodiments, the processing circuitry is further configured to determine whether to activate a docked removable cartridge in response to each docking event.

In example embodiments, the processing circuitry is further configured to obtain, via a removable cartridge identification interface an onboard cartridge identifier of the docked removable cartridge. The identification interface may include a radio frequency identification chip, a near-field communication chip, and/or a contact reader.

In various example embodiments, a removable e-vaping cartridge includes an external surface including an indelible scan code thereon, and an internal onboard identifier, wherein the onboard identifier is readable by an e-vaping device while the removable e-vaping cartridge is docked to the e-vaping device.

In some example embodiments, the removable e-vaping cartridge includes at least one of a radio frequency identification chip (RFID), a near-field communication chip, memory and/or other circuitry configured to configured to store the onboard identifier. In some such example embodiments, the onboard identifier may be obtained wirelessly, or read by a contact reader included in the e-vaping device.

In at least one example embodiments, an e-vaping device includes wireless communications circuitry, processing circuitry coupled to the wireless communications circuitry and configured to power-up in a locked state, wherein in the locked state the processing circuitry prevents power from being delivered to a heating assembly, memory coupled to the processing circuitry, and wherein the processing circuitry is configured to receive, via the wireless communications circuitry, authorization to unlock via a communication network, and to enter an unlocked state in response to the authorization to unlock, wherein in the unlocked state the processing circuitry permits power to be delivered to the heating assembly. In some example embodiments, the authorization to unlock is received from a computing device wirelessly coupled to the e-vaping device via the wireless communications circuitry.

In various example embodiments, the processing circuitry, the memory, and the wireless communications circuitry are included in a microcontroller. The memory may be configured to store firmware which, when executed by the microcontroller causes the microcontroller to determine whether to permit power to be applied to a docked, removable e-vaping cartridge based, at least in part, on the authorization to unlock.

In example embodiments, the e-vaping device includes an airflow sensor coupled to the processing circuitry, and in the unlocked state the processing circuitry is configured to apply power to the heating assembly based on an output of the airflow sensor, and may stop applying power to the heating assembly if the output of the airflow sensor remains active for longer than threshold duration.

In some or all of the above example embodiments, the e-vaping device includes an LED coupled to the processing circuitry, and the processing circuitry is configured to at least temporarily illuminate the LED in response to entering the unlocked state.

A method according to various example embodiments includes receiving, at a server device, a scan code associated with an onboard identifier of a removable e-vaping cartridge; transmitting the onboard identifier to an e-vaping device via an application being executed on an adult consumer computing device, wherein transmitting the onboard identifier associated with the removable e-vaping cartridge indicates that the removable e-vaping cartridge is authorized for use with the e-vaping device.

According to some embodiments the method also includes storing, in a database accessible to the server device, information linking a plurality of internal onboard identifiers associated with a plurality of scan codes, wherein the plurality of internal onboard identifiers are associated with given removable e-vaping cartridges of a plurality of removable e-vaping cartridges, and given scan codes of the plurality of scan codes are associated with the given removable e-vaping cartridges of the plurality of removable e-vaping cartridges.

An example embodiment also includes establishing, by the server device, an adult consumer account of an adult e-vaping consumer, wherein the adult consumer account is associated with one or more e-vaping devices.

Other example embodiments of the method also include registering one or more onboard identifiers of the plurality of internal onboard identifiers with the adult consumer account of the adult e-vaping consumer based on one or more received scan codes; and transmitting the one or more onboard identifiers to the one or more e-vaping devices associated with the adult consumer account of the adult e-vaping consumer via the application being executed on the adult consumer computing device.

In some example embodiments, transmitting the onboard identifier to the e-vaping device includes transmitting the onboard identifier to the application being executed on the adult consumer computing device, wherein the adult consumer computing device forwards the onboard identifier to the e-vaping device via a personal area network.

Other example embodiments include a method comprising receiving, at an adult consumer computing device, authorization information from a server device, wherein the authorization information includes an approved list indicating one or more onboard cartridge identifiers associated with one or more authorized removable e-vaping cartridges; and transmitting, from the adult consumer computing device, the authorization information to an e-vaping device via a personal area network, wherein the e-vaping device controls activation of a docked removable e-vaping cartridge based on the authorization information.

In some example embodiments, the adult consumer computing device scans a scan code present on a removable e-vaping cartridge, and connects the scan code to an adult consumer account. The adult consumer computing device transmits the scan code to the server device, wherein the server devices stores information linking the scan code to an internal onboard identifier associated with the removable e-vaping cartridge, and wherein the server device registers the internal onboard identifier with the adult consumer account. The adult consumer computing device receives the authorization information from the server device.

A method according to various example embodiments includes receiving, at the adult consumer computing device from the e-vaping device, an indication that an internal onboard identifier associated with the removable e-vaping cartridge is not stored in a memory of the e-vaping device; and in response to receiving the indication, transmitting a request to the server device for updated authorization information.

Some example embodiments include a server device comprising a processor, memory coupled to the processor, and a program of computer executable instructions stored in the memory and configured to cause the processor to store adult consumer account information, wherein the adult consumer account information includes information associating removable e-vaping cartridges with adult consumer accounts, and prevent use of removable e-vaping cartridges by unauthorized adult consumers based on the adult consumer account information.

In various example embodiments the program of computer executable instructions is further configured to cause the processor to determine whether a number of removable e-vaping cartridges authorized on an adult consumer account exceeds a threshold value, and suspend or remove authorization of previously authorized removable e-vaping cartridges in response to the number of removable e-vaping cartridges authorized on the adult consumer account exceeding the threshold value.

In other example embodiments the program of computer executable instructions is further configured to cause the processor to determine whether a number of removable e-vaping cartridges authorized on an adult consumer account within a given time period exceeds a threshold value, and suspend or remove authorization of previously authorized removable e-vaping cartridges in response to the number of removable e-vaping cartridges authorized on the adult consumer account within a given time period exceeding a threshold value.

Various example embodiments include a program of computer executable instructions configured to cause the processor to determine that a removable e-vaping cartridge is counterfeit based on the adult consumer account information.

According to various example embodiments, an e-vaping device includes a micro-electromechanical system (MEMS) sensor that is protected from fluids by placing the sensor at one end of an e-liquid trap and an negative pressure port at the other end of the e-liquid trap.

In some example embodiments, an e-vaping device includes a battery housing assembly including a cartridge-engagement portion, wherein the cartridge engagement portion includes a cartridge-facing side configured to mate with a removable cartridge, an internal side opposite the cartridge-facing side, wherein the internal side includes an elongated liquid trap having a first end and a second end, wherein the second end is distal to the first end, a negative pressure port including a first opening on the cartridge-facing side and a second opening on the internal side, wherein the second opening is located within the elongated e-liquid trap and proximate to the first end of the liquid trap, and a micro-electromechanical system (MEMS) sensor including a sensor diaphragm, wherein the sensor diaphragm is positioned proximate to, and in fluid communication with, the second end of the liquid trap.

In an example embodiment, an e-vaping device also includes a printed circuit board assembly mounted to the cartridge-engagement portion of the battery housing assembly, wherein the printed circuit board includes a front side facing the cartridge-engagement portion and a back side opposite the front side, the printed circuit board having an opening formed therein, and the MEMS sensor mounted to the back side of the printed circuit board with the sensor diaphragm positioned over the opening formed in the printed circuit board.

In some example embodiments, the e-vaping device includes snap locks molded on the cartridge engagement portion of the battery housing assembly, wherein the snap locks hold the printed circuit board assembly in a fixed position relative the cartridge engagement portion of the battery housing assembly.

In some example embodiments, an e-vaping device includes a seal with capillary channels that wick fluid entering an air sensor path away from a MEMS sensor. The capillary channels can be expelled from the e-vaping by the adult consumer of the e-vaping device blowing into the same airpath used to the deliver vapor to the adult e-vaping consumer.

In some example embodiments an e-vaping device seal includes a system of capillary channels in fluid communication with an air sensor path, wherein the capillary channels are configured to wick fluid entering the air sensor path away from a diaphragm of an air sensor; and a molded reed valve coupled to the capillary channels and configured to open a fluid expulsion path in response to an adult consumer blowing into the e-vaping device.

In various example embodiments, a rigid-flex printed circuit board assembly (PCBA) is used to allow electronic circuitry, sensors, microcontrollers, processors, and other components, to be positioned within the e-vaping device in a manner that helps reduce a size of the e-vaping device, and improve safe and efficient operation of the e-vaping device. For example, a rigid-flex circuit board can be used to position a MEMS sensor nearer to a removable cartridge without requiring external wires that would need to be run across a battery compartment, where they could be subjected to potential abrasion.

In one or more example embodiments, an e-vaping device includes a battery housing assembly including a cartridge-facing end, an opposing end opposite the cartridge-facing end, and at least one side, wherein the cartridge-facing end, the opposing end, and the at least one side form an opening defining a battery chamber; and a rigid-flex circuit board including a first rigid circuit board portion connected to a second rigid circuit board by a flexible circuit board portion, wherein the first rigid circuit board portion is fastened to the cartridge-facing end of the battery housing assembly, the second rigid circuit board portion is fastened to the opposing end of the battery housing assembly, and the flexible circuit board portion spans the battery chamber.

In some example embodiments, an e-vaping device can include a leadless heating assembly. Conventional heating assemblies, sometimes referred to as atomizers, have thin wired leads that protrude from the atomizer face. These leads are difficult to align and crimp, and may cause stress risers within the heating assembly that can cause issues during manufacturing. By removing the leads from the atomizer design, the manufacturability of the design, as well as its robustness, are increased.

In example embodiments, a heating assembly for an e-vaping device includes a porous body including a first surface and a second surface, wherein the first surface is configured to contact a pre-vapor formulation and provide constrained fluid flow of the pre-vapor formulation through the porous body to the second surface. The e-vaping device also includes a heating element joined to the second surface of the porous body and configured to vaporize a portion of the pre-vapor formulation reaching the second surface, wherein the heating element includes leadless electrical contact portions configured to directly engage external power contacts.

In various example embodiments, the leadless electrical contact portions are flush with the second surface. In other example embodiments the leadless electrical contact portions are recessed in the second surface. In yet further example embodiments, the leadless electrical contact portions protrude from the second surface.

In example embodiments, an e-vaping cartridge includes a heating assembly configured to heat a pre-vapor formulation to generate a vapor, wherein the heating assembly includes a porous body including a first surface and a second surface, and wherein the first surface is configured to contact a pre-vapor formulation and provide constrained fluid flow of the pre-vapor formulation through the porous body to the second surface. The heating assembly further includes a heating element joined to the second surface and configured to vaporize a portion of the pre-vapor formulation reaching the second surface, wherein the heating element includes leadless electrical contact portions configured to directly engage external power contacts. The e-vaping device further includes a cartridge housing configured to hold the heating assembly in a position where the first surface is in fluid contact with a liquid chamber configured to store the pre-vapor formulation and the second surface is in fluid communication with an airpath configured to deliver vapor to an adult end consumer.

In some example embodiments, the cartridge housing includes channels configured to guide pogo pins external to the e-vaping cartridge into direct engagement with the leadless electrical contact portions of the heating element.

In other example embodiments, the cartridge housing includes first pogo pins internal to the e-vaping cartridge and configured to form an electrical connection with second pogo pins external to the e-vaping cartridge, wherein the first pogo pins directly engage the leadless electrical contact portions of the heating element.

In yet further example embodiments, the cartridge housing includes spring contacts configured to directly engage the leadless electrical contact portions of the heating element. In some such example embodiments the spring contacts include cantilevered spring contacts.

Other example embodiments of an e-vaping device include a cylindrical ceramic heating assembly/atomizer that includes a nichrome wire wrapped around the exterior circumference of the heating assembly. In some example embodiments, e-liquid may flow freely through the inside diameter of the ceramic cylinder, allowing for increased surface area for atomization/vaporization as compared to other heating assemblies.

In various example embodiments, a heating assembly for an e-vaping device includes a porous solid body in the shape of a hollow cylinder with open ends, wherein an interior wall of the hollow cylinder is configured to define a portion of a fluid path between two portions of a divided fluid reservoir holding a pre-vapor formulation, and wherein the porous solid body provides constrained fluid flow between the interior wall of the hollow cylinder an exterior wall of the hollow cylinder. The e-vaping device also includes a heating element in contact with the exterior wall of the hollow cylinder and configured to vaporize a portion of the pre-vapor formulation reaching the exterior wall.

In some example embodiments, the heating element includes a conductor wrapped about an exterior circumference of the hollow cylinder. In other example embodiments, the heating element includes a conductor formed on the exterior wall of the hollow cylinder. In further example embodiments, the heating element includes leadless electrical contact portions configured to directly engage external power contacts.

In various example embodiments an e-vaping cartridge includes a divided liquid reservoir configured to hold a pre-vapor formulation, wherein the divided liquid reservoir includes a first reservoir portion, a second reservoir portion separate from the first reservoir portion, and a fluid connection path between the first reservoir portion and a second reservoir portion. The e-vaping cartridge also includes an air pathway intersecting the fluid connection path, and a heating assembly that includes a porous solid body in the shape of a hollow cylinder with open ends, wherein the heating assembly is positioned at the intersection of the air pathway and the fluid connection path such that an interior wall of the hollow cylinder defines a closed fluid passage substantially isolating the fluid connection path from the air pathway, except for constrained fluid flow between the interior wall of the hollow cylinder and an exterior wall of the hollow cylinder. The heating assembly includes a heating element in contact with the exterior wall of the hollow cylinder and configured to vaporize a portion of the pre-vapor formulation reaching the exterior wall.

In some example embodiments, the e-vaping cartridge includes a cradle formed at the intersection of the air pathway and the fluid connection path, wherein the cradle is shaped to securely hold the heating assembly in position.

In some example embodiments, an e-vaping device includes an intake port that changes its shape based on an adult consumers' requested airflow. As the adult consumer pulls harder on a device, thereby generating increased negative pressure, the intake port deforms to allow increased airflow. An airflow sensor is used to sense the increased airflow, and power output to one or more heating elements is adjusted accordingly. In this way, when an adult consumer pulls harder on the device, i.e. requests additional airflow, the airflow increases, and the increased power to the heating element(s) increases the total particulate matter (TPM) more closely mimicking a combustible cigarette experience.

Methods according to various example embodiments include detecting, using an airflow sensor, changes in requested airflow by an adult consumer of an e-vaping device, and controlling a heating assembly to generate varying amounts of an inhalable dispersion based on the changes in the requested airflow, wherein the heating assembly is configured to generate the inhalable dispersion by heating a consumable.

In some example embodiments, controlling a heating assembly to generate varying amounts of an inhalable dispersion includes adjusting an amount of power provided to a heating element of the heating assembly based on the changes in the requested airflow. In other example embodiments, controlling a heating assembly to generate varying amounts of an inhalable dispersion includes varying a duty cycle of a power supply providing power to the heating element. In yet other example embodiments, controlling a heating assembly to generate varying amounts of an inhalable dispersion includes providing power to a varying number of heating elements included in the heating assembly based on the changes in the requested airflow.

In various example embodiments, in conjunction with controlling the heating assembly, methods also controlling an amount of airflow using a deformable membrane of an intake port. Some example embodiments also include controlling a draw resistance using the deformable membrane. In one or more example embodiments, the deformable membrane is configured to begin deforming at a given negative pressure.

In various example embodiments, an e-vaping device includes an intake port with a deformable membrane configured to control an amount of airflow in response to requested airflow by an adult consumer, an airflow sensor configured to generate an output indicating a detected change in the amount of airflow, a heating assembly configured to heat a consumable to generate an inhalable dispersion, wherein an amount of the inhalable dispersion generated by the heating assembly varies with an amount of power supplied to the heating assembly, and processing circuitry configured to receive the output of the airflow sensor, and control a heating assembly to generate varying amounts of an inhalable dispersion based on the output of the airflow sensor.

In some example embodiments, the processing circuitry is configured to control the heating assembly to generate varying amounts of an inhalable dispersion by adjusting an amount of power provided to a heating element of the heating assembly, by varying a duty cycle of a power supply providing power to the heating element, and/or by providing power to a varying number of heating elements included in the heating assembly.

In other example embodiments, an e-vaping device includes circuitry to monitor a resistance, a rate of change of resistance, or another resistance characteristic of a heating assembly, and deenergize the heating assembly if the resistance characteristic exceeds a threshold. In at least some example embodiments, a low liquid level is inferred from the resistance characteristic, and a low-liquid notification is presented to an adult consumer of the e-vaping device.

In various example embodiments, a method of operating an e-vaping device includes generating an inhalable dispersion by energizing a heating element configured to heat a pre-vapor formulation, determining that an amount of the pre-vapor formulation reaching the heating element is low based on a resistance characteristic of the heating element during a time the heating element is activated, and deenergizing the heating element in response to the resistance characteristic exceeding a threshold. In some example embodiments, the method also includes presenting a notification to an adult consumer of the e-vaping device in response to the resistance characteristic exceeding the threshold.

A method according to some example embodiments includes updating the threshold each time the heating element is energized. In various example embodiments, the threshold indicates that a resistance of the heating element exceeds a resistance threshold, and/or that a rate of change of the measured resistance of the heating element exceeds a rate-of-change threshold.

In some example embodiments, the method includes measuring the rate of change of the measured resistance during an initial energized period, and setting the threshold based on the rate of change of the measured resistance during the initial energized period. In various example embodiments, the threshold is empirically derived based on data generated using temperature reactive heating elements.

In various example embodiments, an e-vaping device includes a heating element configured to generate an inhalable dispersion by heating a pre-vapor formulation, and a microcontroller coupled to the heating element. The microcontroller is programmed to energize the heating element, determine that an amount of the pre-vapor formulation reaching the heating element is low based on a resistance characteristic of the heating element during a time the heating element is activated, and deenergize the heating element in response to the resistance characteristic exceeding a threshold.

In various example embodiments, the microcontroller is further programmed to generate a notification signal indicating that the pre-vapor formulation is below the threshold level. In some example embodiments, the microcontroller is further programmed to transmit the notification signal to at least one of a transducer configured to generate vibrations, a speaker configured to generate an auditory alarm, or an onboard wireless interface configured to transmit a wireless notification to a companion mobile device app.

In various example embodiments, the microcontroller is further programmed to update the threshold each time the heating element is energized. In some example embodiments, the threshold indicates that a resistance of the heating element exceeds a resistance threshold, or that a rate of change of the resistance of the heating element exceeds a rate-of-change threshold.

In some example embodiments, the microcontroller is further programmed to measure the rate of change of the resistance during an initial energized period, and set the threshold based on the rate of change of the measured resistance during the initial energized period.

In an example embodiment, the microcontroller includes an analog to digital converter capable of sampling at a rate sufficient to allow measurement of resistance changes at least as small as 6 milliohms (mΩ).

In some example embodiments, a liquid pre-vapor formulation is stored in a reservoir, or tank, of a removable cartridge. As the pre-vapor formulation is consumed, the pressure in the tank may decrease, which can adversely impact the flow of the pre-vapor formulation. In some such example embodiments, a tank seal functions as a check valve between a liquid trap maintained at ambient atmospheric pressure and the tank. When the pressure in the tank drops, the check valve allows the tank pressure and the pressure in the liquid trap to equalize.

In various example embodiments, an e-vaping cartridge includes a tank configured to hold a pre-vapor formulation in a liquid state; a liquid trap including at least one first opening in fluid communication with ambient atmospheric pressure and a second opening in fluid communication with the tank; and a tank seal including a flexible portion extending over and covering the second opening of the liquid trap, wherein the flexible portion functions as a check valve by isolating the liquid trap from the tank when a first pressure in the tank exceeds a second pressure in the liquid trap, and allowing air to flow from the liquid trap into the tank when the second pressure in the liquid trap exceeds the first pressure in the tank.

Example embodiments of the e-vaping also include a heating assembly seal, wherein the heating assembly seal cooperates with molded portions of the e-vaping cartridge to isolate the liquid trap from a vapor path within the e-vaping cartridge.

In some example embodiments, the e-vaping cartridge includes a plurality of liquid traps, each liquid trap including a second opening in fluid communication with a different portion of the tank. The tank seal includes a plurality of flexible portions, wherein each of the plurality of flexible portions extends over and covers a second opening of a given liquid trap.

Any or all of the above example embodiments can be combined in various combinations to create an improved e-vaping device. For example, a wirelessly-enabled e-vaping device, or a removable cartridge for use with the wirelessly-enabled e-vaping device, can be implemented to use different combinations of control circuitry, liquid/fluid traps, seals, and/or heating assemblies disclosed herein.

Various example embodiments disclosed herein provide a Bluetooth enabled e-vaping device that includes a replaceable, closed, non-refillable e-liquid cartridge, a battery power unit with Bluetooth® technology, referred to herein as a wireless e-vaping device, a smartphone APP, and a backend server that operates in conjunction with the smartphone application and the wireless e-vaping device to prevent improper use of e-vaping devices and/or cartridges. An example embodiment of a wireless e-vaping device includes device access restriction features that may be implemented using Bluetooth® Low Energy technology (BLE), a specialized smartphone application, and a cloud-based, backend application server (Server).

BRIEF DESCRIPTION OF THE DRAWINGS

The various features and advantages of the non-limiting embodiments herein may become more apparent upon review of the detailed description in conjunction with the accompanying drawings. The accompanying drawings are provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 23 is a side view of a disposable e-vaping device, in accordance with various example embodiments;

FIG. 38 is a section view illustrating liquid traps and a tank seal, in accordance with various example embodiments;

DETAILED DESCRIPTION OF EXAMPLE EMBODIMENTS

Various example embodiments discussed herein include an e-vaping device, sometimes referred to herein as an e-vaping device that includes wireless communication functionality. In some embodiments, the wireless communication functionality includes the ability to communicate with an external computing device via a personal area network (PAN), such as a Bluetooth® personal area network. Personal area networks (PANs), as that term is used herein, are generally characterized by device pairing, communication over shorter distances than local area networks (LANs), and relatively low power usage as compared to other network types. However, although various example embodiments disclosed herein employ PANs, other types of wireless networks can be used in some or all of those example embodiments.

In example embodiments, features of e-vaping devices and a corresponding e-vaping control system may include, but are not limited to: encrypted data communication between an application a server and/or between the application and/or a e-vaping device; third-party age/identity verification; shipping e-vaping devices and/or removable cartridges in a locked state and preventing adult consumers from using the e-vaping devices and/or removable cartridges without prior authentication/authorization; anti-backwards compatibility features limiting the use of particular types of removable e-vaping cartridges with particular types of e-vaping devices; and anti-counterfeiting features.

Various example embodiments herein disclose e-vaping devices, disposable e-vaping devices, reusable e-vaping devices, e-vaping cartridges, removable e-vaping cartridges. The term e-vaping device includes both disposable e-vaping devices, reusable e-vaping devices with a docked removable e-vaping cartridge, and a reusable e-vaping device without a docked removable e-vaping cartridge. In various example embodiments, disposable e-vaping devices include an integrated cartridge, or other consumable, in addition to a battery, power control/processing circuitry and/or wireless communication circuitry. Removable e-vaping cartridges and integrated e-vaping cartridges do not, in various example embodiments, include power control/processing circuitry and/or wireless communication circuitry.

Figure 1:
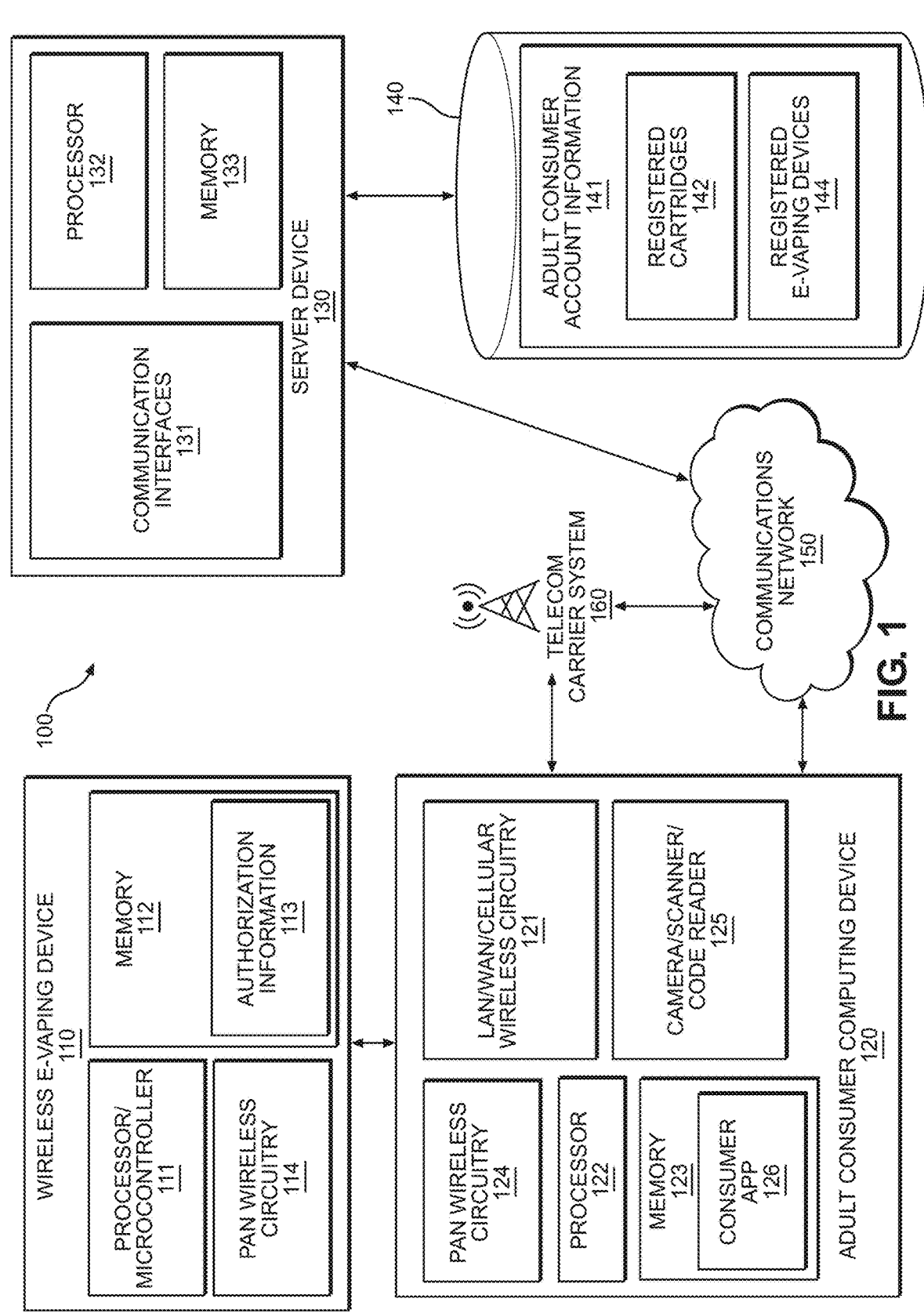
FIG. 1 is a block diagram illustrating an e-vaping device access and control system in accordance with various example embodiments.

Referring now to FIG. 1, an e-vaping device access and control (EDAC) system 100 will be discussed in accordance with various example embodiments. EDAC system 100 includes wireless e-vaping device 110, which further includes processor/microcontroller 111, memory 112 storing authorization information 113, and personal area network (PAN) wireless circuitry 114; Adult Consumer Computing Device 120, which further includes PAN wireless circuitry 124, LAN/WAN/Cellular wireless circuitry 121, processor 122, memory 123 storing adult consumer Application 126, and camera/scanner/code reader 125; and Server Device 130, which further includes communication interfaces 131, processor 132, and memory 133, database 140, communications network 150, and Telecom Carrier System 160.

In an example embodiment, Wireless e-vaping device 110 may be a disposable e-vaping device that includes a non-adult consumer replaceable consumable, or a re-usable e-vaping device configured to operate with an adult consumer-replaceable consumable, such as a replaceable cartridge including a pre-vapor formulation. In various example embodiments, Wireless e-vaping device 110 communicates with Adult Consumer Computing Device 120 PAN, such as a Bluetooth® network, to request authorization information, provide activation status information, provide information identifying Wireless e-vaping device 110 to Adult Consumer Computing Device 120, or the like. Note that although the example embodiments focus on wirelessly enabled e-vaping devices, e-vaping devices capable of communicating with computers using wired connections, e.g. via a universal serial bus (USB) connection, also fall within the scope of the present example embodiments.

The present example assumes that an adult e-vaping consumer has previously installed adult consumer Application 126 on Adult Consumer Computing Device 120, and established an authorized account on server device 130. In this example embodiment, upon an initial use of Wireless e-vaping device 110, Wireless e-vaping device 110 may initiate a pairing process with Adult Consumer Computing Device 120. Once paired, Wireless e-vaping device 110 may transmit e-vaping device identifying information to Adult Consumer Computing Device 120, where adult consumer Application 126 may use the device identifying information to associate Wireless e-vaping device 110 with the previously established authorized account, and transmit the identifying information and account information to Server Device 130. In some example embodiments associations take place at the server based on account information and device identifying information transmitted by adult consumer Application 126.

In some example embodiments, if adult consumer Application 126 receives from Server Device 130 approval for the registration of Wireless e-vaping device 110, adult consumer Application 126 will permit Wireless e-vaping device 110 to exchange further information with adult consumer Application 126. Otherwise, adult consumer Application 126 may terminate communication between Wireless e-vaping device 110 Adult Consumer Computing Device 120. In some example embodiments, adult consumer Application 126 may transmit a message causing Wireless e-vaping device 110 to display an error message, prior to terminating communication. In some example embodiments, a "failed authorization counter" on Wireless e-vaping device 110, in adult consumer Application 126, or at Server Device 130 can be incremented. After a threshold number of failed authorization attempts, the Wireless e-vaping device 110 may be disabled, either permanently or temporarily. In other example embodiments, a "failed authorization timer" on Wireless e-vaping device 110, in adult consumer Application 126, or at Server Device 130 can be incremented to prevent additional authorization attempts for a given period of time. In some example embodiments, a failed authorization counter and time can be used in conjunction with each other.

Continuing with the above example, after Wireless e-vaping device 110 is registered, Wireless e-vaping device 110 may send a request for authorization information to Adult Consumer Computing Device 120. In alternative example embodiments, the authorization information is pushed to the Wireless e-vaping device 110 as part of the initial registration process for Wireless e-vaping device 110. In some example embodiments, Wireless e-vaping device 110 transmits a request to Adult Consumer Computing Device 120 for authorization information each time a removeable/replaceable e-vaping cartridge is docked to Wireless e-vaping device 110.

In various example embodiments, Wireless e-vaping device 110 stores received Authorization Information 113 in memory 112. In response to a removeable/replaceable e-vaping cartridge being docked to Wireless e-vaping device 110, Wireless e-vaping device 110 verifies that an onboard cartridge identifier included in the docked e-vaping cartridge is included in a list of approved e-vaping cartridges in the authorization information. If the onboard cartridge identifier matches a cartridge identifier included in the authorization information, then the Wireless e-vaping device 110 may activate the docked e-vaping cartridge, otherwise, the docked e-vaping cartridge is not activated. In some example embodiments, if the authorization information changes, a currently activated e-vaping cartridge may be deactivated.

In various example embodiments, Adult Consumer Computing Device 120 may be, but is not limited to, a smartphone, tablet, laptop, desktop, wearable, or other computing device capable of executing adult consumer Application 126 and communicating with Wireless e-vaping device 110. As discussed above, Adult Consumer Computing Device 120 may transmit authorization information obtained from Server Device 130 to Wireless e-vaping device 110 for use by Wireless e-vaping device 110 in controlling operation and access to Wireless e-vaping device 110 and activation of e-vaping cartridges docked to Wireless e-vaping device 110.

In various example embodiments, Adult Consumer Computing Device 120 uses camera/scanner/code reader 125 to collect identifying information associated with Wireless e-vaping device 110, e-vaping cartridges, or both. This identifying information is transmitted to Server Device 130, using adult consumer Application 126, and Server Device 130 generates the authorization information based on the identifying information collected by Adult Consumer Computing Device 120. For example, upon purchasing an e-vaping cartridge, an adult e-vaping adult consumer may scan a computer readable code, such as a bar code or quick response (QR) code indelibly marked on the e-vaping cartridge, or included on or with packaging of the e-vaping cartridge.

In at least one example embodiment, the computer readable code identifies the e-vaping cartridge, but does not match an onboard identifier included in an inaccessible portion of the e-vaping cartridge, such as a memory onboard the e-vaping cartridge. In some example embodiments, information linking the QR code indelibly marked on an externally viewable surface of the e-vaping cartridge to the internal, onboard identifier of the e-vaping cartridge is recorded during manufacture of the e-vaping cartridge, and the linking information is stored in memory 133 of Server Device 130. Server Device 130 uses information from the scanned QR code, as provided by the adult consumer Application 126 and Adult Consumer Computing Device 120, to generate the authorization information delivered to the Wireless e-vaping device 110.

In various example embodiments, Adult Consumer Computing Device 120 communicates with Server Device 130 via one or more of Telecom Carrier System 160 and Communications Network 150. Communications between Adult Consumer Computing Device 120 can be initiated by Server Device 130 or by Adult Consumer Computing Device 120. For example, Adult Consumer Computing Device 120 may transmit to Server Device 130 a request for authorization information or a request to register an e-vaping device. Additionally or alternatively, Server Device 130 may perform scheduled push transmissions of authorization information to Adult Consumer Computing Device 120, Server Device 130 may push authorization information in response to a triggering event, such as a change in the authorization information, or Server Device 130 may transmit to Adult Consumer Computing Device 120 a request to establish communication.

The authorization information transmitted from Server Device 130 to Adult Consumer Computing Device 120 may include the most current cartridge authorization information. In some example embodiments, adult consumer Application 126 stores authorization information in either an encrypted or unencrypted form, so that during periods when Adult Consumer Computing Device 120 does not have network connectivity, adult consumer Application 126 may transmit authorization information to Wireless e-vaping device 110. In at least one example embodiment, any time the Server Device 130 generates updated authorization information for an account associated with an adult e-vaping consumer, the updated authorization information is pushed to adult consumer Application 126. In some example embodiments, updated authorization information is transmitted from Server Device 130 to Adult Consumer Computing Device 120 in response to a request from adult consumer Application 126, or in response to Server Device 130 receiving scanned QR code information impacting the account of an adult e-vaping consumer.

In an example embodiment, Server Device 130 receives association information linking a computer readable code indelibly marked on an external surface of a removable e-vaping cartridge with an onboard identifier included in a corresponding removable e-vaping cartridge. In at least one example embodiment, without the association information, the onboard identifier of the e-vaping cartridge cannot be determined solely from the computer readable code on the external surface of a removable e-vaping cartridge. In at least one example embodiment, when an e-vaping cartridge is manufactured, the association information for that e-vaping cartridge is provided to Server Device 130.

In various example embodiments, Server Device 130 receives information from a scanned computer readable code of a removable e-vaping cartridge. The information from the scanned computer readable code is received from adult consumer Application 126 running on Adult Consumer Computing Device 120. In various example embodiments, adult consumer Application 126 provides the information from the scanned computer readable code to Server Device 130 only if an adult e-vaping consumer with an established adult consumer account is logged into adult consumer Application 126. In this way, adult consumer Application 126 is able to provide Server Device 130 with enough information for Server Device 130 to be able to associate the information from the scanned computer readable code with the proper account. In various example embodiments, Server Device 130 may receive an explicit account identifier, or infer the account identifier from other data provided, such as a token, an identifier of Adult Consumer Computing Device 120, or information obtained when a communication session was established between Adult Consumer Computing Device 120 and Server Device 130.

In an example embodiment, Server Device 130 determines the onboard identifier of the removable e-vaping cartridge based on the association information, generates the authorization information to include the onboard identifier of the removable e-vaping cartridge, and stores the authorization information in Database 140 with other adult consumer account information 141 of the adult e-vaping consumer. The authorization information may include, but is not limited to, Registered Cartridge Information 142, and Registered e-vaping devices Information 144. Registered Cartridge Information 142, may include, but is not limited to, cartridge QR code information, cartridge onboard identifiers, association information, registration dates/times, activation dates/times, registration timers, activation timers, activation statuses, registration statuses, total number of registered cartridges (current and over time), counters, cartridge characteristics/types, or the like. Registered e-vaping devices Information 144 may include, but is not limited to, component identifiers, registration dates/times, warranty information, usage information, assembly identifier, registration timers, registration statuses, total number of registered devices (current and over time), counters, or the like.

Figure 2A:
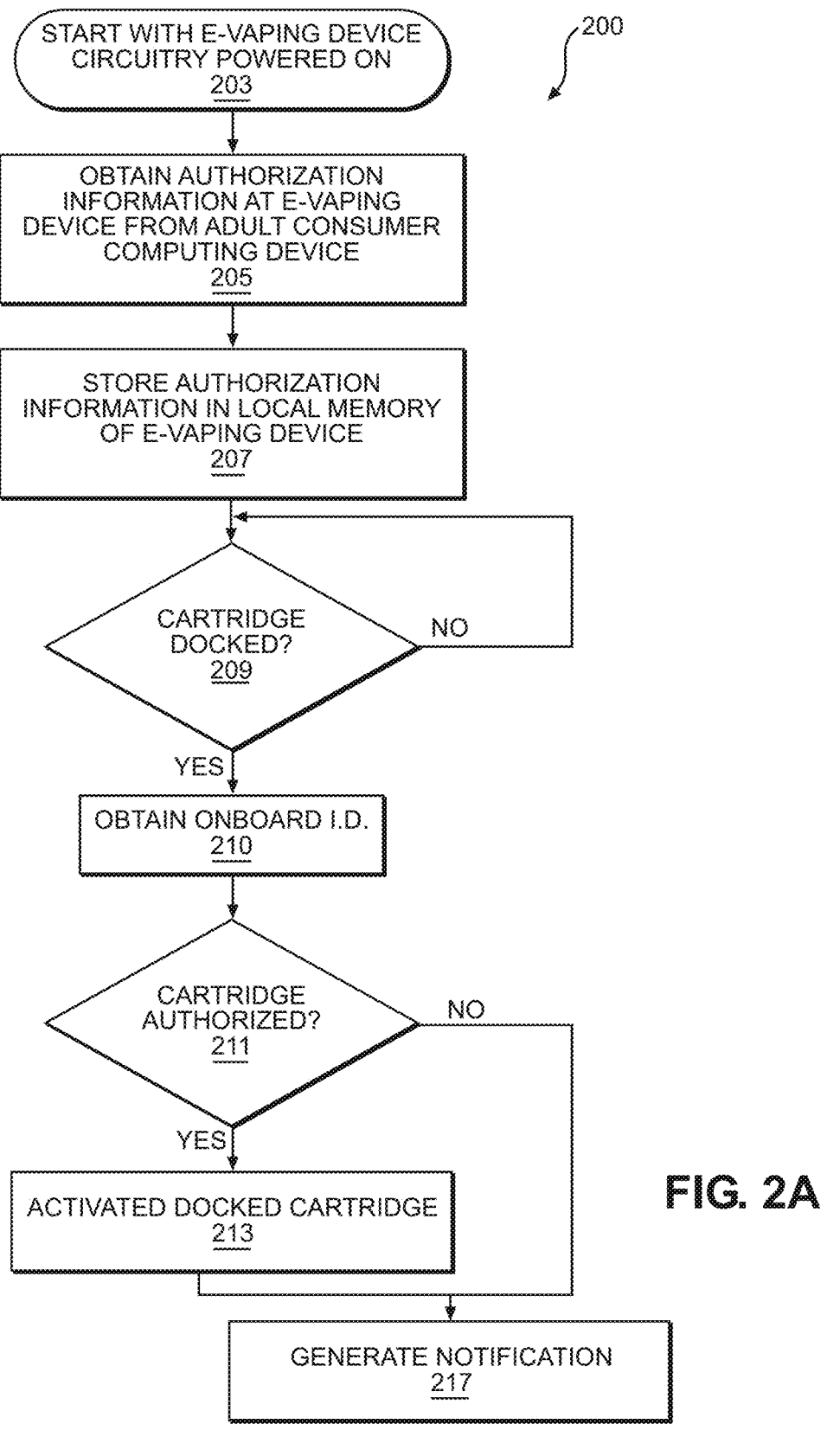
FIGS. 2A and 2B are flow charts illustrating methods of operating the e-vaping device of FIG. 1, in accordance with various example embodiments.

Referring next to FIG. 2A, a method 200 of operating the electronic vaping device of FIG. 1 will be discussed in accordance with various example embodiments.

As illustrated by block 203, the electronic vaping device begins method 200 powered on.

As illustrated by block 205 the wireless e-vaping device 110 (FIG. 1) obtains authorization information from Adult Consumer Computing Device 120 (FIG. 1). In an example embodiment, the wireless e-vaping device obtains the authorization by sending a request via a personal area network (PAN). In at least one example embodiment, the request may, but need not, indicate whether a cartridge is currently docked, and the activation status of that cartridge. In various example embodiments, wireless e-vaping device may determine whether a cartridge is docked by measuring a resistance between two electrical contacts included in wireless e-vaping device 110 and used to connect power to a heating element included in a docked removable cartridge. Without an e-vaping cartridge being docked to wireless e-vaping device 110, the resistance between the two electrical contacts may indicate an open circuit. But when an e-vaping cartridge is docked, the heating element included in the removable cartridge may complete a circuit between two electrical contacts included in wireless e-vaping device 110, causing the resistance between the two electrical contacts to decrease, so that an open circuit is no longer indicated. Various example embodiments may determine that an e-vaping cartridge has been docked when a measured resistance between the two electrical contacts decreases. In at least one example embodiment, the measured resistance may change from essentially infinite, to a value defined by a resistance of a heating element, which may in some example embodiment be within a range of between about 0.5 Ohms to 2.8 Ohms. Measuring resistances between the two electrical contacts included in wireless e-vaping device 110 will be discussed subsequently.

In some example embodiments, docking an e-vaping cartridge to the wireless e-vaping device may trigger generation of the request. In other example embodiments the request may be generated each time the e-vaping device is powered on, in response to some other trigger event, in response to a notification from the computing device that updated authorization information is available, in response to the computing device performing a scanning operation, or the like. In at least one example embodiment, an onboard identifier of any docked cartridge is not transmitted to the computing device in the request.

In example embodiments, the authorization information obtained from the computing device includes one or more identifiers of authorized e-vaping cartridges currently registered to an account associated with an account of an adult e-vaping consumer to which the wireless e-vaping device is registered. In various example embodiments, an e-vaping cartridge may be registered to the adult e-vaping consumer's account, but may not be included in the authorization information because it is not unauthorized for other reasons, as subsequently discussed.

In some example embodiments, the authorization information may, but need not be sent to the wireless e-vaping device in an encrypted format, to prevent unauthorized access to the authorization information in the event that information is intercepted during transmission. Other data security safeguards, including the inclusion of "dummy" information in the authorization information, can be employed in some example embodiments.

As illustrated by block 207 the wireless e-vaping device stores the authorization information in a local memory, such as Memory 112 (FIG. 1). All or part of the authorization information may be stored, and it may be stored in an encrypted or unencrypted format.

As illustrated by block 209, the wireless e-vaping device determines if an e-vaping cartridge is currently docked to the e-vaping device. If there is no removable e-vaping cartridge currently docked, the e-vaping device waits for a docked e-vaping cartridge to be detected.

As illustrated by block 210, once a docked e-vaping cartridge is detected, the wireless e-vaping device obtains the onboard identifier of the docked e-vaping cartridge from the cartridge itself. In various example embodiments, the onboard identifier of the docked cartridge can be obtained from a memory included in the e-vaping cartridge by a contact reader, by a radio frequency identifier (RFID) reader circuitry, by near field communication (NFC) circuitry, or the like.

As illustrated by block 211, the wireless e-vaping device determines if the docked e-vaping cartridge is authorized for activation by the wireless e-vaping device. In example embodiments, the wireless e-vaping device determines whether a docked e-vaping cartridge is authorized for activation by the wireless e-vaping device by comparing the onboard identifier obtained from the docked e-vaping cartridge with the stored authorization information. In at least one example embodiment, if the onboard identifier of the docked e-vaping cartridge is included in a list of authorized e-vaping cartridges stored in the memory of the wireless e-vaping device, the wireless e-vaping device determines that the docked e-vaping cartridge is authorized. Otherwise, the wireless e-vaping device determines that the docked e-vaping cartridge is unauthorized.

As illustrated by block 213, if the wireless e-vaping device determines that the docked e-vaping cartridge is authorized, the docked e-vaping cartridge may be permitted to be activated. In some example embodiments, activating the docked e-vaping cartridge may include setting a software activation switch that allows power to be delivered to a heating assembly of the docked e-vaping cartridge in response to detection of a puff by a puff sensor. The use of a puff sensor to control power delivery to the docked e-vaping cartridge will be discussed in greater detail subsequently.

In at least one embodiment, undocking a removable e-vaping cartridge results in immediate deactivation of the cartridge, and that cartridge must be activated again if it subsequently docked to the wireless e-vaping device.

As illustrated by block 217 the wireless e-vaping device may generate a notification indicating the activation status of a docked cartridge. In various example embodiments, the notification may include any one or more of a tactile, audible, or visual notification at either or both the e-vaping device itself, or a paired mobile device.

Figure 2B:
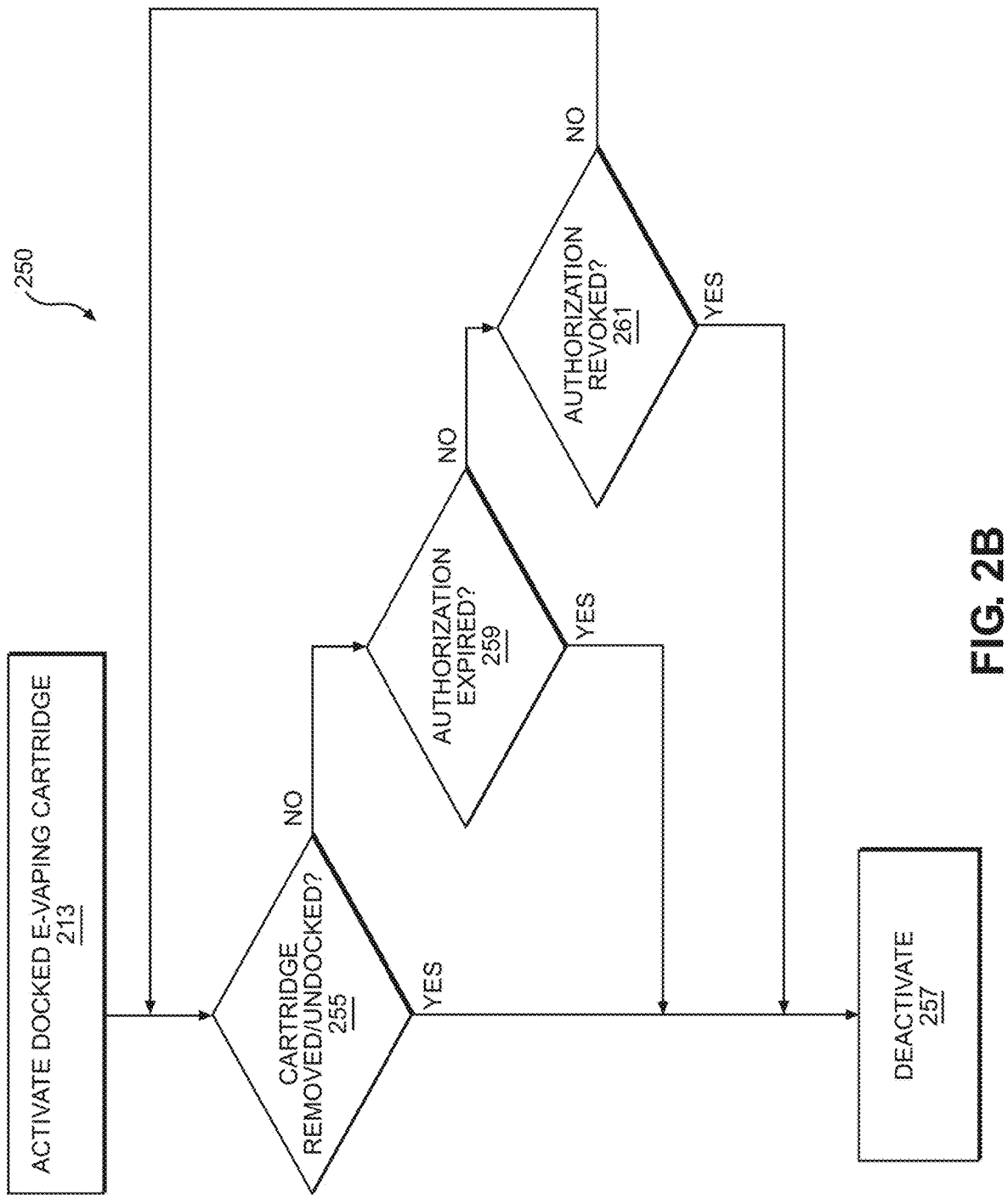

Referring next to FIG. 2B, a method 250 of operating the electronic vaping device of FIG. 1 will be discussed in accordance with various example embodiments.

As illustrated by block 213, a docked e-vaping cartridge is activated as discussed with reference to method 200 (FIG. 2A). In some example embodiments, activating the docked e-vaping cartridge may include setting a software switch that allows power to be delivered to a heating assembly of the docked e-vaping cartridge.

As illustrated by block 255, the wireless e-vaping device determines if the activated e-vaping cartridge is undocked. If so, the activated e-vaping cartridge is deactivated, as illustrated by block 257. In various example embodiments, deactivating an e-vaping cartridge includes prohibiting power from being delivered to a heating assembly of a docked e-vaping cartridge.

As illustrated by block 259, the wireless e-vaping device determines whether an authorization of the activated e-vaping cartridge has expired. In some example embodiments, a duration during which the software switch discussed above with respect to block 213 of FIG. 2A remains activated is limited. In some such example embodiments, the wireless e-vaping device starts an authorization expiration timer at the same time it sets the software activation switch. In response to expiration of the authorization timer, the activated e-vaping cartridge may be deactivated, and in some example embodiments the authorization information associated with the activated e-vaping cartridge can be removed from the stored authorization information.

In yet other example embodiments, a data expiration timer is set in conjunction with the wireless e-vaping device storing authorization information. Upon expiration of the data expiration timer, the wireless e-vaping device marks the authorization information as stale, deletes the authorization information, and/or sends a request for updated authorization information to a computing device, such as Adult Consumer Computing Device 120 (FIG. 1). If authorization has expired, the activated e-vaping cartridge is deactivated, as illustrated by block 257.

As illustrated by block 261, the wireless e-vaping device determines whether an authorization of the activated e-vaping cartridge has been revoked. In at least one example embodiment, the wireless e-vaping device makes this determination based on additional information received from, for example, a paired mobile phone or other computing device. The additional information may include information indicating particular authorization information to be removed from storage in the wireless e-vaping device, a revocation list to be used in conjunction with other stored authorization information, and/or replacement authorization information that the wireless e-vaping device stores in place of previously stored authorization information. If authorization has been revoked, the activated e-vaping cartridge is deactivated, as illustrated by block 257.

Figure 3:
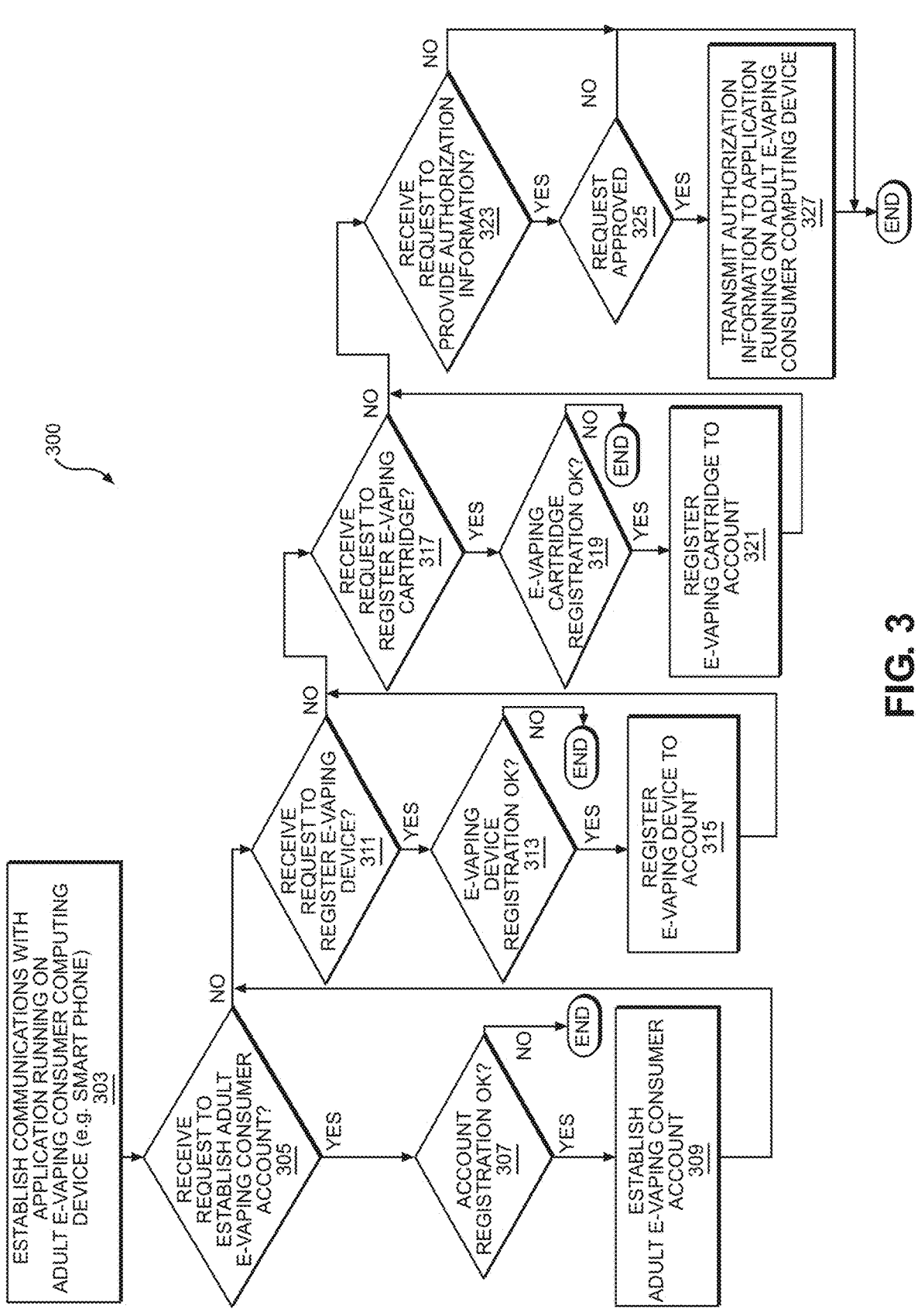
FIG. 3 is a flow chart illustrating a method of operating the server device of FIG. 1, in accordance with various example embodiments.

Referring next to FIG. 3, a method 300 of operating the server device of FIG. 1 will be discussed in accordance with various example embodiments. As illustrated by block 303 a server device, such as Server Device 130 (FIG. 1), establishes communications with an adult consumer application, such as adult consumer Application 126, running on Adult Consumer Computing Device 120 (FIG. 1). As illustrated by block 305, the server device determines whether a request to establish an adult consumer account has been received from the adult consumer application. In various example embodiments, the request may include one or more of adult consumer identifying information, age verification information, address information, consent information, warning acknowledgement information, or the like.

As illustrated by block 307, the server determines whether to grant the request to establish an adult consumer account. In some example embodiments, determining whether to allow an adult consumer account to be established, various identity verification and authentication processes can be used, including, but not limited to, the use of third party identify verification services. In various example embodiments, determining whether to allow an adult consumer account to be established, also includes determining whether the adult consumer requesting the account to be established meets age and identity verification requirements, determining whether the adult consumer has already established an account, determining whether previously established accounts associated with the adult consumer have been closed or suspended, determining whether any closed accounts were closed as a result of the adult consumer violating sharing and use policies and requirements, whether violations associated with suspended accounts have been remedied by the adult consumer, or the like.

As illustrated by block 309, if account registration is permitted, the server establishes an adult e-vaping consumer account associating the adult consumer with the account, and in some example embodiments also associates the adult consumer application and/or the adult consumer computing device with the adult consumer's account. In some example embodiments, an adult consumer can associate multiple computing devices with the adult consumer account at or after the time the account is established.

As illustrated by block 311, the server determines whether a request to register an e-vaping device is received from the adult consumer application. In at least some example embodiments, the request can include information identifying an e-vaping device to be registered to the adult consumer account of an adult e-vaping consumer.

As illustrated by block 313, in response to receiving a request to register an e-vaping device, the server determines whether registration of the e-vaping device is allowed. The determination may include determining whether the e-vaping device is a counterfeit device based on a serial number or other identifying information associated with the e-vaping device, determining how many e-vaping devices are currently registered to the adult consumer account, determining how many e-vaping devices have been registered to the account during a given period of time, determining whether the e-vaping device has already been registered to one or more other accounts, whether the number of registered e-vaping devices exceeds an e-vaping device quantity threshold, determining whether registration of the e-vaping device associated with the request has been previously denied or revoked, or the like.

For example, if an adult an adult consumer attempts to register an e-vaping device that is already registered to another adult consumer account, the request to register the e-vaping device may be denied. Similarly, if registration of the same e-vaping device has been denied 3 times within the past week, registration may be denied.

As illustrated by block 315, if the server determines that registration of the e-vaping device to the adult consumer account is permitted, the server registers the e-vaping device and stores information about the e-vaping device, and in some example embodiments information about the e-vaping device registration process, in Adult Consumer Account Information 141 included in database 140.

As illustrated by block 317, the server determines whether a request to register an e-vaping cartridge is received from the adult consumer application. In at least some example embodiments, the request can include information identifying an e-vaping cartridge to be registered to the adult consumer account of an adult e-vaping consumer. This information may include an identifier obtained by scanning an externally viewable computer readable code on an exterior surface of the e-vaping cartridge, such as a QR code, a bar code, or the like.

As illustrated by block 319 in response to receiving a request to register an e-vaping cartridge, the server determines whether registration of the e-vaping cartridge is allowed. The determination may include determining whether the e-vaping cartridge is a counterfeit device based on a serial number or other identifying information associated with the e-vaping cartridge, determining how many e-vaping cartridges are currently registered to the adult consumer account, determining how many e-vaping cartridges have been registered to the account during a given period of time, determining whether the e-vaping cartridge has already been registered to one or more other accounts, whether the number of registered e-vaping cartridges exceeds an e-vaping cartridge quantity threshold, determining whether registration of the e-vaping cartridge associated with the request has been previously denied or revoked, or the like.

For example, if the e-vaping cartridge quantity threshold is set to 20, and the adult consumer's account already has 20 cartridges registered, registration of the current e-vaping cartridge may be denied until one of the 20 already-registered e-vaping cartridges is de-registered.

As illustrated by block 321 if the server determines that registration of the e-vaping cartridge to the adult consumer account is permitted, the server registers the e-vaping cartridge and stores information about the e-vaping cartridge, and in some example embodiments information about the e-vaping cartridge registration process, in Adult Consumer Account Information 141 included in database 140.

In some example embodiment, de-registering a previously registered e-vaping cartridge can be performed as part of cartridge registration at block 315, or as a prerequisite to cartridge registration at block 313. De-registering a previously registered e-vaping cartridge can include marking or flagging an e-vaping cartridge. In some example embodiments, an adult an adult consumer can manually request de-registration of a specified e-vaping cartridge, or an e-vaping cartridge can be automatically de-registered to prevent the number of registered cartridges from exceeding the cartridge number threshold.

For example, the server may establish a cartridge registration queue in which the oldest previously registered e-vaping cartridge is automatically de-registered each time a new e-vaping cartridge is registered. In some example embodiments, automated de-registration can be performed in response to a "cartridge empty" indicator being received at the server from the adult consumer application.

As illustrated by block 323 the server receives a request to provide authorization information to the adult consumer application. In various example embodiments, the request may include a request transmitted by the adult consumer application to the server, or a system request generated in response to an event, wherein the event may include, but is not limited to, expiration of an authorization or registration period, removal of a cartridge from a list of valid e-vaping cartridges, or addition of an e-vaping cartridge to a list of stolen or recalled cartridges. In various example embodiments, a request to provide authorization information may be an account-level request or may be specific to one or more particular e-vaping devices. For account-level requests, the authorization information may be delivered to multiple e-vaping devices associated with an account, allowing any registered cartridge to be used by any registered e-vaping device. In other example embodiments, however, authorization information may be specific to a single e-vaping device, so that in addition to being registered at the account level, a particular cartridge may be authorized for use on a specific e-vaping device.

As illustrated by block 325 the server determines whether the request for authorization information is approved. In some example embodiments, the request for authorization information may be disapproved if an adult an adult consumer account associated with the request does not include any registered e-vaping devices or registered e-vaping cartridges, or if the adult consumer account associated with the request has been locked or revoked. Additionally, in some example embodiments, if the request is associated with particular e-vaping device, the request may be disapproved if that e-vaping device is reported as being lost or stolen.

As illustrated by block 327, the server transmits the requested authorization information to the application.

Figure 4:
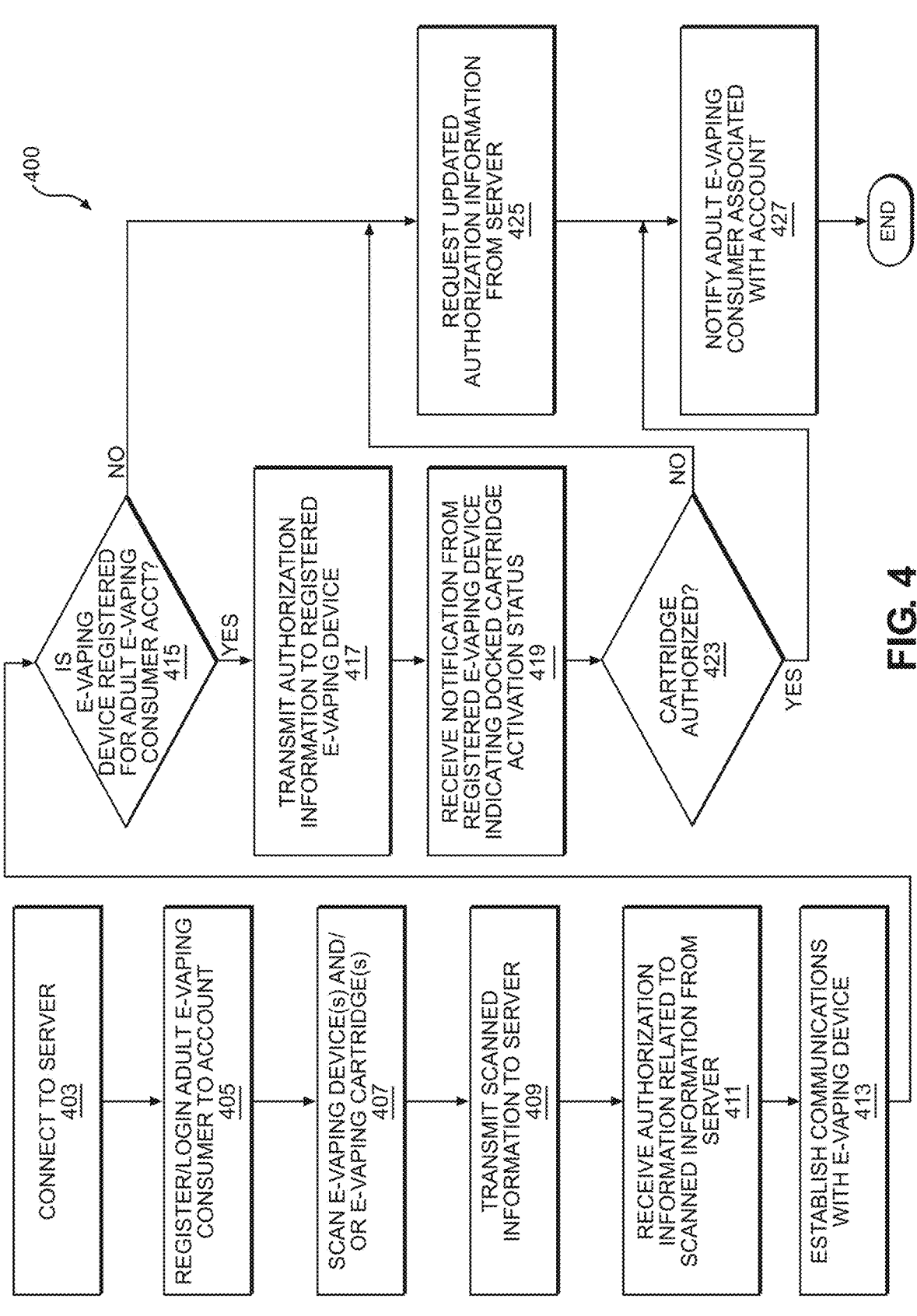
FIG. 4 is a flow chart illustrating a method of operating the adult consumer computing device of FIG. 1, in accordance with various example embodiments.

Referring now to FIG. 4, a method 400 of operating Adult Consumer Computing Device 120 of FIG. 1 will be discussed in accordance with various example embodiments. In various example embodiments, the method may be implemented in a specially configured application, such as adult consumer Application 126 (FIG. 1).

As illustrated by block 403 the adult consumer application establishes a communication session with Server Device 130 (FIG. 1). As illustrated by block 405, an adult e-vaping consumer may use the application to register and/or login to their adult e-vaping consumer account.

As illustrated by block 407, the computing device, under control the adult consumer application, controls a scanner, camera, or other type of reader to scan or read a computer readable code on an outside surface of an e-vaping device or e-vaping cartridge. In some example embodiments, the computer readable code can additionally or alternatively be scanned or read from packaging of the e-vaping device or the e-vaping cartridge, but in at least one embodiment, the computer readable code is indelibly marked on the e-vaping device or e-vaping cartridge itself. The indelibly marked computer readable code may be, but is not limited to, a bar code or QR code that is etched, printed, molded, painted, melted into, attached, or otherwise added to or formed on, an externally viewable surface of the e-vaping device or e-vaping cartridge.

As illustrated by block 409, in an example embodiment an adult an adult consumer mobile device transmits some or all of the scanned information to the server. In at least one example embodiment, the scanned information includes an e-vaping device identifier or an e-vaping cartridge identifier. An e-vaping device identifier or an e-vaping cartridge identifier may or may not match an internal, onboard identifier included in the e-vaping device or the e-vaping cartridge. In some example embodiments, using non-matching onboard and externally accessible identifiers, can make it more difficult to counterfeit or improperly register removable e-vaping cartridges and/or e-vaping devices.

As illustrated by block 411, in various example embodiments, in response to transmitting the scanned information to the server, the adult consumer application receives back from the server authorization information related to the scanned information from server. The authorization information related to the scanned information from server may include an internal identifier associated with the scanned information. For example, assume that an externally viewable identifier associated with a removable e-vaping cartridge is "EXTERNAL 1234." The adult consumer computing device transmits identifier EXTERNAL 1234 to a server, which links identifier EXTERNAL 1234 to a different identifier INTERNAL 9476. The server returns the identifier INTERNAL 9476 in a list of one or more authorized removable e-vaping cartridges included in the authorization information.

At this point, as illustrated by block 413, some example embodiments establish communications between the adult consumer computing device and an e-vaping device via a personal area network (PAN). In other example embodiments communications between the adult consumer computing device and the e-vaping device may have been previously established.

As illustrated by block 415, the adult consumer application determines whether the e-vaping device with which the adult consumer computing device is currently communicating is registered for use with the adult consumer account to which the adult e-vaping consumer is logged in. In some example embodiments, the adult consumer application may make that decision locally, based on authorization information previously received from the server. In alternative example embodiments, the adult consumer application transmits an identifier of the e-vaping device to the server, the server makes the determination, and notifies the adult consumer application of the results of the server's determination.

As illustrated by block 417, if the e-vaping device with which the adult consumer computer is communicating is registered to the proper account, the adult consumer application transmits the authorization information received from the server to the registered e-vaping device. Thus, continuing with the previous example, the identifier EXTERNAL 1234, which was transmitted to a server, resulted in the server transmitting the identifier INTERNAL 9476 to the adult consumer application running on the adult consumer computing device. The adult consumer computing device then transmits the identifier INTERNAL 9476 to the e-vaping device. In various example embodiments described herein, authorization information may be transmitted to the e-vaping device before a removable e-vaping cartridge is docked to the e-vaping device, or during a time a removable e-vaping cartridge is docked to the e-vaping device.

As illustrated by block 419, after an e-vaping cartridge is docked to the e-vaping device, the adult consumer application may receive notification from the e-vaping device indicating an activation status of the docked cartridge. Still continuing with the previous example, an e-vaping device may activate a docked e-vaping cartridge if an onboard identifier of the e-vaping cartridge matches the identifier INTERNAL 9476, which was received in the authorization information transmitted by the adult consumer application to the e-vaping device.

As illustrated by block 423, in various example embodiments the adult consumer application determines, based on information received from the e-vaping device, whether a docked e-vaping cartridge is authorized. It may be recalled that in at least one embodiment, authorization of the e-vaping cartridge is determined by the e-vaping device, and that the e-vaping device activates a docked e-vaping cartridge in response to determining that the docked e-vaping cartridge is authorized. In some of those example embodiments, the e-vaping device will not activate a docked e-vaping cartridge unless the docked e-vaping cartridge is authorized. Thus, if the notification from the e-vaping device indicates that the e-vaping cartridge is activated, the adult consumer application may conclude at block 423 that the docked e-vaping cartridge is authorized. Conversely, if the e-vaping device notifies that the adult consumer application that the docked e-vaping cartridge has not been activated, absent any other malfunction indicators from the e-vaping device the adult consumer application may conclude that the docked e-vaping cartridge is not authorized.

As illustrated by block 425, if the adult consumer application determines at block 423 that the docked e-vaping cartridge is not authorized, the adult consumer application may transmit a request to the server for updated authorization information. By sending a request for updated authorization information in response to being notified that a docked e-vaping cartridge is not authorized, the e-vaping device may be assured that it has the most current authorization information available.

In a similar manner, block 425 can be executed to obtain the most current available authorization information if the adult consumer application determines at block 415 that the e-vaping device with which it is communicating is not registered to the adult e-vaping consumer account.

As illustrated by block 427, in various example embodiments, the adult consumer application may instruct the adult consumer computing device to generate a notification indicating an activation status of the docked cartridge. The notification generated by adult consumer computing device may be local to the computing device or external to the computing device. Examples of notifications local to the computing device include, but are not limited to, the following: presenting a notification window within a graphical user interface (GUI) of the adult consumer application; presenting a notification object on a display screen of adult consumer computing device within the adult consumer application, or outside of the adult consumer application; activating a transducer included in the adult consumer computing device to generate a vibration; blinking, flashing, or otherwise activating one or more light emitting diodes (LEDs) on the adult consumer computing device; transmitting an audio signal to a speaker of the computing device to generate an audible tone alert, or spoken message; generating some combination of audible, visual, and/or tactile alerts.

Examples of notifications external to the computing device include, but are not limited to, the following: transmitting an e-mail, transmitting a social media notification or message, transmitting a text message, transmitting a notification activation signal to one or more e-vaping devices, transmitting information to a server managing an adult an adult consumer account, troubleshooting, and/or product improvement.

Additional example embodiments are disclosed. In some disclosed example embodiments, a Bluetooth® Enabled e-vaping device may utilize the heating of an e-liquid to yield an inhalable aerosol. A Bluetooth® Enabled e-vaping device is an example of a wireless enabled e-vaping device. Various features of example embodiments of e-vaping devices provided herein may be applicable to both wireless enabled e-vaping devices and non-wireless enabled e-vaping devices. In various example embodiments, e-vaping devices may include a re-usable e-vaping device, sometimes referred to as a power control unit, and a replaceable e-vaping cartridge, sometimes referred to as a POD, which together form the e-vaping device when the replaceable e-vaping cartridge is docked with the re-usable e-vaping device. In some such example embodiments, the e-vaping cartridge includes a ceramic heating assembly, or atomizer, which may in turn include a nickel chromium heating element. The re-usable e-vaping device may include a power control unit including a battery, a puff sensor, processing circuitry such as a microcontroller, and a Printed Circuit Board Assembly (PCBA). In various example embodiments, the re-usable e-vaping device is configured to provide power to the replaceable cartridge, which heats e-liquid stored in the replaceable cartridge to yield an inhalable aerosol. The PCBA included in the re-usable e-vaping device may include wireless communication circuitry, such as a Bluetooth® transmitter/receiver technology and an antenna.

In various example embodiments, a first type of replaceable, non-refillable e-liquid cartridge (e-vaping cartridge), may use a mechanical anti-backward compatibility feature configured to prevent the first type of e-vaping cartridge from being used with incompatible e-vaping devices by preventing completion of an electrical circuit between the incompatible e-vaping device and a heating element included in the e-vaping cartridge.

In various example embodiments, device access restriction features implemented in circuitry included in a wireless e-vaping device prevent the wireless e-vaping device from activating an e-vaping cartridge docked to the wireless e-vaping device unless the wireless e-vaping device has been unlocked by an authorized adult consumer. In various example embodiments, a locked e-vaping device may enter and remain in a locked, or deactivated state, in which a power output coupled to the docked e-vaping cartridge will not provide power to a heating assembly of the docked e-vaping cartridge, an unlock command is received.

In various example embodiments, an e-vaping device is in a locked state upon release from manufacturing. In some such embodiments, authorized adult consumers can send lock and unlock commands to the e-vaping device wirelessly, e.g. from a smartphone that has installed a smartphone application. An adult an adult consumer may be required to create and be logged in to an age verified, authorized account to register and unlock the wireless e-vaping device. In some example embodiments, a wireless e-vaping device is linked to a single authorized adult consumer's account and that use has exclusive control of unlocking the wireless c-vaping device.

Table 1 below provides an overview of Access Restriction features according to various example embodiments.

TABLE 1

| Bluetooth enabled e-vaping device Access Restriction Feature Overview | |
| --- | --- |
| Upon Manufacturing Release | Bluetooth enabled power control units (e-vaping devices) are released from manufacturing in a locked state and will not activate a cartridge to generate vapor until the cartridge and/or the e-vaping device is unlocked by an authorized adult consumer. Removable e-vaping cartridges compatible with wireless e-vaping devices may be constructed to physically prevent electrical connections between the heating assembly of a removable e-vaping cartridge and electrical contacts included in other e-vaping devices. |
| Prior to Authorized Account Creation | Adult consumers provide age and identity information in order prove they are 21+ years of age, and to ensure only a single authorized account can be created per unique individual person. |
| Prior to Initial Use | An authorized, age-verified account is required to register and unlock each wireless e-vaping device prior to initial use. Registration of each wireless e-vaping device may be limited to a single, unique, authorized account. |
| Prior to Subsequent Use | In example embodiments, wireless e-vaping devices automatically lock no more than 72 hours after unlocking. An authorized, age-verified account is required to unlock a |

TABLE 1-continued

| Bluetooth enabled e-vaping device Access Restriction Feature Overview | |
|---|---|
| | registered wireless e-vaping device that is in a locked state and registered to the specific adult consumer. Secure credentials may be required to access an authorized account via the smartphone app. |
| Preventing Unauthorized Use after Registration | In some example embodiments, an authorized account is limited to a maximum of 3 registered wireless e-vaping devices at any one time. Wireless e-vaping devices are traceable back to the authorized account that registered the wireless e-vaping device. In various example embodiments, Each authorized account is permitted to be logged in on a single smartphone at a time, and account credentials require two-factor authentication to prevent account sharing. |

The wireless e-vaping device may utilize Bluetooth® technology that pairs the device with the adult consumer's computing device, which may include, but is not limited to, a smartphone, a desktop computer, a laptop computer, a tablet, a wearable, or the like, and in some example embodiments allows the wireless e-vaping device to communicate with an application running on the computing device. Although the term "application" is used in conjunction with example embodiments discussed herein, any or all of the example embodiment may use a browser or software other than an "app" to achieve the same or similar functionality. Thus, as used herein, the term "application," "app," "adult consumer application," and other similar derivative terms, should be interpreted to also include a web browser providing access to a web page, service, or remotely hosted and/or executed software program available through a web browser or other software being executed on an adult e-vaping consumer's computing device.

The application may be used to unlock and lock the e-vaping device. In various example embodiments, unlocking the wireless e-vaping device refers to allowing the wireless e-vaping device to activate an authorized e-vaping cartridge currently docked to the wireless e-vaping device. The application may connect to the server device 130 (FIG. 1) to facilitate account creation, age and identity verification, and device registration.

An authorized, age-verified account may be required to be created before the adult consumer can unlock the wireless e-vaping device with the adult consumer application. In some example embodiments, the adult consumer may initiate unlocking of the wireless e-vaping device via the adult consumer application, but whether or not the e-vaping device is permitted to be unlocked by the adult consumer is ultimately controlled by information included in the adult consumer account, and identifiers associated with the e-vaping device and/or a docked e-vaping cartridge.

In various example embodiments, during a registration process an adult e-vaping consumer may be asked to provide household and/or other information, such as for example, whether any under-age individuals under the age of 21 live in the same household as the adult e-vaping consumer, whether the adult e-vaping consumer works around under-age individuals, or the like. Such information may be stored as part of the adult e-vaping consumer's account information by a server. For example, server device 130 (FIG. 1) may store the household and/or other information in database 140 (FIG. 1) along with other adult consumer account information 141 (FIG. 1). The household and/or other information may additionally and/or alternatively be stored on an adult consumer's computing device 120 (FIG. 1). The information may later be used by consumer app 126 to inform various e-vaping device restrictions and/or safety features. For example as discussed below, the information may be used as a basis for determining a maximum duration of a lockout timer.

In some example embodiments, after downloading and installing the application on their smartphone or other adult consumer computing device, an adult an adult consumer may create an account. In various example embodiments, an account may be created on any computing device that can access the server device storing account information, regardless of whether that computing device includes wireless functionality that allows the computing device to communicate with the wireless e-vaping device. The application may transmit data input to the Server during the account creation process, and the server may conduct age and identity verification against third-party databases with public records, and also ensure a person creates only a single unique account.

After the adult consumer's age and identity are verified, the adult consumer may pair their Wireless e-vaping device with their smartphone. Each Wireless e-vaping device may contain a unique ID stored in the unit's firmware that may require a corresponding Wireless e-vaping device-specific security key from the Server to unlock. The application may transmit the Wireless e-vaping device's unique ID to the Server. The server may register the unique Wireless e-vaping device ID with the unique adult consumer account and transmit a unique security key matching the factory installed security key in the Wireless e-vaping device's firmware to the App. In some example embodiments, the adult consumer may then issue lock and unlock commands to their Wireless e-vaping device without further contacting the Server. According to some example embodiments, an unlocked Wireless e-vaping device may automatically relock after a maximum of 72 hours (adult consumers can choose a smaller time period, but the period cannot exceed 72 hours). This automatic relock time may be reduced based, in part, on information included in adult consumer account information 141.

In at least one example embodiment, only the authorized adult consumer that initially registered a wireless e-vaping device may be able to unlock and lock that unique Wireless e-vaping device upon subsequent use. Once associated with an account, transferring the wireless e-vaping to another account may be prevented to reduce the likelihood of e-vaping devices being inappropriately shared. To minimize the likelihood of unauthorized transfer to another person, server security rules may allow only one account per unique individual person and a limit of three wireless e-vaping devices concurrently registered to an account.

In various example embodiments, the wireless e-vaping device may include a rechargeable 400 mAh lithium-ion battery cell (210400001) for energy storage and a PCBA (100040) configured to control wireless e-vaping device functions. The battery cell and PCBA may be enclosed within a robust zinc-alloy housing. Other battery types and sizes may be implemented in some embodiments. A micro-controller unit (MCU) or other processing device/circuitry residing on the PCBA may, in some example embodiments, control all or substantially all device functions, including but not limited to, Bluetooth® connectivity, device access restrictions, and/or safety features. In other example embodiments, wireless functionality may be controlled by processing circuitry including suitable commercially available wireless modem circuitry.

In various example embodiments, all or a portion of the locking functionality may reside on the wireless e-vaping device, and the locked/unlocked status of a wireless e-vaping device may be retained when the battery is fully depleted.

In some example embodiments, after the wireless e-vaping device is paired with the adult consumer application, it may receive lock and unlock commands and/or authorization information from the adult consumer application. Upon receipt of a lock command and/or the authorization information, the wireless e-vaping device may lock and may not activate the power output to the removable e-vaping cartridge, remaining in this state until an unlock command and/or updated authorization information is received. Upon receipt of an unlock command and/or the updated authorization information, the device may become active and supply power to the removable e-vaping cartridge when air is drawn through the removable e-vaping cartridge.

In various example embodiments, unlock commands may include a time duration. In other example embodiments one or more time durations associated with a wireless e-vaping device and/or removable e-vaping cartridges may be included in authorization information received and stored by the wireless e-vaping device. A timer in the device firmware may be set in accordance with a time duration received in the unlock command or the authorization information. The device may return to the locked state when this timer expires and may remain locked until an unlock command is received.

Although the above example embodiments above describe wireless e-vaping devices that include a reusable e-vaping device and replaceable e-vaping cartridges, various features disclosed with respect to such systems can be implemented in a disposable e-vaping devices that includes a single, unitary device configured to provide essentially the same vapor-producing functionality that would otherwise be provided by a reusable e-vaping device plus a docked replaceable e-vaping cartridge. Thus, the terms disposable e-vaping device, or disposable wireless e-vaping device, are e-vaping devices in which the entire e-vaping device is replaced after a consumable stored in the e-vaping device, e.g. a pre-vapor formulation, has been exhausted.

Figure 5A:
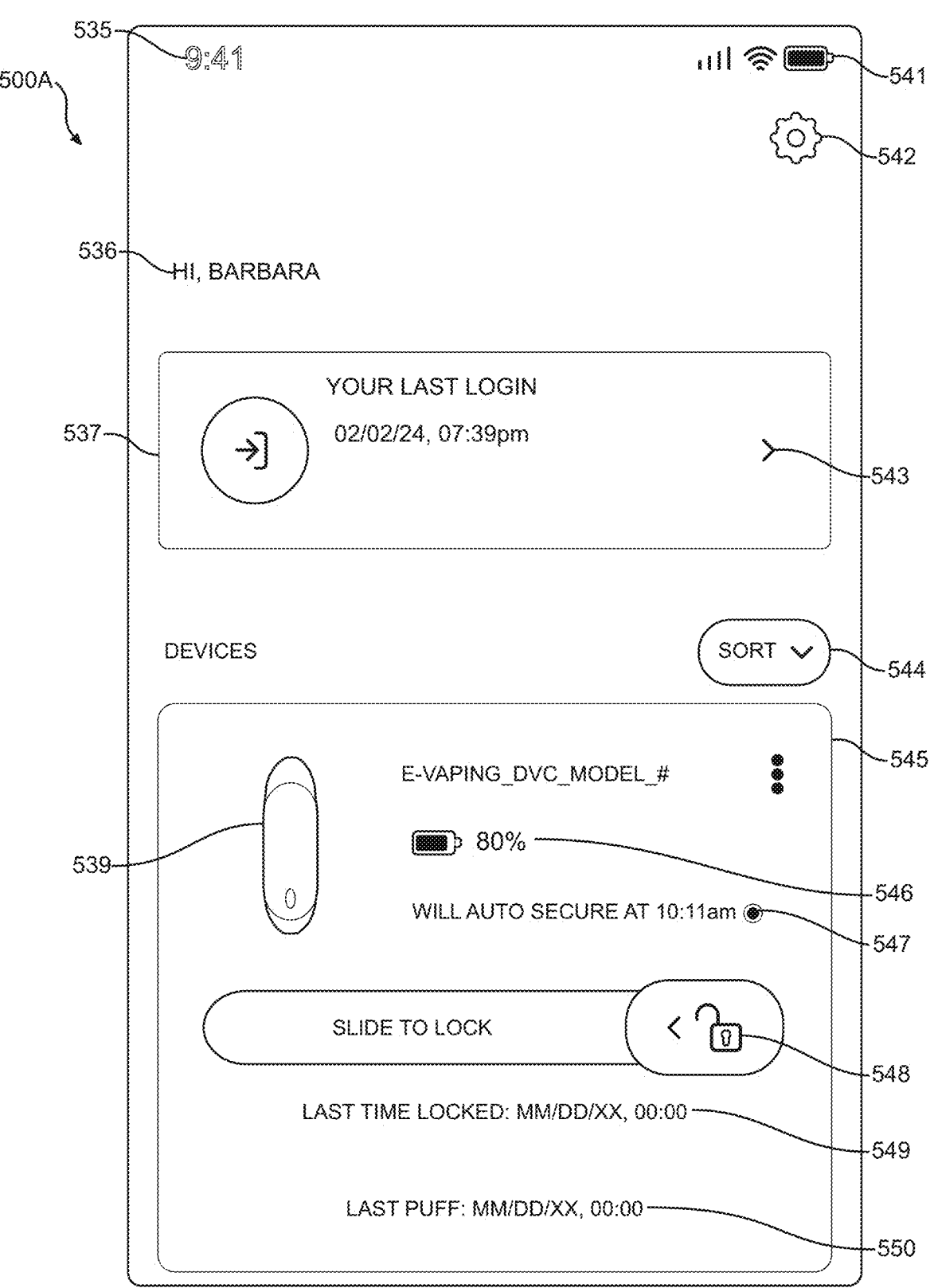
FIGS. 5A-5C are diagrams illustrating graphical user interface (GUI) screens, in accordance with various example embodiments.
Figure 5B:
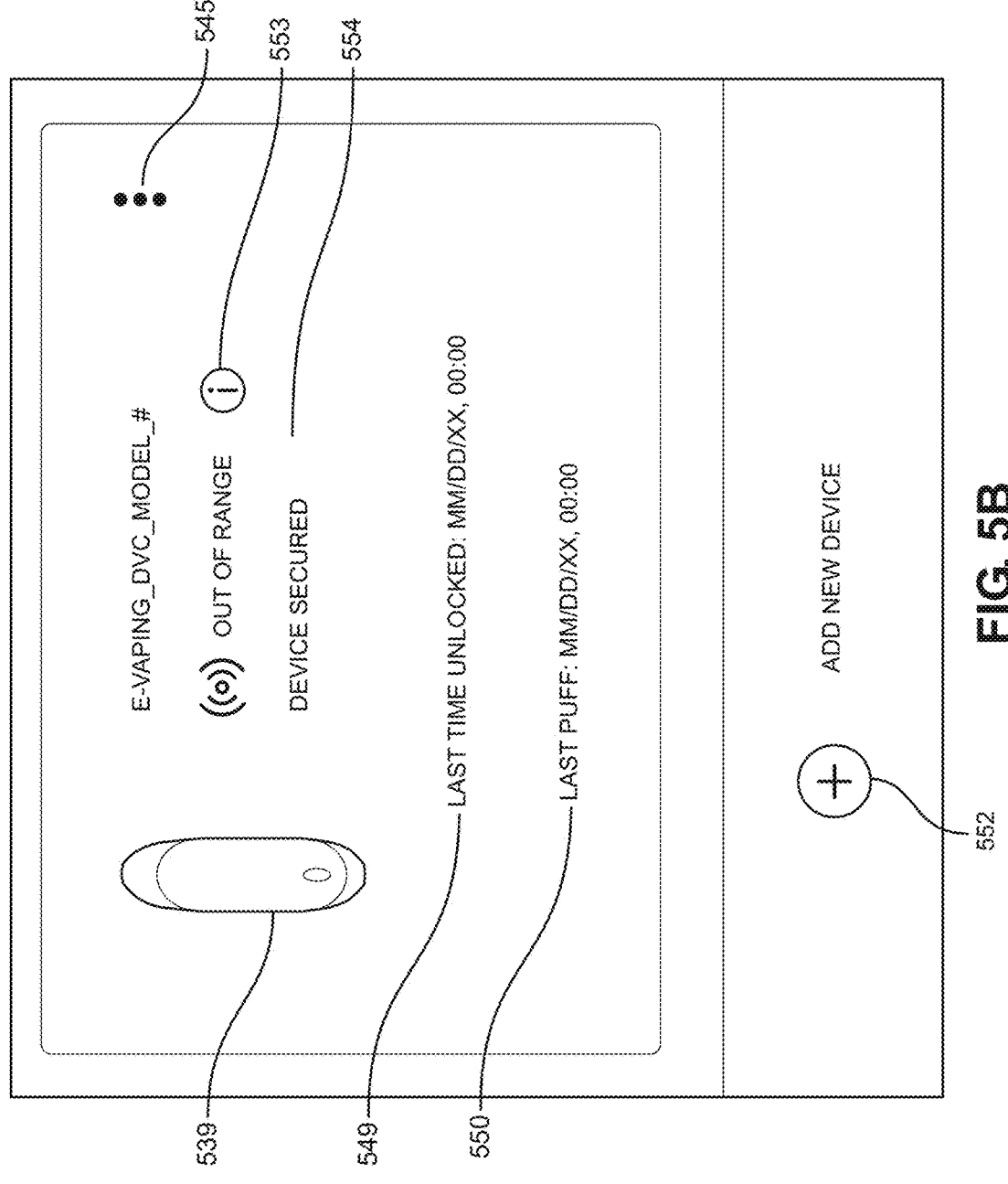
Figure 5C:
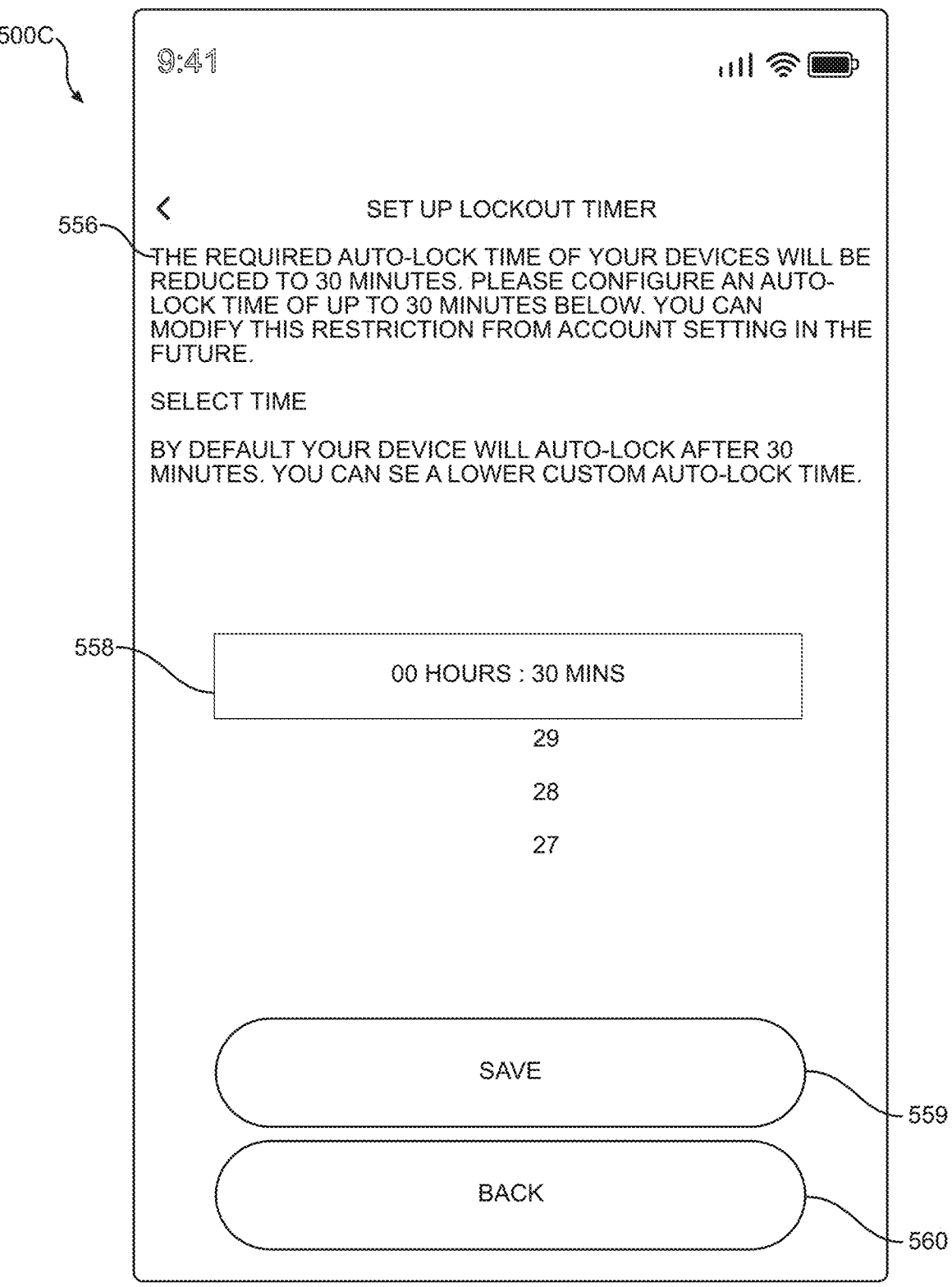

Referring next to FIGS. 5A-5C graphical user interface (GUI) screens will be discussed in accordance with various example embodiments. In various example embodiments, GUI screens 500A, 500B, and 500C may be presented on a display screen by an application, browser, or other program running on an adult an adult consumer computing device, such as adult consumer computing device 120 (FIG. 1).

FIG. 5A illustrates an example embodiment of a slide-to-lock screen 500A including lock slider 548, which when manipulated by an adult an adult consumer may allow the adult consumer to lock and/or unlock a registered e-vaping device. In various example embodiments, slide-to-lock screen 500A may also include a time indicator 535 indicating a current time, which may be obtained from the operating system of the device used to present slide-to-lock screen 500A. Slide-to-lock screen 500A may also display an adult consumer identifier 536, which may be obtained from consumer account information 141 stored by server device 130 (FIG. 1). Network and/or computing device power indicators 541 obtained from the computing devices operating system may also be displayed. Settings icon 542 and login information area 537 may also be displayed. Login information area 537 may provide previous login information obtained from server device 130 (FIG. 1) Additional information selector 543, variations of which are well known in the art, may be used to allow an adult to select, customize, and/or alter the information displayed in login information area 537.

In some example embodiments, slide-to-lock screen 500A may also include a selected e-vaping device image 539. Information identifying e-vaping devices registered to the adult e-vaping consumer may be stored in database 140 (FIG. 1), and may be delivered from server device 130 (FIG. 1) to the adult consumer computing device 120 (FIG. 1) for display to the adult e-vaping consumer. That information may, in some example embodiments, include images. A sort selector 544, variations of which are well known in the art, may be used to allow the adult consumer to sort displayed e-vaping devices if the adult consumer has more than one e-vaping device registered to his or her account. Model information 545 may also be obtained from server device 130 (FIG. 1), or in some example embodiments directly from a wireless enabled e-vaping device paired, and in current communication with, the adult consumer computing device 120 being used to display slide-to-lock screen 500A. In various example embodiments, e-vaping device battery charge information 546 may also be obtained directly or indirectly from the wireless enabled e-vaping device. An auto-secure time indicator 547, which indicates a time at which the selected e-vaping device will be auto-secured, a last-locked/unlocked time indicator 549, and a last-puff time indicator 550 may also be displayed. Information such as the time at which the e-vaping device will be auto-secured and/or last time the e-vaping device was locked/unlocked may be obtained from the wireless enabled e-vaping device 110, from local storage on the adult consumer computing device 120, and/or from the server device 130.

In some example embodiments, some of the displayed information may be determined based on a lockout timer implemented by processing circuitry included on the adult consumer's wirelessly enabled e-vaping device. In other example embodiments, some of the displayed information may be determined by an alarm-type function implemented on the adult consumer computing device. In yet other example embodiments, some of the information may be obtained from the server device. In yet further example embodiments, different instances of the information may be determined by more than one of the e-vaping device, the adult consumer's computer, and/or the server device. Doing so may provide the ability to cross-check and verify the information. In some such example embodiments, information obtained by one the devices may be treated as more trustworthy than information from another device. For example, if a disagreement in lockout timing data exists, the lockout timing data maintained by the e-vaping device may be given priority.

In various example embodiments, information provided by a last-puff time indicator 550 may be obtained from a memory onboard the e-vaping device. In various example embodiments, processing circuitry onboard the e-vaping device maintains operational information including a number of puffs, a time associated with each puff, puff durations, power on-off events, lock and unlock events, docking and undocking events, and the like. In some such example embodiments, during periods of time when the e-vaping device 110 is in communication with adult consumer computing device 120, the e-vaping device transmits stored data, which may include the above mentioned data along with timer statuses and other operational information, to the adult consumer computing device 120, which may in turn store that information and/or forward that information to server device 130.

In various example embodiments, last-locked/unlocked time indicator 549, and a last-puff time indicator 550 may be used by adult consumers to monitor their own vaping behavior, and/or to ensure that the adult consumer's e-vaping device is not being misused. For example, if the adult consumer know that they vaped 8 hours ago, but the last-puff time indicator 550 indicates that the last puff was only 2 hours ago, the adult consumer may be alerted that something is amiss.

FIG. 5B illustrates an out-of-range screen 500B including an out of range indicator 553 indicating that a selected e-vaping device represented by image 539 is not within communication range of, or is otherwise unable to communicate with, adult consumer computing device 120. Information icon displayed in conjunction with out of range indicator 553 in some example embodiments may provide additional details regarding the inability of adult consumer computing device 120 being unable to communicate with the selected e-vaping device. In some example embodiments, the last known secured/unsecured status, may be displayed by device secured status indicator 554. Like slide-to-lock screen 500A, out-of-range screen 500B may display last-locked/unlocked time indicator 549, and a last-puff time indicator 550. In various example embodiments, out-of-range screen 500B may also display an add new device object 552, which upon selection presents the adult consumer with the option to pair and/or register another e-vaping device.

FIG. 5C illustrates an example embodiment of a lockout timer setup screen 500C. In some example embodiments, lockout timer setup screen 500C includes a timer setup object 558, which allows an adult an adult consumer to define a period of time after which an e-vaping device will be locked from further use until affirmatively unlocked. Note that instruction area 556 indicates that a maximum time before lockout is 30 minutes. In some example embodiments, a standard lockout time may be 72 hours. However, if minors live in the same household with the adult e-vaping consumer, the maximum lockout time may be reduced to prevent the potential for misuse. In the illustrated embodiment, the lockout timer is set for a maximum of 30 minutes. In various example embodiments, after selecting a duration of a lockout timer, the adult consumer's preference can be saved by selecting/activating "save" object 559. Back object 560 may be provided to assist the adult consumer in navigating between GUI screens, which when manipulated by an adult consumer may allow the adult consumer to lock and/or unlock a registered e-vaping device. In various example embodiments, slide-to-lock screen 500A may also include a time indicator 535 indicating a current time, an adult an adult consumer identifier 536, network and/or computing device power indicators 541, settings icon 542, login information area 537 providing previous login information, and additional information selector 543 allowing an adult an adult consumer to alter the information displayed in login information area 537.

Figure 6A:
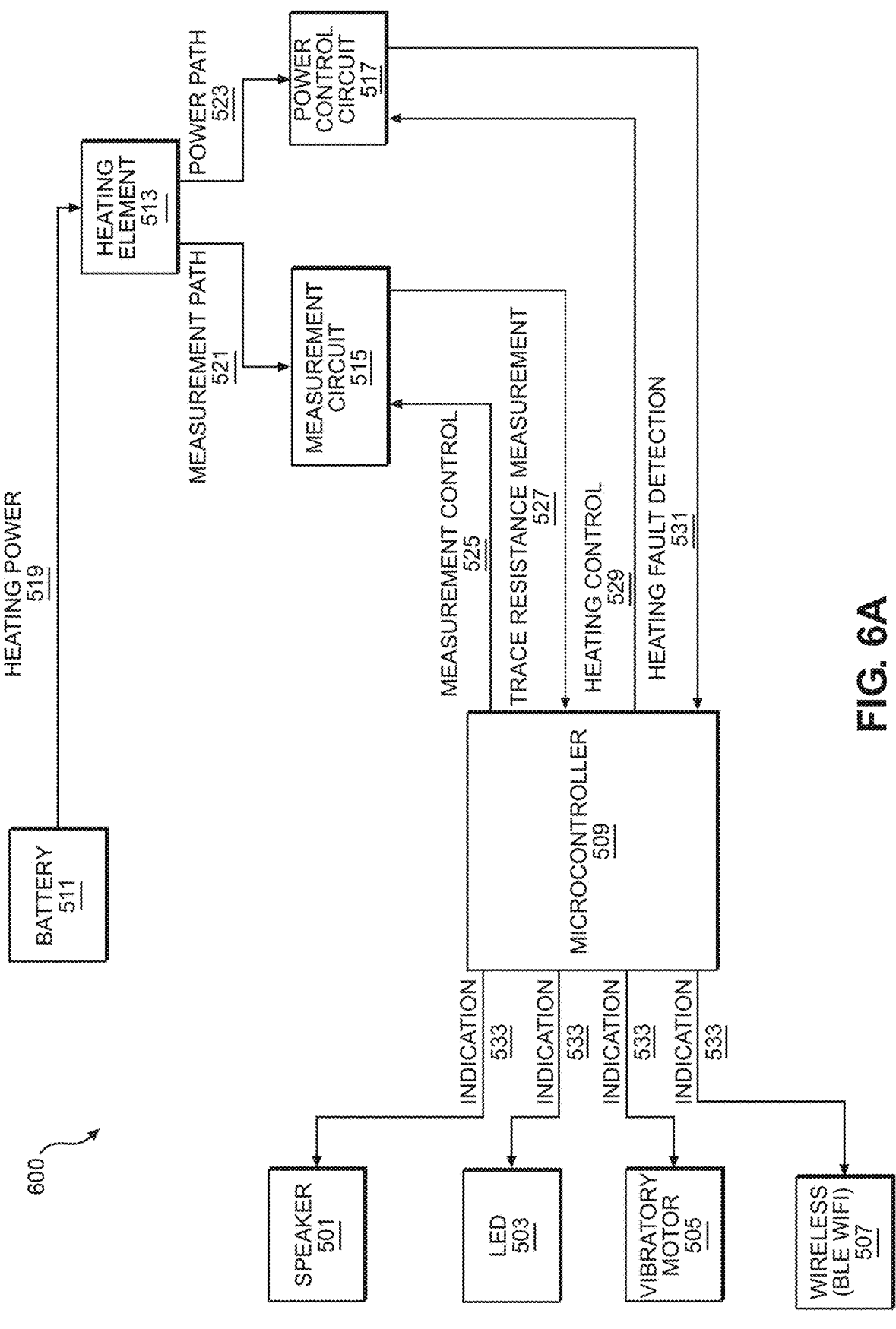
FIG. 6A is a block diagram illustrating low-liquid detection circuitry, in accordance with various example embodiments.

Referring next to FIG. 6A, example embodiments of low-liquid detection circuitry 500 in e-vaping devices will be discussed. In various example embodiments, e-vaping devices, including disposable e-vaping devices and e-vaping devices including reusable e-vaping devices/power control units, use low-liquid detection circuitry to aid in preventing changes in aerosol character due to overheating of a heating element that might be caused by low liquid flow. Changes in aerosol character include, but are not limited to, taste changes that tend to occur during periods of low liquid use.

In general operation, the resistance of the tank/cartridge heating element is measured during use. If resistance measurements exceed software defined thresholds, the e-vaping device ceases heating and notifies the adult consumer that a low liquid error has occurred. Detection thresholds used by this software may be updated each time the heating element is energized. In some example embodiments, a rate of change calculation is preformed early during use, e.g. <333 ms after power is initially applied to the heating element. This initial measurement may be used to set a steady state threshold for later use, e.g. >333 ms after power is initially applied to the heating element. These, and other thresholds, may be derived empirically from data generated by temperature reactive heating elements.

As illustrated, low-liquid detection circuitry 500 includes microcontroller 509, measurement circuit 515, power control circuit 517, heating element 513, battery 511, speaker 501, LED 503, vibratory motor 505 and wireless interface 507.

Battery 511 provides heating power 519 to heating element 513. Power control circuit 517 controls the application of heating power 519 to heating element 513 by completing (or preventing completion of) power path 523. Power control circuit 517 is, in turn, controlled by heating control signals 529 generated by microcontroller 509. Power control circuit 517 also provides heating fault detection signals 531 to microcontroller 509.

Resistance measurements are performed by measurement circuit 515, via measurement path 521. Measurement circuit 515 performs measurements based on measurement control signals 525 generated by microcontroller 509, and provides the measurement results to microcontroller 509 via trace resistance measurement signals 527.

Microcontroller 509 determines whether a low-liquid condition exists based on trace resistance measurement signals 527, and issues appropriate heating control signals 529 to power control circuit 517. Heating control signals 529 may cause power control circuit 517 to regulate or otherwise control the power provided to heating element 513 by, for example, opening power path 523, and/or adjusting a pulse width modulation of heating power 519 in accordance with heating control signals 529.

In response to detection of a low liquid level event, microcontroller 509 transmits indication 533 to a feedback element including one or more of speaker 501 to generate and audible alert, LED 503 to generate a visual alert, transducer/vibratory motor 505 to generate a tactile alert, or wireless interface 507 for transmission to an adult an adult consumer application to generate an alert on an adult an adult consumer computing device (not illustrated).

Figure 6B:
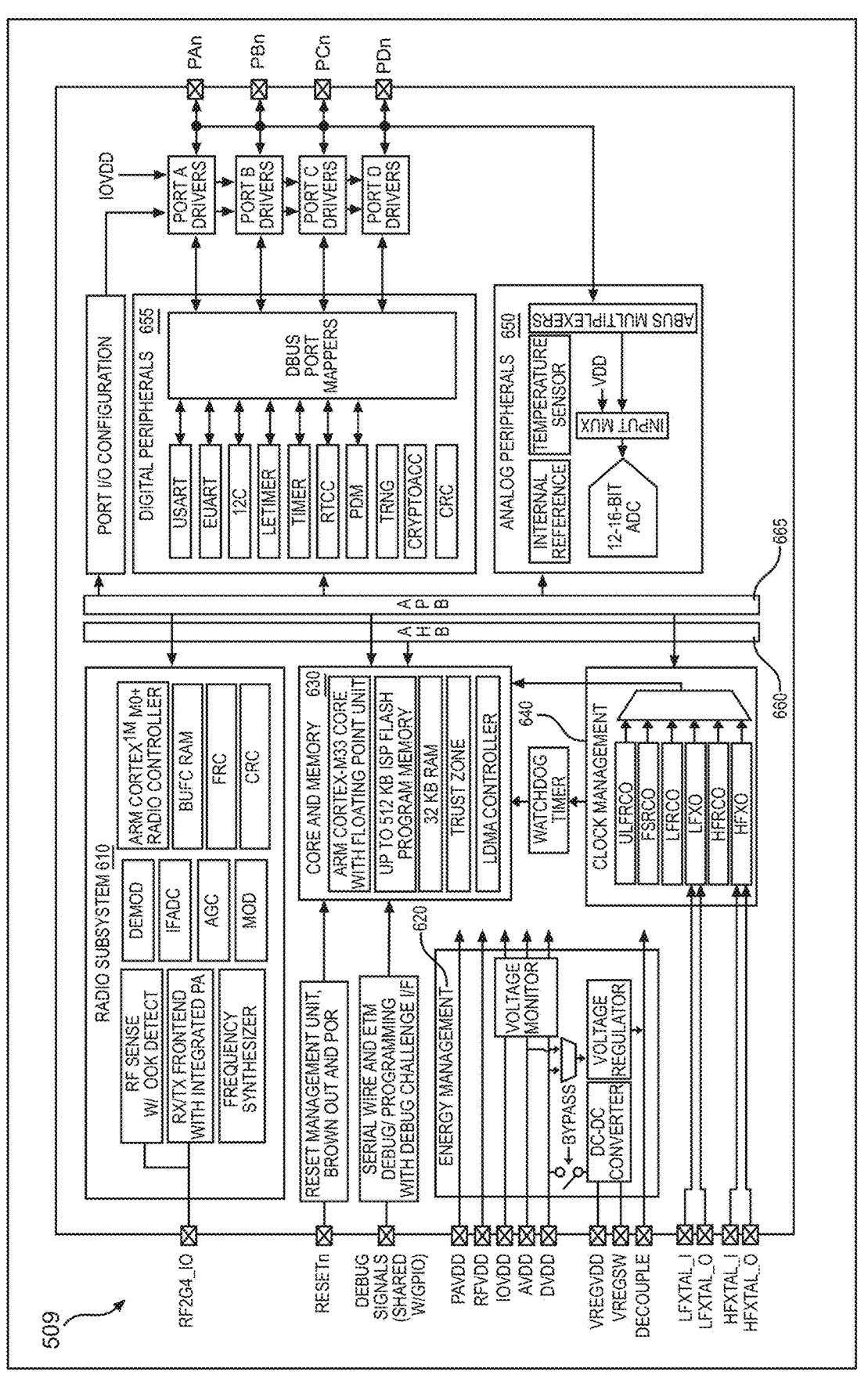
FIG. 6B is a block diagram illustrating a wireless enabled microcontroller, in accordance with various example embodiments.

Referring next to FIG. 6B a wireless enabled microcontroller 509 will be discussed in accordance with various example embodiments. Microcontroller 509 includes a radio subsystem 610, energy management subsystem 620, processing core and memory subsystem 630, and clock management subsystem 640 coupled to advanced high performance bus (AHB) 660. Microcontroller 509 further includes digital peripheral subsystem 655 and an analog peripheral subsystem 650 coupled to advanced peripheral bus (APB) 665.

Figure 7:
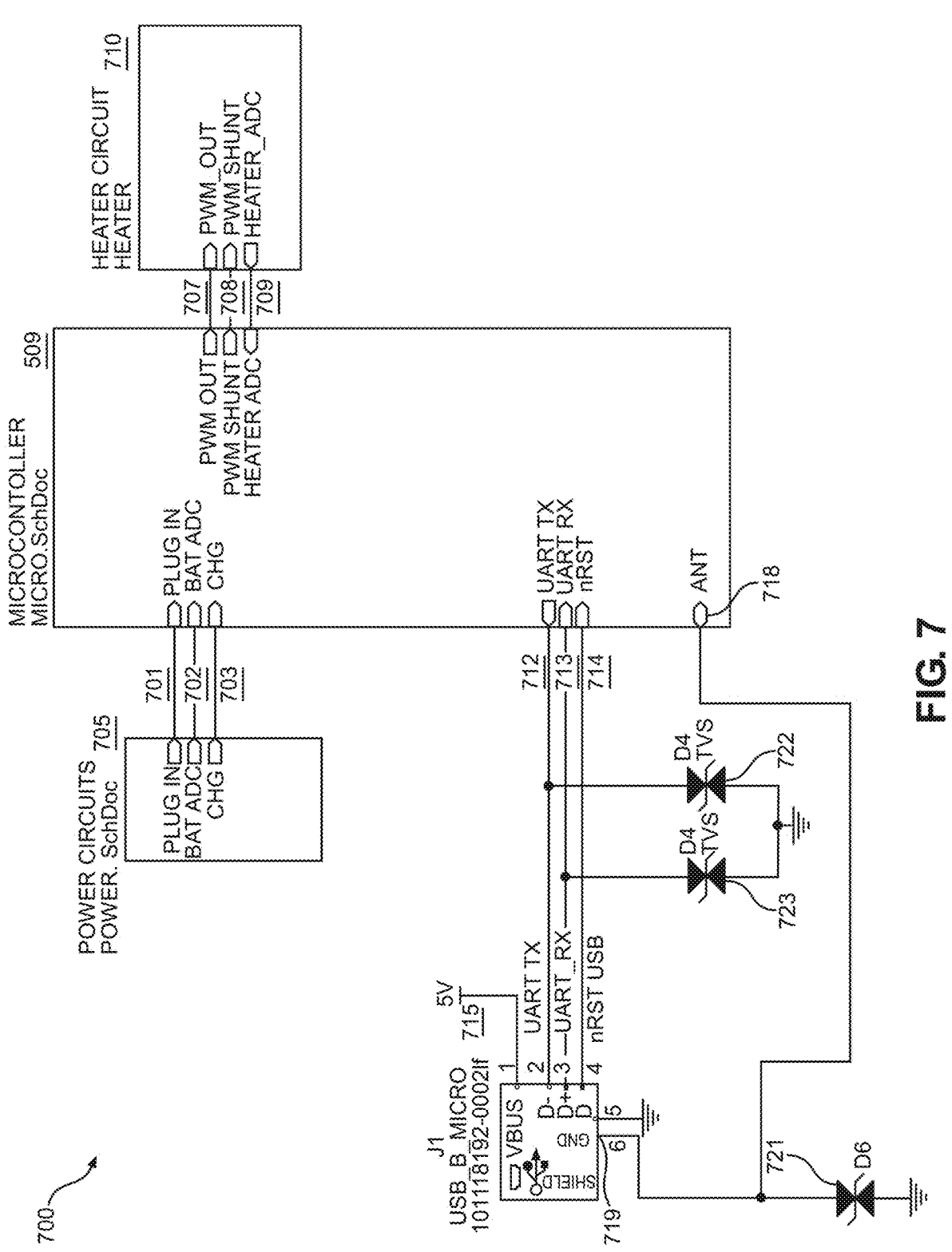
FIG. 7 is a schematic diagram illustrating connections between a wireless enabled microcontroller and other circuitry included in a wireless e-vaping device, in accordance with various example embodiments.

Referring next to FIG. 7 connections between a wireless enabled microcontroller 509 and other circuitry included in a wireless e-vaping device will be discussed in accordance with various example embodiments. Microcontroller 509 includes plug-in terminal 701, battery analog-to-digital (ADC) terminal 702, and charge terminal 703 connected to corresponding terminals of power circuits 705. Microcontroller 509 includes pulse width modulation (PWM) terminal 707, PWM shunt 708, and heater ADC terminal 709 connected to corresponding terminals of heater circuit 710. Microcontroller 509 also includes universal asynchronous receiver/transmitter (UART) transmit (TX) terminal 712, UART receive (RX) terminal 713, nRST reset terminal 714 connected to corresponding terminals of USB connector 715, and to ground via transient voltage suppression diodes 722 and 723. Antenna terminal 718 is connected to the shield pin 719 of USB connector 715, and to ground via a transient voltage suppression diode 721.

Figure 8:
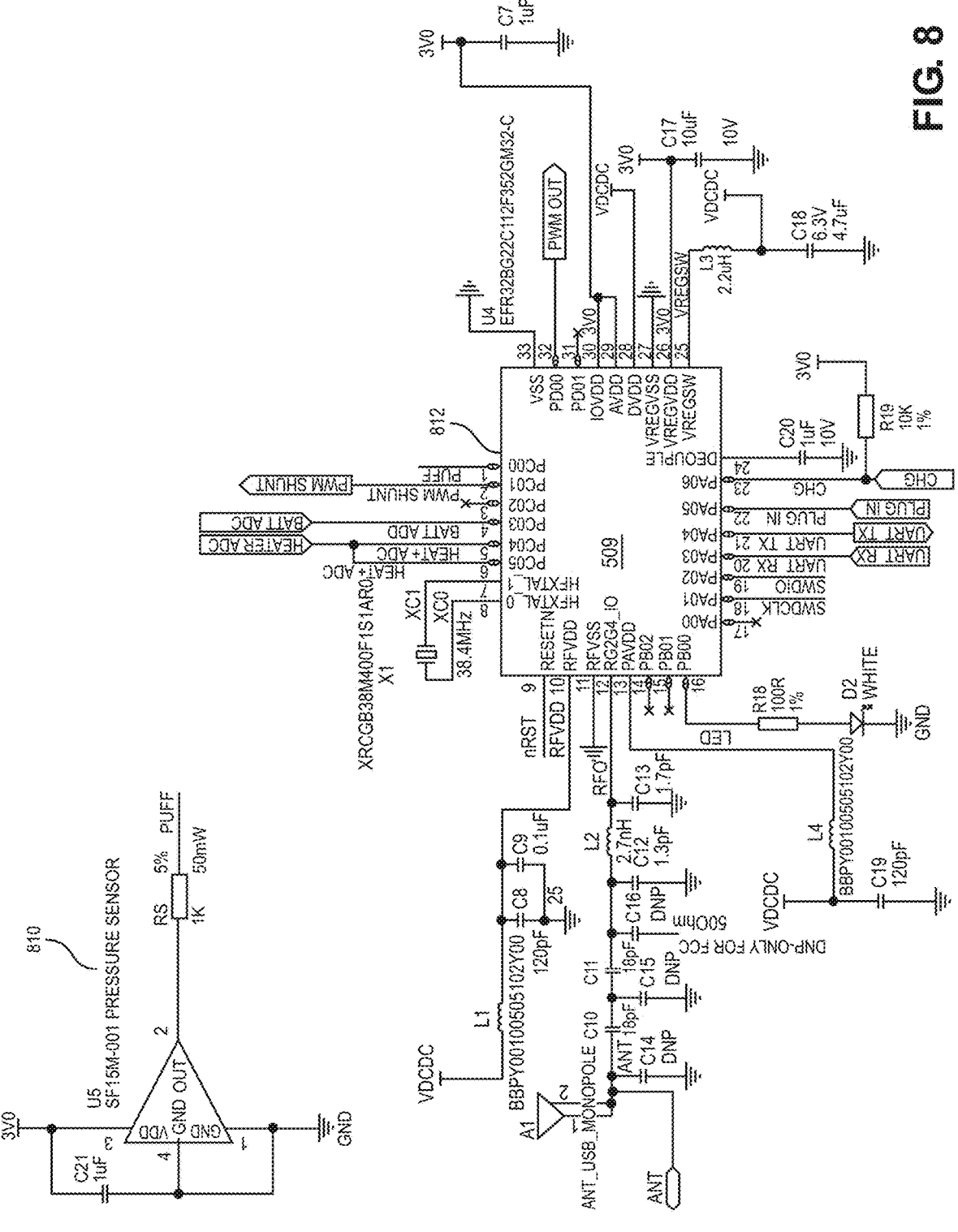
FIG. 8 is a schematic diagram illustrating a microcontroller and pressure sensing circuitry configured to detect puffs, in accordance with various example embodiments.

Referring next to FIG. 8 a microcontroller 509 and associated pressure sensing circuitry 810 configured to detect puffs will be discussed in accordance with various example embodiments. FIG. 8 illustrates microcontroller 509 operationally connected to various external circuitry. For example, pressure sensor circuitry 810, referred to elsewhere herein as a puff sensor, is connected to port PC00 812 of microcontroller 509. In various example embodiments, microprocessor 509 uses the output of pressure sensor circuitry 810 to determine whether an adult consumer is drawing on an e-vaping device. In various example embodiments, pressure sensor circuitry 810 includes a micro-electro-mechanical system (MEMS) sensor that has an output voltage that varies based on changes in capacitance resulting from movement of a flexible membrane caused by changes in pressure resulting from air movement associated with an adult consumer drawing air through an e-vaping device.

Figure 9:
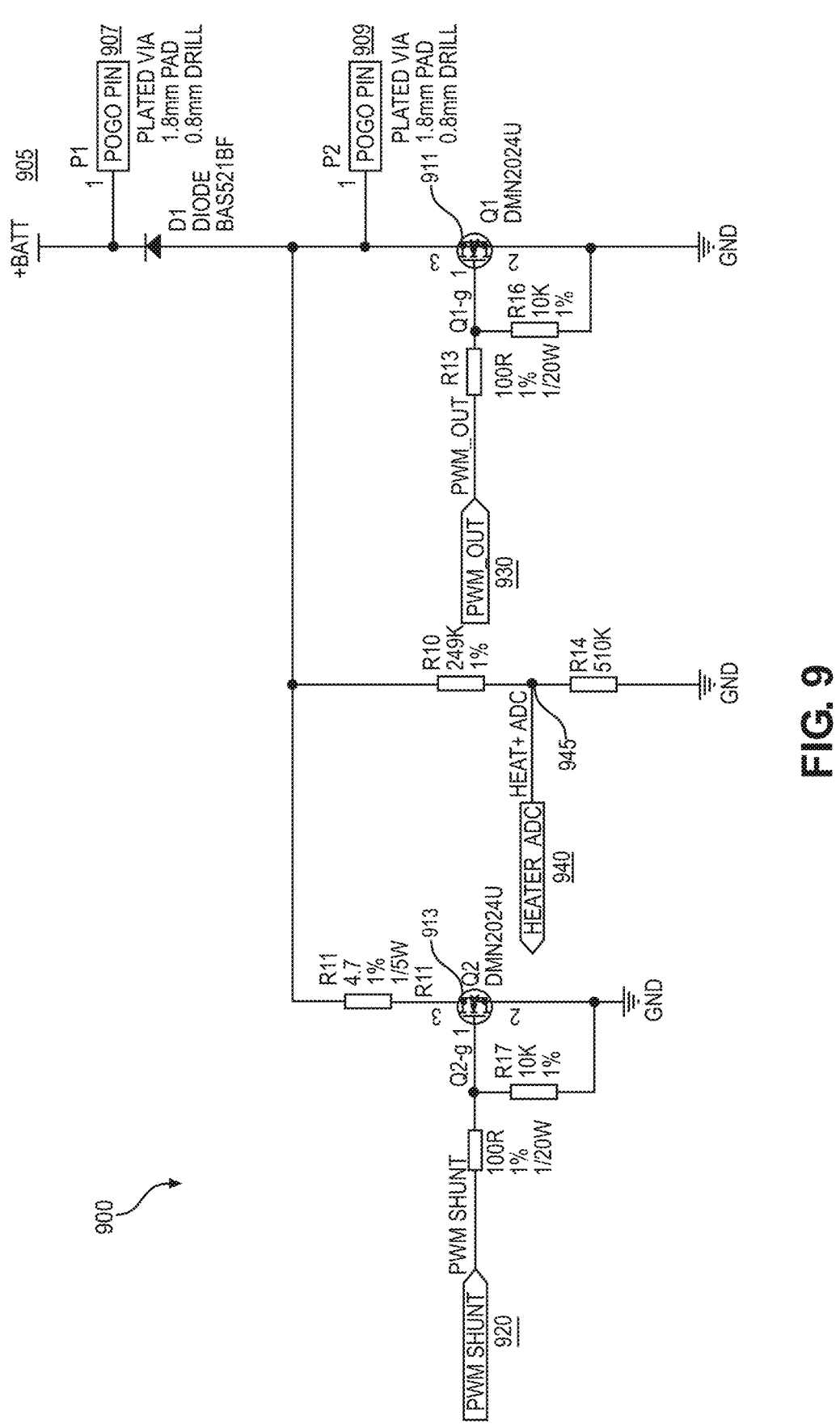
FIG. 9 is a schematic diagram illustrating pulse-width modulated power regulation circuitry, in accordance with various example embodiments.

Referring next to FIG. 9, pulse-width modulated (PWM) power regulation circuitry 900 will be discussed in accordance with various example embodiments. Battery power 905 provides power to pogo pins 907 and 909. Battery power 905 is regulated by transistor Q1 911 and transistor Q2 913. Transistor Q1 911 controls the PWM of battery power 905, e.g. the percentage of time battery power 905 is available at pogo pins 907 and 909, based on a PWM out signal 930 generated by a microcontroller 509 (FIG. 8) based on a PUFF signal generated by pressure sensor 810 detecting a change in pressure resulting from air movement associated with an adult consumer drawing air through an e-vaping device. Transistor Q2 913 controls a magnitude of the PWM voltage available at pogo pins 907 and 909 based on a PWM shunt signal 920 generated by the microcontroller (not illustrated). A heater analog-to-digital (ADC) converter terminal 940 of a microcontroller (not illustrated) is connected to node 940, where the pulse-width modulated battery power 905 is sampled.

Figure 10:
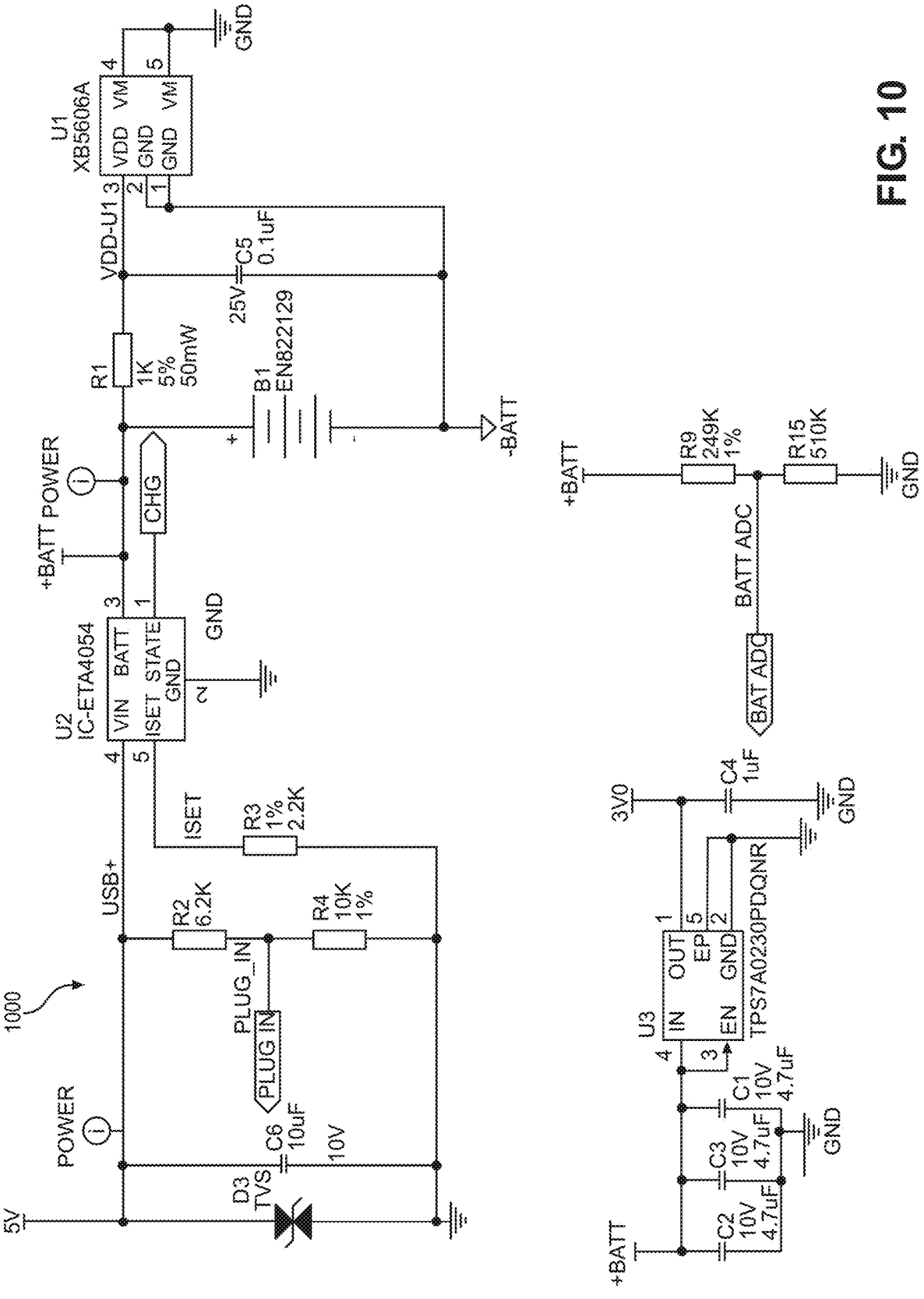
FIG. 10 is a schematic diagram illustrating battery charging circuitry of an e-vaping device, in accordance with various example embodiments.

FIG. 10 illustrates battery charging circuitry 1000 used to charge an on-board, rechargeable battery of an e-vaping device, in accordance with various example embodiments.

FIGS. 11-17 are flowcharts illustrating various example embodiments of methods of operating a wireless e-vaping device. In some example embodiments, the illustrated methods may be implemented using a processor, for example a microcontroller unit (MCU), configured to execute the methods using a program of instructions stored in firmware or other memory. In some such example embodiments, wireless e-vaping device firmware included in a Bluetooth® enabled e-vaping device, may control power output applied to a heating assembly by adjusting an average voltage applied to a heating element using Pulse Width Modulation (PWM) techniques. PWM may be used to reduce the average voltage output of a direct current voltage by rapidly cycling the power on and off. In example embodiments, the time that the power is ON divided by the total duration of the output may be referred to as the duty cycle.

The wireless e-vaping device may be configured such that it is not powered off; it always remains ON in standby mode. While in standby mode, the firmware may continuously wait for an activation signal from an airflow sensor, which may include a diaphragm to detect the pressure change associated with an adult e-vaping consumer drawing air through the e-vaping device. The airflow sensor may output a reference voltage to the MCU when airflow is detected and return the reference voltage to ground reference when no airflow is detected. In various example embodiments, airflow detected by airflow sensor may be referred to as a "puff." If the duration of a puff is less than a defined maximum puff duration, the firmware may make resistance measurements of a heating assembly included in the e-vaping device. It should be noted that a heating assembly that is part of a disposable e-vaping device and a heating assembly included in a cartridge docked to a reusable e-vaping device are both considered to be included in the e-vaping device.

If a measured resistance value is below a short circuit (overcurrent) threshold, the firmware may execute a short-circuit subroutine. In some example embodiments, if the resistance value is above the short circuit (overcurrent) threshold, the firmware: 1) calculates the duty cycle necessary to achieve the targeted power output; 2) supplies power in accordance with the calculated duty cycle; 3) illuminates the LED to notify the adult e-vaping consumer that the e-vaping device is active. In various example embodiments, the MCU may poll the airflow (puff) sensor, and repeat the cycle if the activation signal is still active. The MCU may return the e-vaping device to standby mode in response to determining that the activation signal is no longer active.

Some example embodiments include a maximum puff duration subroutine in which the MCU flashes an LED, for example 10 times, waits for the activation signal from the airflow sensor to be inactive, and returns to standby mode when the activation signal is determined to be inactive.

In some example embodiments, as part of a short circuit (overcurrent) protection subroutine, the MCU flashes an LED, for example 3 times, waits for the activation signal from the airflow sensor to be inactive, and returns the e-vaping device to standby mode when the signal is inactive.

In various example embodiments, when a signal from the airflow (puff) sensor and/or the contacts of a removable cartridge is received, the e-vaping device may be configured to wake up and enable its BLE radio which allows for smartphone devices to connect and interact with the e-vaping device if: 1) a computing device, e.g. a smartphone, was previously bonded (paired) to the Wireless e-vaping device; or 2) the Wireless e-vaping device is in pairing mode and the correct PASSKEY (a device secret key exported during manufacturing) is provided by an application running on the computing device.

Figure 11:
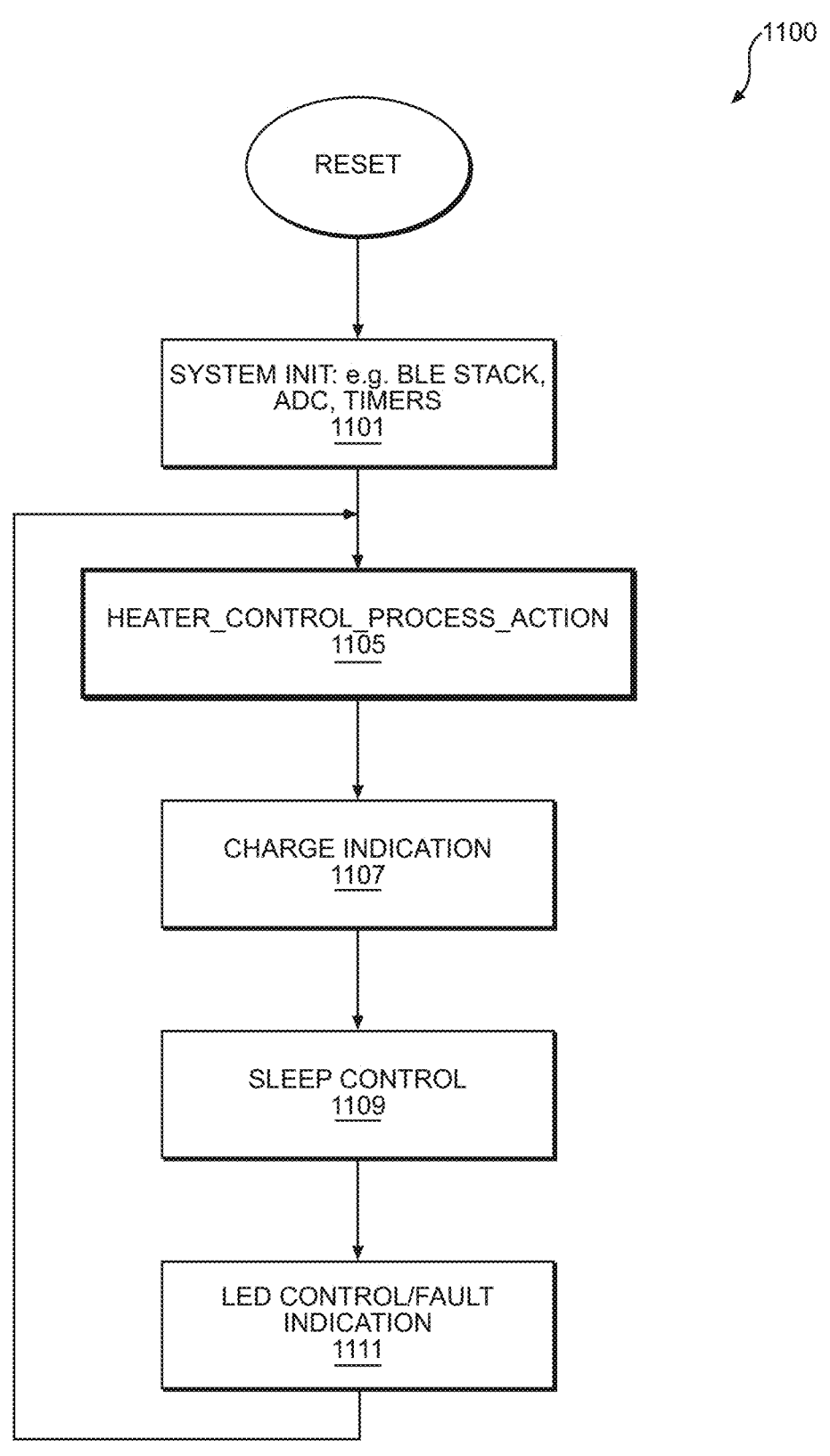
FIG. 11 is a block diagram illustrating a method of operating an e-vaping device, in accordance with various example embodiments.

Referring next to FIG. 11, a method 1100 of operating an e-vaping device will be discussed in accordance with various example embodiments. In some example embodiments, after an e-vaping device is reset, the hardware and on-board peripherals of the e-vaping may be initialized. For example, as illustrated by block 1101, a Bluetooth® Low Energy (BLE) stack used to control wireless operation of the e-vaping device, analog-to-digital converters (ADCs), and various timers, all of which may be included in a microcontroller, may be initialized.

As illustrated by block 1105, a heater control process action may be initialized. In various example embodiments, the heater control process action is performed to activate an e-vaping heating assembly to heat a pre-vapor formulation and produce a vapor. In various example embodiments, activation of the heating assembly includes supplying power to a heating element included in the heating assembly in response to puff initiation by an adult e-vaping consumer.

As illustrated by block 1107, during or after the initialization process, the e-vaping device may present a charge indication to the adult e-vaping consumer. The charge indication may include a go/no-go charge indicator, or may indicate a level of charge by displaying, for example, a different color indicator, depending on the charge level: green (good), yellow (charging needed), or red (insufficient charge for use).

As illustrated by block 1109, the e-vaping device may be placed in a low-power mode depending on the remaining battery life. For example if the remaining battery life is estimated to provide less than a threshold number of puffs— for example 4 puffs, the e-vaping device may be placed in a sleep mode.

As illustrated by block 1111, error codes indicating errors identified during the initialization process may also be displayed.

Figure 12:
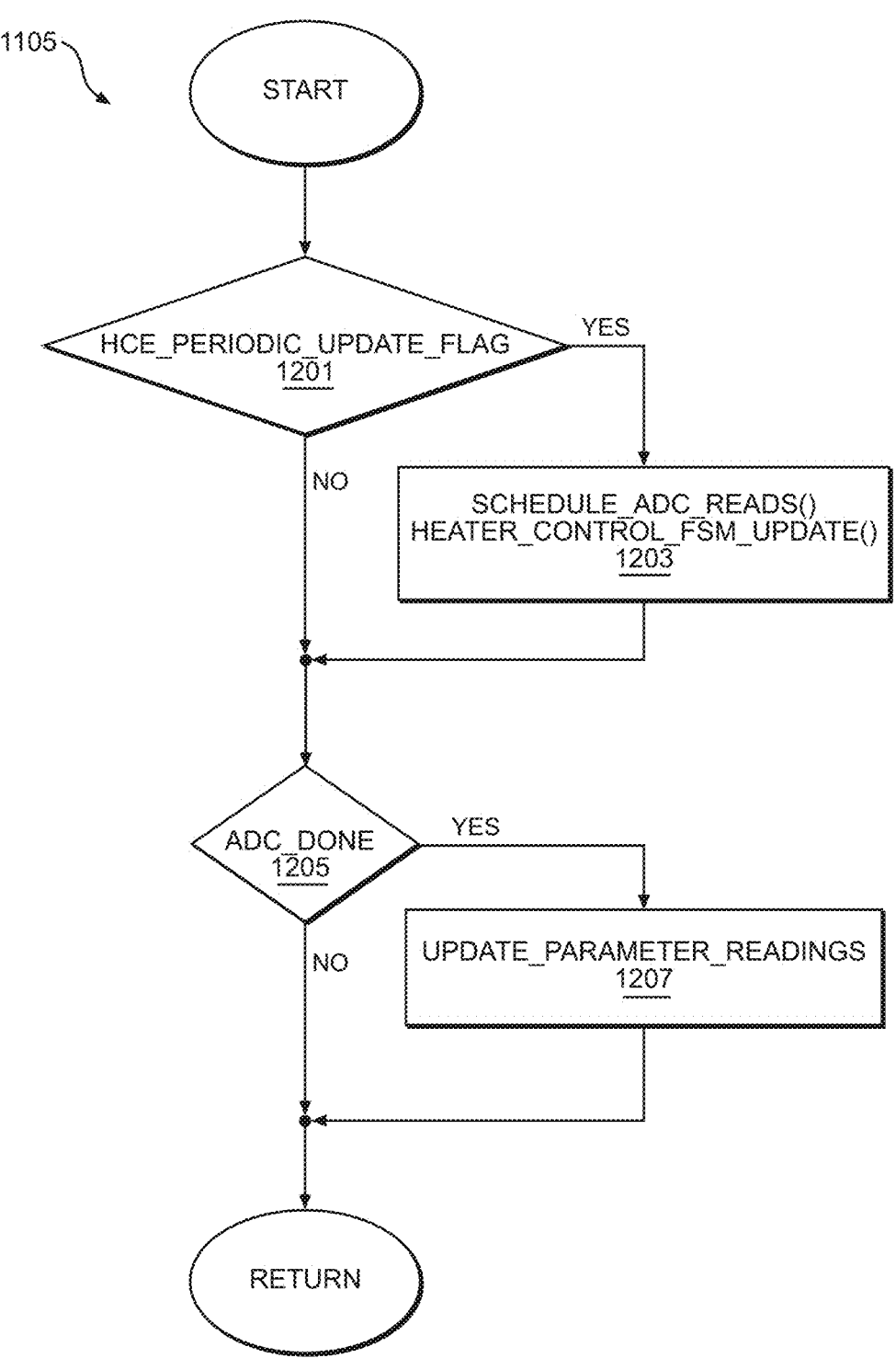
FIG. 12 is a block diagram illustrating a heater control process action in an e-vaping device, in accordance with various example embodiments.

Referring next to FIG. 12, a heater control process action 1105 in an e-vaping device will be discussed in accordance with various example embodiments. In various example embodiments, an Analog to Digital Converter (ADC) of a microcontroller heater control may perform process action 1105 to control an amount of heat generated by a heating assembly. As illustrated by block 1201, the microcontroller may perform a check to determine whether a high-current event (hce) flag has been set. As illustrated by block 1203 if the hce_periodic_update_flag has been set, ADC reads may be scheduled, and heater control finite state machines (fsms) may be updated. As illustrated by block 1205, a check is made to determine whether scheduled ADC reads have been completed. If so, as illustrated by block 1207 various parameters, including but not limited to, battery, heating assembly, and/or PWM duty cycle, are updated.

Figure 13:
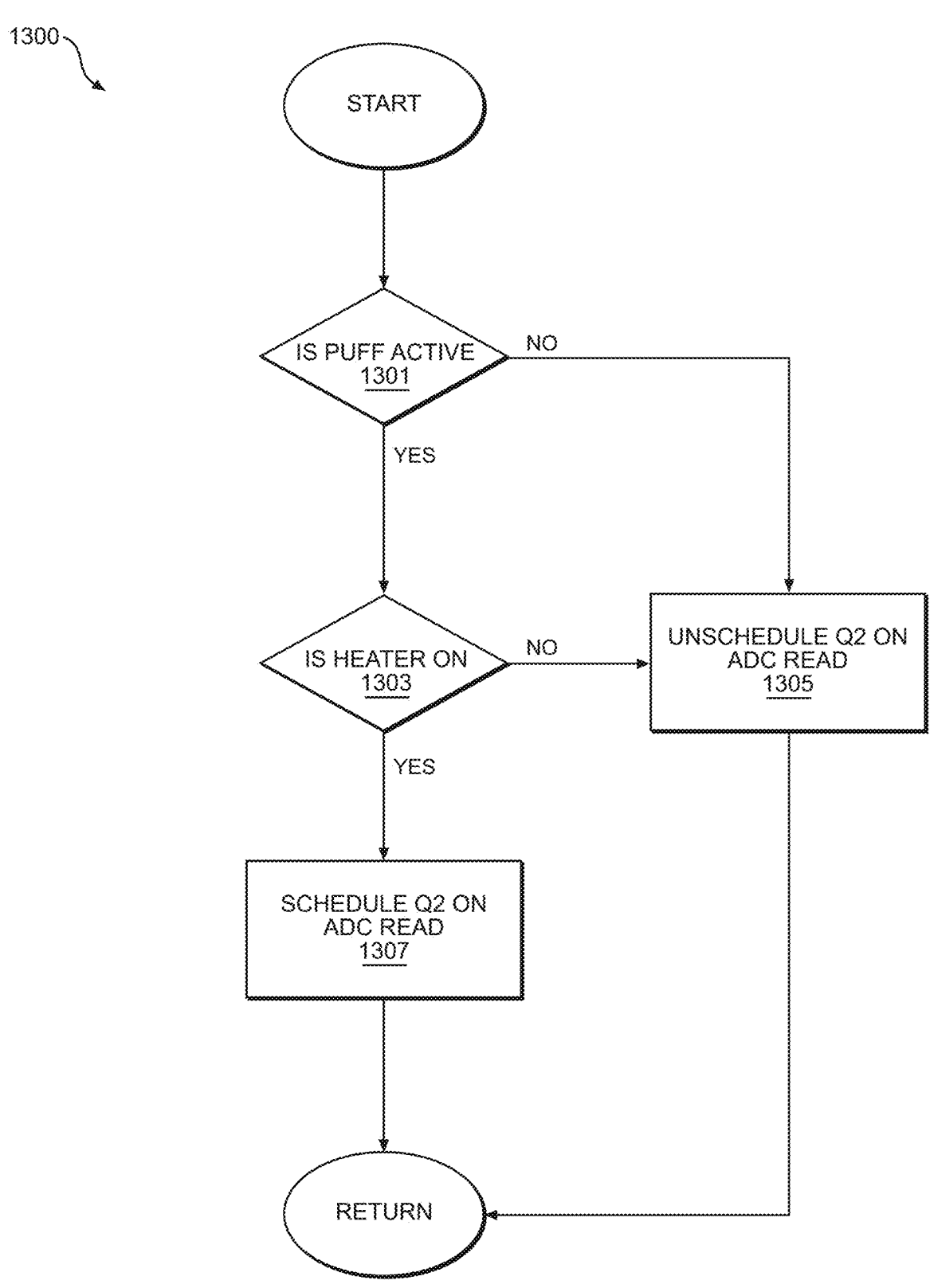
FIG. 13 is a block diagram illustrating a method of scheduling an Analog to Digital Converter (ADC) read to measure a resistance of a heating assembly included in an e-vaping device, in accordance with various example embodiments.

Referring next to FIG. 13, a method 1300 of scheduling an Analog to Digital Converter (ADC) read to measure a resistance of a heating assembly included in an e-vaping device will be discussed in accordance with various example embodiments. As illustrated by block 1203 a check is made to determine if a puff is active. The determination may be made by a microcontroller based on the output of a puff sensor, such as pressure sensor 810 (FIG. 8).

As illustrated by block 1303, a check is made to determine whether the heating assembly is turned on. Determining whether the heating assembly is turned on may include, in some example embodiments, making a determination based on the state of transistor Q1 911 (FIG. 9) and transistor Q2

913 (FIG. 9). As illustrated by block 1305, if a puff is not active, or if a puff is active but the heating element is not turned, transistor Q2 913 can be turned on outside of a scheduled time, and an ADC read may be performed. In at least some example embodiments, the ADC read is performed during periods of time transistor Q1 911 is off.

As illustrated by block 1307, if a puff is active and the heating assembly is on, and ADC read is performed during a scheduled on-time for transistor Q2 913 (FIG. 9).

Figure 14:
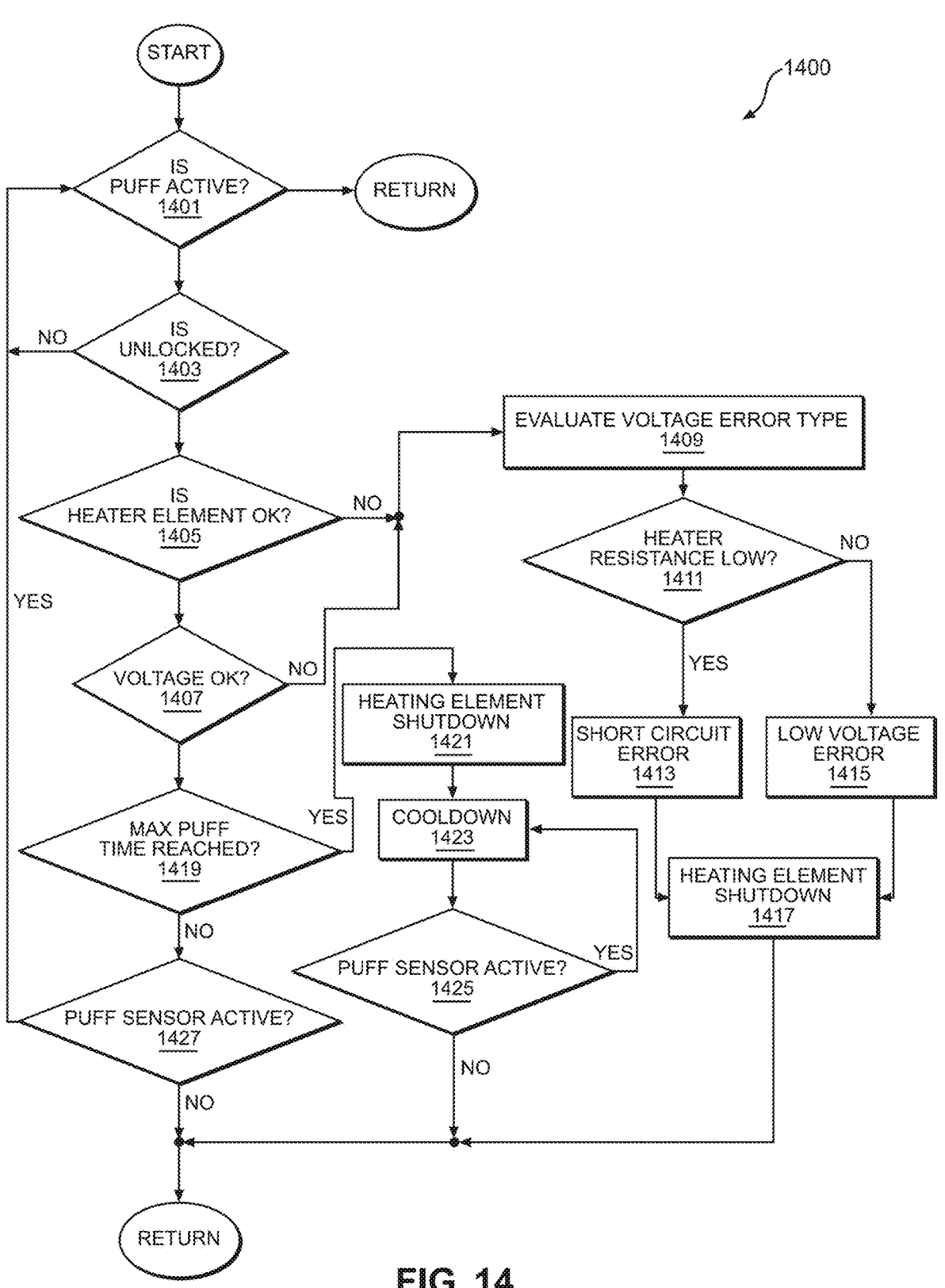
FIG. 14 is a block diagram illustrating a method of heater control, and short circuit/overcurrent protection in an e-vaping device, in accordance with various example embodiments.

Referring next to FIG. 14, a method 1400 of heater control and short circuit/overcurrent protection in an e-vaping device will be discussed in accordance with various example embodiments. In various example embodiments, method 1400 provides additional safety features to protect an e-vaping device from short circuit and overcurrent conditions. In some example embodiments, a short circuit or overcurrent event may be flagged if, during an ADC read event (transistor Q1 911 ON or transistor Q2 913 ON (FIG. 9)), either the resistance of the heating assembly or the loaded voltage of the battery exceed specified limits. In the event of a short circuit or overcurrent condition, the heating assembly may be turned OFF. In some example embodiments, the heating assembly may also be turned OFF if a short circuit or overcurrent event are not flagged, but transistor Q1 911 turn on time has exceeded a max puff duration. In some example embodiments, the puff sensor may remain active for all other times during a puff activation by adult consumer.

As illustrated by block 1401, a check is made to determine if the puff sensor is active. If not method 1400 returns to block 1401. If the check at block 1401 indicates that the puff sensor is active, method 1400 proceeds to block 1403, where a check is made to determine if the e-vaping device is unlocked If not method 1400 returns to block 1401.

As illustrated by block 1405, the heating assembly is checked, for example by performing an ADC read, as discussed with reference to FIG. 13, or otherwise verifying that the resistance of the heating assembly is within specified limits. As illustrated by block 1407, the voltage to the heating assembly is checked, for example by performing an ADC read, as discussed with reference to FIG. 13, or otherwise verifying that the loaded voltage of the battery is within specified limits. If the check at either block 1405 or 1407 falls outside of specified limits, the voltage error type is evaluated, as illustrated by block 1409.

As illustrated by block 1411, a check is made to determine whether the heater resistance is too low. If the heater resistance is too low, the error is flagged as a short circuit error, as shown by block 1413. If the heater resistance is not too low, the error may be flagged as a low voltage error, as shown by block 1415.

As illustrated by block 1417, in response either a short circuit error or a low voltage error, the heating assembly is deactivated.

As illustrated by block 1419, if the results of both block 1405 and 1407 indicate no errors, a check is made to determine if a maximum puff time has been reached. As illustrated by block 1421, if the maximum puff time has been reached, the heating assembly is deactivated, and a cooldown period begins, as illustrated by block 1423.

As illustrated by block 1425, activating the puff sensor during the cooldown period may, in some example embodiments, restart the cooldown period. In other example embodiments, however, attempting to activate the puff sensor during the cooldown period will not activate the heating assembly.

As illustrated by block 1427, if the maximum puff time has not been reached at block 19, the puff sensor remains active and method 1400 repeats.

Figure 15:
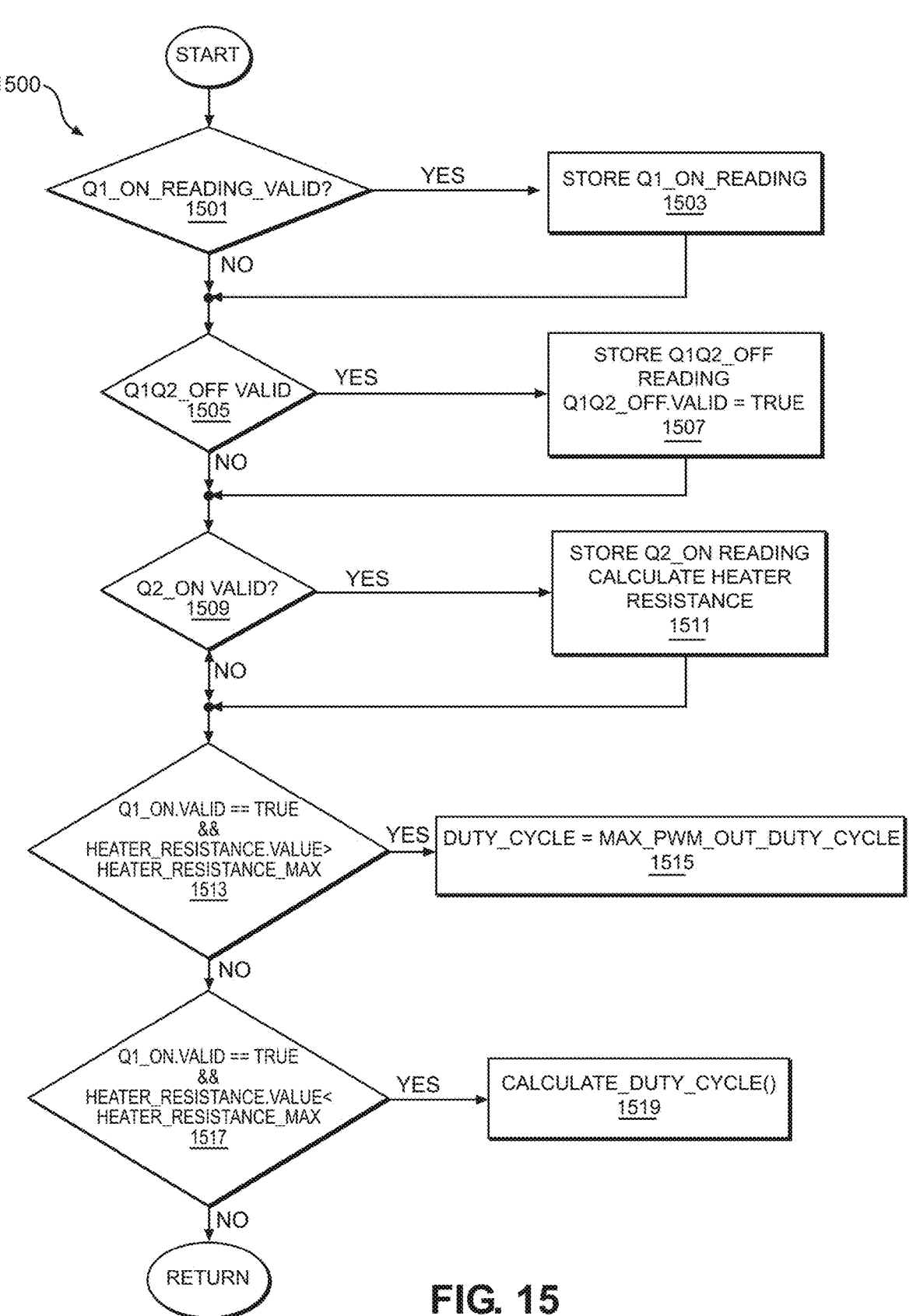
FIG. 15 is a block diagram illustrating a method of controlling a heating element duty cycle, in accordance with various example embodiments.

Referring next to FIG. 15 a method 1500 of controlling a heating element duty cycle will be discussed in accordance with various example embodiments. Refer to FIG. 9 for reference to Q1 (transistor Q1 911) and Q2 (transistor Q2 911) FIG. 15. In an example embodiment, method 1500 determines the duty cycle required to output the nominal power to be delivered to a heating assembly. After validation and three ADC measurements (Q1 ON measurement, Q1 OFF, Q2 OFF measurement, Q2 ON measurement) the firmware may calculate the duty cycle based on loaded and unloaded battery measurements, and atomizer resistance measurements, respectively. The duty cycle may be determined and adjusted during run time (puff activation by adult consumer). In some example embodiments, if the heater resistance is determined to be greater than a maximum heater resistance, no calculation is performed, but the max duty cycle may be applied, which could on some occasions deliver less than nominal power to heating assembly.

As illustrated by block 1501 a check is made to determine if a first ADC measurement, made with Q1 ON, is valid. If so, as illustrated by block 1503, the first ADC measurement is stored.

As illustrated by block 1505 a check is made to determine if a second ADC measurement, made with both Q1 and Q2 OFF is valid. If so, as illustrated by block 1507, the second ADC measurement is stored.

As illustrated by block 1509 a check is made to determine if a third ADC measurement, made with Q2 ON, is valid. If so, as illustrated by block 1511, the third ADC measurement is stored.

As illustrated by block 1513, a check is made to determine if both the following are true: 1) the first ADC measurement (Q1 ON) was valid; and 2) and the heater assembly resistance is greater than the maximum heater assembly resistance value. As illustrated by block 1515, if the result of the check at block 1513 is true, the duty cycle of heating assembly is set to the maximum PWM duty cycle.

As illustrated by block 1517, if the result of the check at block 1513 is false, a check is made to determine if both the following are true: 1) the first ADC measurement (Q1 ON) was valid; and 2) and the heater assembly resistance is less than the maximum heater assembly resistance value. As illustrated by block 1519, if the result of the check at block 1517 is true, the duty cycle of heating assembly calculated so that nominal power is provided to the heating assembly.

Figure 16:
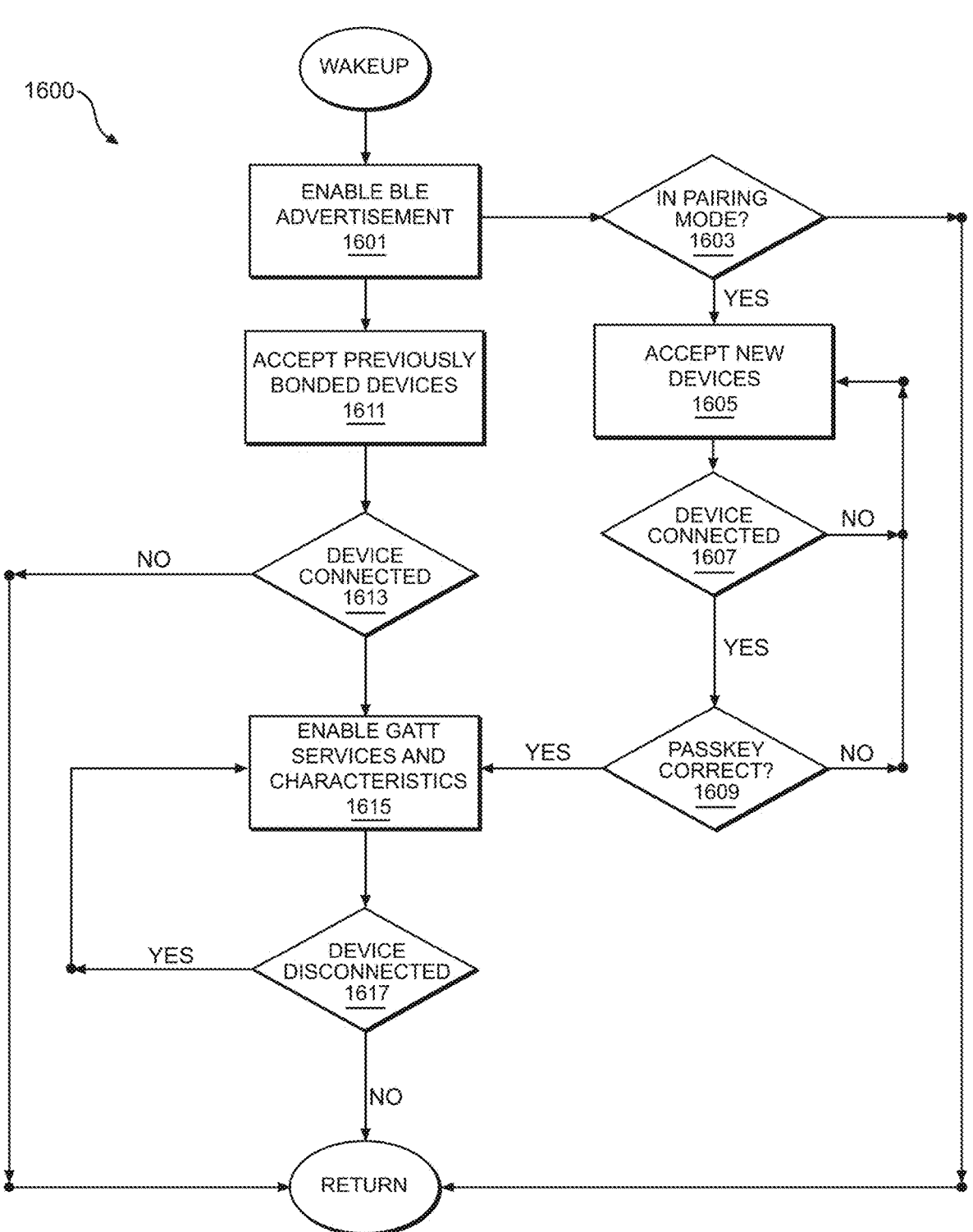
FIG. 16 is a block diagram illustrating a method of establishing wireless communication with an e-vaping device, in accordance with various example embodiments.

Referring next to FIG. 16 a method 1600 of establishing wireless communication with an e-vaping device will be discussed in accordance with various example embodiments. As illustrated by block 1601, upon wakeup an e-vaping device enables Bluetooth® Low Energy (BLE) advertisement. As illustrated by block 1603 a check is made at an adult consumer mobile device to determine if adult consumer mobile device is in pairing mode. If not, method 1600 ends.

As illustrated by block 1605, if the adult consumer mobile device is in pairing mode, the adult consumer mobile device will respond to the advertisement of the e-vaping device, and is ready to accept the e-vaping device as a paired device, pending completion of the pairing process.

As illustrated by block 1607, a check is made to determine if the e-vaping device is wirelessly connected to the adult consumer mobile device. If not, method 1600 returns to block 1605. If the e-vaping device is wirelessly connected, a passkey is exchanged. As illustrated by block 1609, a check is made to determine if the passkey exchange has been successfully completed. In response to successfully completing the passkey exchange, method 1600 moves to block 1615, where generic attribute (GATT) services are enabled on the e-vaping device and the adult consumer mobile device to allow exchange of available services and device characteristics. Additionally, data and other communications between an application running on the adult consumer mobile device and the e-vaping device may be conducted at this time.

Returning to block 1611, if the e-vaping device has been previously paired, or bonded, with the adult consumer mobile device, adult consumer mobile device attempts to connect to the e-vaping device. As illustrated by block 1613, if the e-vaping device successfully connects with the adult consumer mobile device, method 1600 proceeds to block 1615, where the e-vaping device and the adult consumer mobile device may exchange data.

As illustrated by block 1617, a check is made to determine if the e-vaping device has disconnected from the adult consumer mobile device. If not, the adult consumer mobile device and the e-vaping device may continue to exchange data, as illustrated by block 1615. Otherwise, method 1600 ends.

Figure 17:
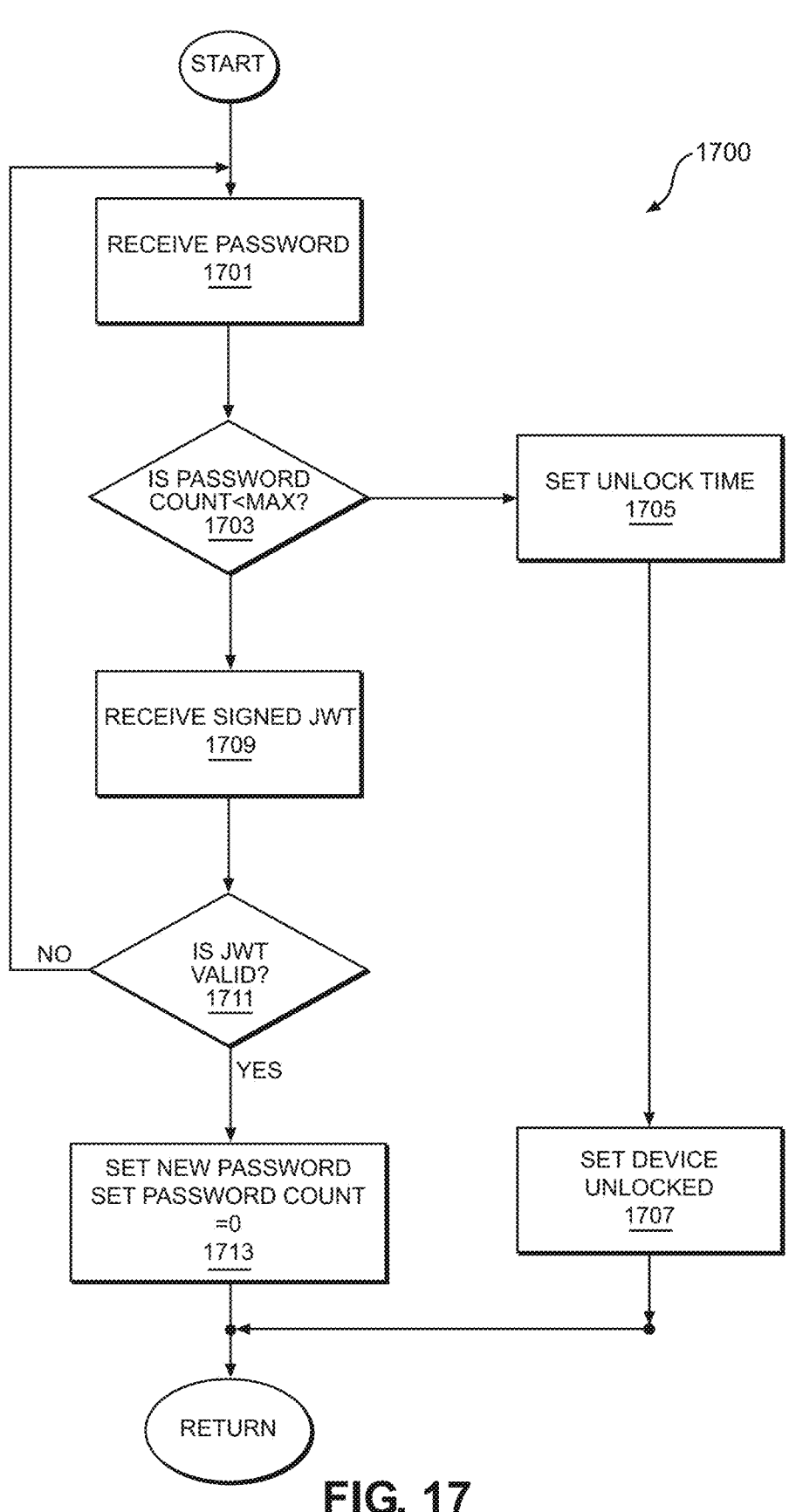
FIG. 17 is a block diagram illustrating a method of using an unlock timer to control access to a wireless e-vaping device, in accordance with various example embodiments.

Referring next to FIG. 17 a method 1700 of using an unlock timer to control access to a wireless e-vaping device will be discussed in accordance with various example embodiments. As illustrated by block 1701, an adult consumer application running on an adult consumer mobile device receives a login password from an adult consumer attempting to login to the adult consumer's account. As illustrated by block 1703, a check is made to determine whether a password count is less than a maximum password count. In at least one example embodiment, the password count represents the number of times an adult consumer has used the password to login to the adult consumer's account. As illustrated by block 1709, if the password count is less than the maximum password count, the adult consumer application receives a signed JSON Web Token (JWT), for example from a server on which the adult consumer's account is hosted. A check is made at block 1711 to determine if the signed JWT is valid. As illustrated by block 1713, a new password may be set, and the password counter may be reset.

If it is determined at block 1703 that the password count is greater than or equal to the maximum password count, method 1700 proceeds to block 1705. As illustrated by block 1705, an unlock time is set for the e-vaping device. In at least one example embodiment, an e-vaping device is locked at block 1705, and remains locked until the unlock time expires and the e-vaping device is set to an unlocked state at block 1707. In some example embodiments, at block 1705, a lock command may be sent to the e-vaping device, and a timer in the e-vaping device's microcontroller firmware may be set based on the unlock time.

Figure 18:
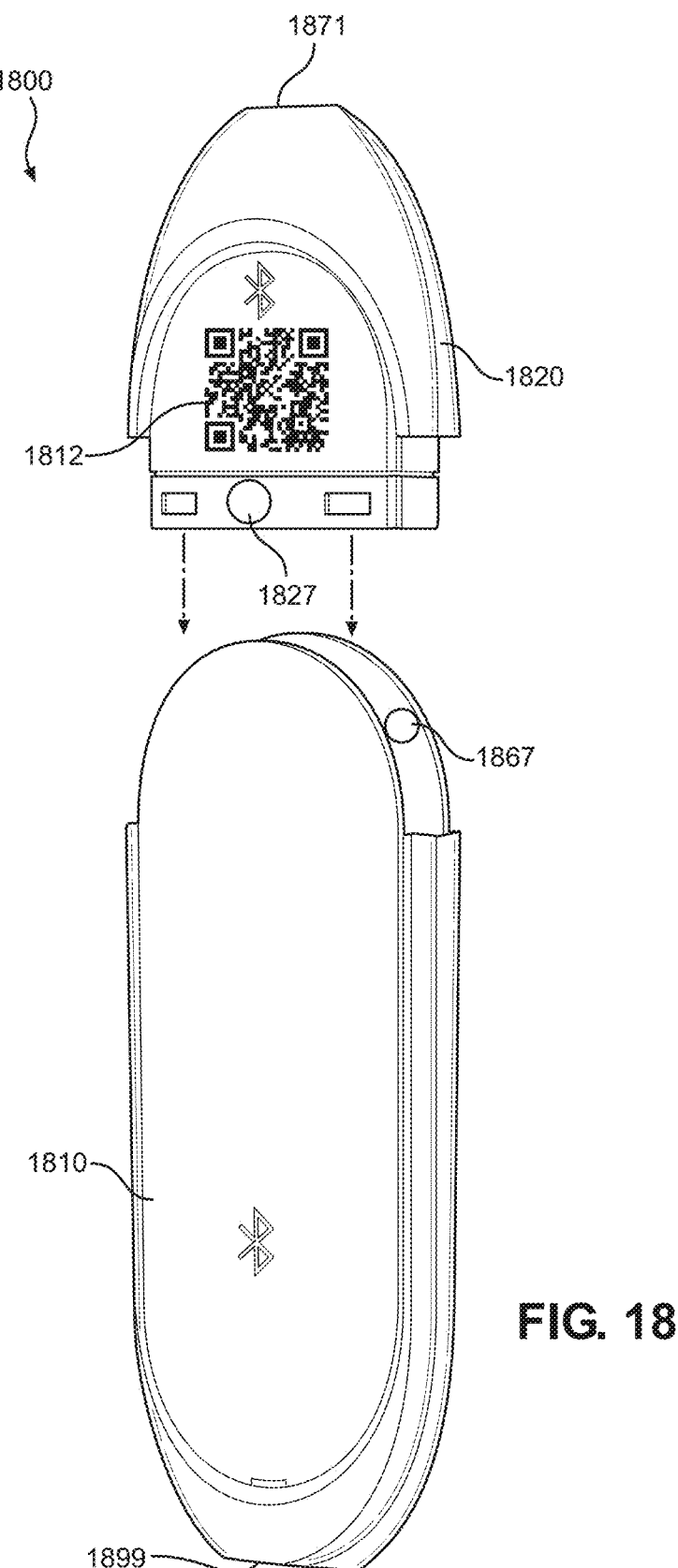
FIG. 18 is perspective view a reusable e-vaping assembly, in accordance with various example embodiments.

Referring next to FIG. 18, reusable e-vaping assembly 1800 will be discussed in accordance with various example embodiments. Reusable e-vaping assembly 1800 includes reusable e-vaping device 1810 and removable e-vaping cartridge 1820. In various embodiments, removable e-vaping cartridge 1820 is configured to dock with, or matingly engage with, reusable e-vaping device 1810. Removable e-vaping cartridge 1820 includes an internal reservoir pre-filled with a pre-vapor formulation, and an internal heating assembly used to convert the pre-vapor formulation into a vapor using power supplied by reusable e-vaping device 1810. In various example embodiments, removable e-vaping cartridge 1820 includes mouth end 1871, through which an adult e-vaping consumer may draw air when removable e-vaping cartridge 1820 is docked to reusable e-vaping device 1810. As used herein, a mouth end refers to an end of a housing, cover, or the like, from which a e-vaping adult consumer draws an inhalable dispersion. By way of contrast, a mouth end is fully integrated into a housing, cover, or the like, while a mouthpiece is an individually distinguishable item that is part of an e-vaping device. In some such example embodiments, reusable e-vaping device 1810 includes air inlet 1899, through which air is pulled into reusable e-vaping device 1810 in response to the adult e-vaping consumer's draw. Additional details regarding airflow and operation of the illustrated example embodiment of FIGS. 18 and 19 will be discussed subsequently.

In the illustrated embodiment, a QR code 1812 is indelibly marked on removable e-vaping cartridge 1820. As illustrated QR code 1812 encodes the following information: "ID Number 12987561A2456." In various embodiments, however QR code 1812 can also encode other manufacturing information, such as cartridge compatibility information, date and place of manufacture, content identification information, e.g. strength and flavoring information, or the like.

In various example embodiments, removeable e-vaping cartridge 1820 may optionally include an embedded RFID chip 1827, which may in some embodiments include a near-field communication chip, and/or a memory configured to store an onboard identifier identifying e-vaping cartridge 1820. RFID chip 1827 may be read by optional RFID reader 1867 included in reusable e-vaping device 1810. The onboard identifier stored in RFID chip 1827 is linked with QR code 1812 during manufacture of removeable e-vaping cartridge 1820.

Although FIG. 18 illustrates particular placement locations of RFID chip 1823 and RFID reader 1827, various example embodiments may employ different placements. Furthermore, in other example embodiments an optional contact reader (not illustrated) included in reusable e-vaping device 1810 may read an onboard cartridge identifier stored in a memory or other circuit included in removeable e-vaping cartridge 1820. Various types of memories, contact readers, and the like are well known to those of ordinary skill in the art.

Figure 19:
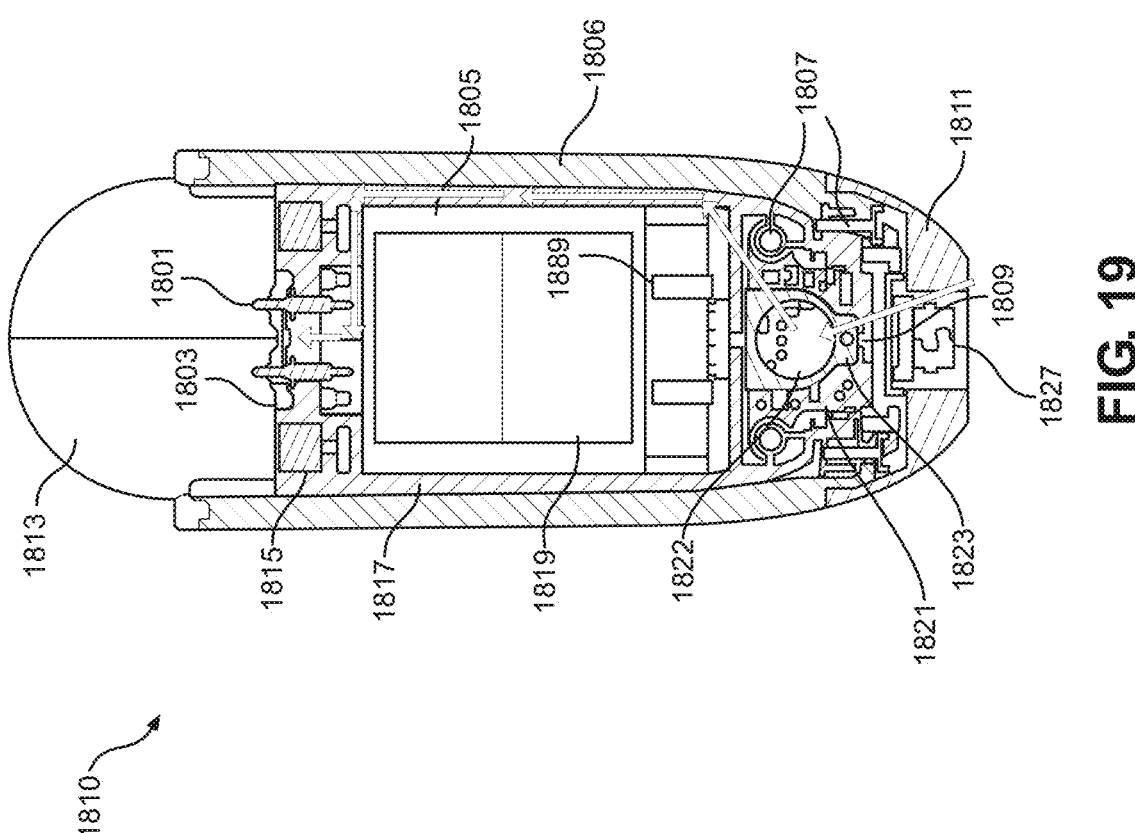
FIG. 19 is a diagram of internal components of a reusable e-vaping device illustrating, in accordance with various example embodiments.

Referring next to FIG. 19, internal components of a reusable e-vaping device 1810 will be discussed in accordance with various example embodiments. The illustrated example embodiment of reusable e-vaping device 1810 includes airflow sensor seal 1823 configured to form a seal about an airflow sensor/puff sensor 1822. In at least one example embodiment, airflow sensor/puff sensor may include an air-flow sensor as described in U.S. Pat. No. 9,072,321 issued on Jul. 7, 2015, the entire contents of which is incorporated herein by reference.

Various example embodiments of reusable e-vaping device 1810 may also include printed circuit board assembly (PCBA) 1821; LED cover 1809 covering an LED (not illustrated) mounted to PCBA 1821; screws 1807 fastening PCBA to housing 1806; battery holder 1817 mounted within housing 1806, and configured to hold battery cell 1805 with attached sponge adhesive 1819; magnets 1815 inserted into a cartridge engagement portion of housing 1806, and configured to magnetically engage a docked removable e-vaping cartridge (not shown in this view), device contact 1801 extending beyond a docking surface of the cartridge engagement portion of housing 1806, and configured to provide battery power to a docked removable e-vaping cartridge; an airway seal on the a docking surface of the cartridge engagement portion of housing 1806; a battery tube portion 1813 of housing 1806 configured to guide a removable e-vaping cartridge into a docking position and provide support for the removable e-vaping cartridge once docked; and a battery decoration on housing 1806 to identify a location of a universal serial bus connector 1827 used for battery recharging and wired communication with reusable e-vaping device 1810.

In various example embodiments, device contacts 1801 include POGO pins, which include a springing action allowing device contacts 1801 to firmly contact corresponding contacts in removable e-vaping cartridges (see FIG. 19). Device contacts 1801 of reusable e-vaping device 1810 may include long-reach POGO pins, allowing device contacts 1801 to make contact with recessed contacts included in removable e-vaping cartridges. In alternative example embodiments, device contacts 1801 may include shorter-reach POGO pins that are not long enough to reach far enough to reach recessed contacts included in removable e-vaping cartridges. In some implementations, however, the removable e-vaping cartridges may not be recessed, or at least not recessed as far, allowing reusable e-vaping devices employing the shorter-reach POGO pins to make contact.

Because of the spring/elastic nature of POGO pins, a reusable e-vaping device with long reach POGO pins may be used with removable e-vaping cartridges including recessed contacts, and with removable e-vaping cartridges including non-recessed (or less-recessed) contacts. By contrast, however, a reusable e-vaping device with shorter-reach POGO pins may be usable only with e-vaping cartridges including non-recessed (or less-recessed) contacts.

Figure 20:
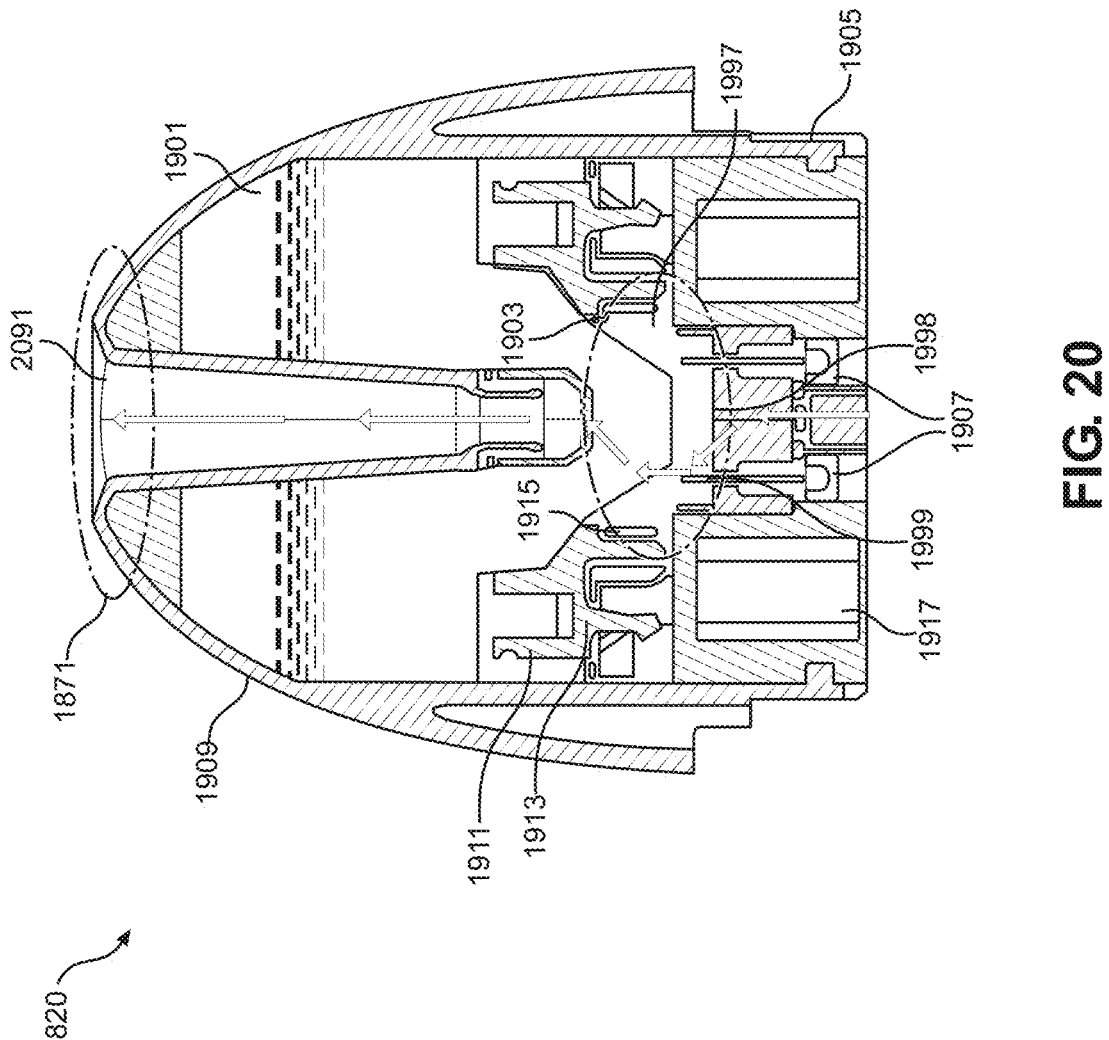
FIG. 20 is a diagram illustrating a removable e-vaping cartridge configured to be coupled to a reusable e-vaping device, in accordance with various example embodiments.

Referring next to FIG. 20, a removable e-vaping cartridge 1820 configured to be coupled to a reusable e-vaping device 1810 will be discussed in accordance with various example embodiments. The illustrated example embodiment of removable e-vaping cartridge 1820 includes a tank 1909 that includes reservoir 1901 holding a pre-vapor formulation; a tank seal 1911 configured to prevent the pre-vapor formulation from leaking from reservoir 1901 into undesired portions of removable e-vaping cartridge 1820; heating assembly 1903 configured to heat pre-vapor formulation to form an inhalable aerosol; heating assembly cover 1913 configured to cover heating assembly 1903 and assist in containing the pre-vapor formulation held in reservoir 1901; heating assembly seal 1915 configured to prevent liquid pre-vapor formulation from entering an airpath used to deliver the inhalable aerosol; heating assembly holder 1917 configured to hold heating assembly 1903 in place; heating assembly contacts 1907 configured to receive electrical power from a reusable e-vaping device when removable e-vaping cartridge 1820 is docked with the reusable e-vaping device 1810 (FIG. 18); and bottom cover 1905. Although heating assembly contacts 1907 are illustrated as being recessed, in other example embodiments heating assembly contacts 1907 may be non-recessed, or only slightly recessed.

In various example embodiments, heating assembly 1903 includes a porous ceramic body 1997 in contact with reservoir 1901, and an s-shaped heating conductive element 1998 inlaid in, or otherwise formed on or attached to a side of the porous ceramic body 1997 facing away from reservoir 1901. Heating assembly 1903 also includes heater posts 1999 protruding from, and extending within porous ceramic body 1997. Heater posts 1999 are electrically connected to heating element 1998. The portion of heater posts 1999 protruding from ceramic body are soldered, welded, crimped, or otherwise connected to heating assembly contacts 1907. A perspective view of heating assembly 1903 is provided in FIG. 39. In operation, pre-vapor formulation soaks into porous ceramic body 1997. When power is applied to heating element 1998 via heater posts 1999, pre-vapor formulation that has soaked into porous ceramic body 1997 is vaporized to form an inhalable dispersion.

Referring now to FIGS. 18, 19, and 20 in combination, further details of operation of an example embodiment of reusable e-vaping assembly 1800, which includes reusable e-vaping device 1810 and docked removable e-vaping cartridge 1820, will be discussed. In at least one example embodiment, an adult e-vaping consumer draws air through mouth end 1871 of removable e-vaping cartridge 1820 when it is docked to reusable e-vaping device 1810. In the following description, airflow is illustrated by the white arrows in FIGS. 19, and 20. In the illustrated example embodiment, the e-vaping adult's draw through mouth end 1871 pulls air into air inlet 1899 near the bottom of reusable e-vaping device 1810, and is guided by airflow sensor seal 1823 over a sensing portion of airflow sensor/puff sensor 1822, through an air channel formed between housing 1806, and into a chamber below heating assembly 1903. A vapor collection channel provides a fluid connection between the chamber below heating assembly 1903 to vapor delivery channel 2091 having an outlet at mouth end 1871. The vapor collection channel is not visible in FIG. 20 because of the cross section, but generally follows the white arrows around heating assembly 1903. In various example embodiments, the vapor collection channel loops both into and out of the page, guiding air around heating assembly 1903, where the inhalable dispersion is entrained in the air, and into vapor delivery channel 2091.

Because airflow sensor seal 1823 substantially or fully isolates a sensing portion of airflow sensor/puff sensor 1822 from atmospheric pressure, the flow of air over the sensing portion of airflow sensor/puff sensor 1822 causes a negative pressure to develop, activating airflow sensor/puff sensor 1822. If reusable e-vaping device 1810 and docked removable e-vaping cartridge 1820 are unlocked for use, as disclosed herein, when airflow sensor/puff sensor 1822 is activated, airflow sensor/puff sensor 1822 provides an electrical signal to processing circuitry (located on an underside of PCBA 1821 in FIG. 19), as discussed elsewhere herein. Based on the signal from airflow sensor/puff sensor 1822, the processing circuitry controls power flowing from battery cell 1805, through battery contacts 1889, through wires (not illustrated in this view), through device contacts 1801, into heating assembly contacts 1907 of docked removable e-vaping cartridge 1820, and finally to heating element 1998 of heating assembly 1903. When power is applied, heating element 1998, it heats pre-vapor formulation that has soaked into porous ceramic body 1997 to form an inhalable dispersion. The inhalable dispersion enters the airpath as the air flows through the chamber below heating assembly 1903.

Figure 21:
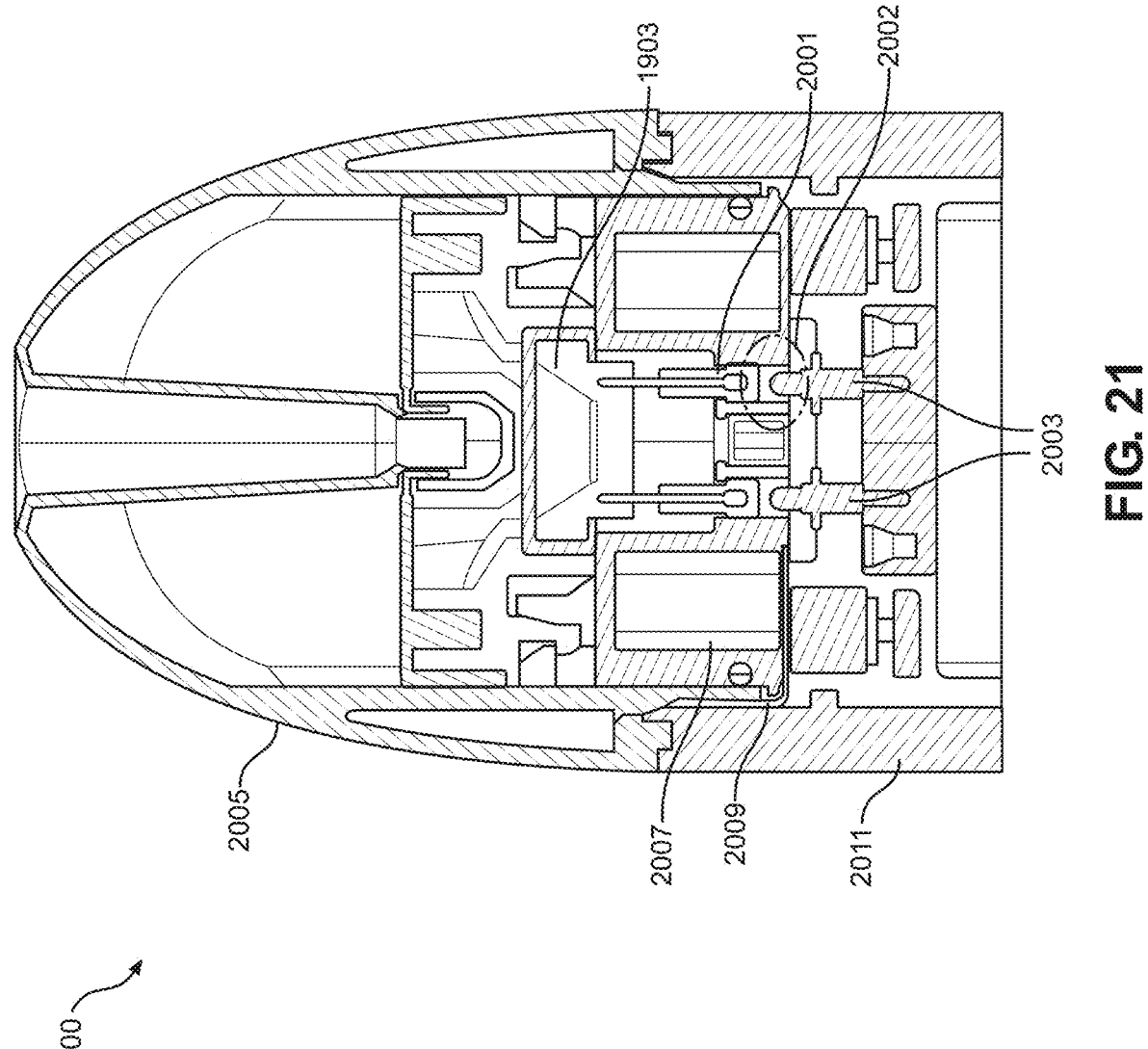
FIG. 21 is a diagram illustrating electrical connections between a reusable e-vaping device and a removable e-vaping cartridge docked with the reusable e-vaping device, in accordance with various example embodiments.

Referring next to FIG. 21, electrical connections between reusable e-vaping device 2011 and a removable e-vaping cartridge 2005 docked with reusable e-vaping device 2011 will be discussed in accordance with various example embodiments. In the illustrated example embodiment, reusable e-vaping assembly 2000 includes removable e-vaping cartridge 2005 docked with reusable e-vaping device 2011. Electrical connections between reusable e-vaping assembly 2000 and removable e-vaping cartridge 2005 are formed by device electrical contacts 2003 contacting cartridge electrical contacts 2001 during a period of time removable e-vaping cartridge 2005 is docked with reusable e-vaping device 2011. Note that a cartridge engagement portion of a housing of e-vaping device 2011 engages bottom cover 2009 of removable e-vaping cartridge 2005. In various example embodiments described herein, power supplied to device electrical contacts 2003 is controlled by circuitry (not illustrated) included in reusable e-vaping device 2011, and is delivered to the heating assembly 1903 via cartridge electrical contacts 2001.

In various example embodiments, cartridge electrical contacts 2001 included in different models of removable e-vaping cartridges may be recessed to different degrees, so that a particular model of removable e-vaping cartridges is compatible with corresponding models of reusable e-vaping devices, and incompatible with others. For example, in the illustrated example embodiment, removable e-vaping cartridge 2005 is incompatible with reusable e-vaping device 2011 because of air gap 2002 resulting from cartridge electrical contacts 2001 being recessed to prevent device electrical contacts 2003 from making electrical contact. In some example embodiments, device electrical contacts 2003 may be recessed instead of cartridge electrical contacts 2001 being recessed.

Figure 22:
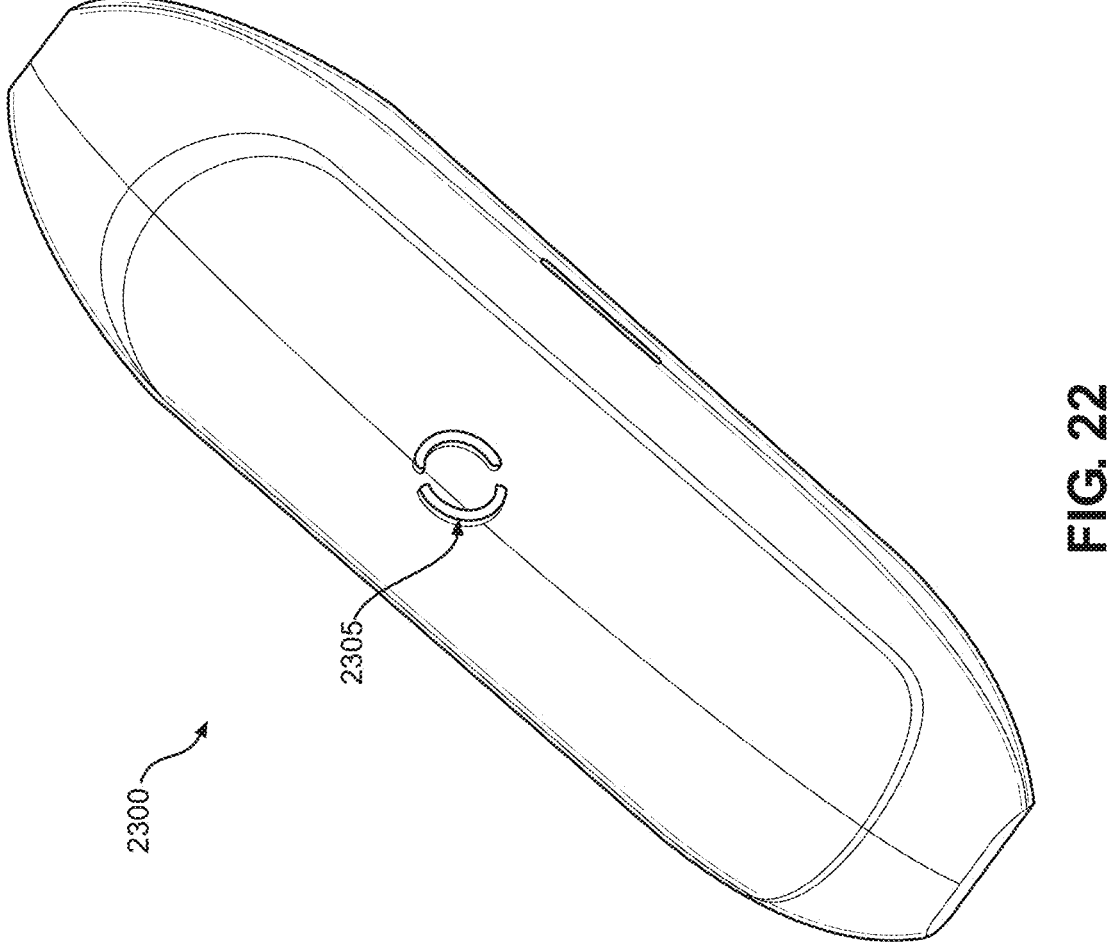
FIG. 22 is a perspective view of a disposable e-vaping device, in accordance with various example embodiments.
Figures 24, 25:
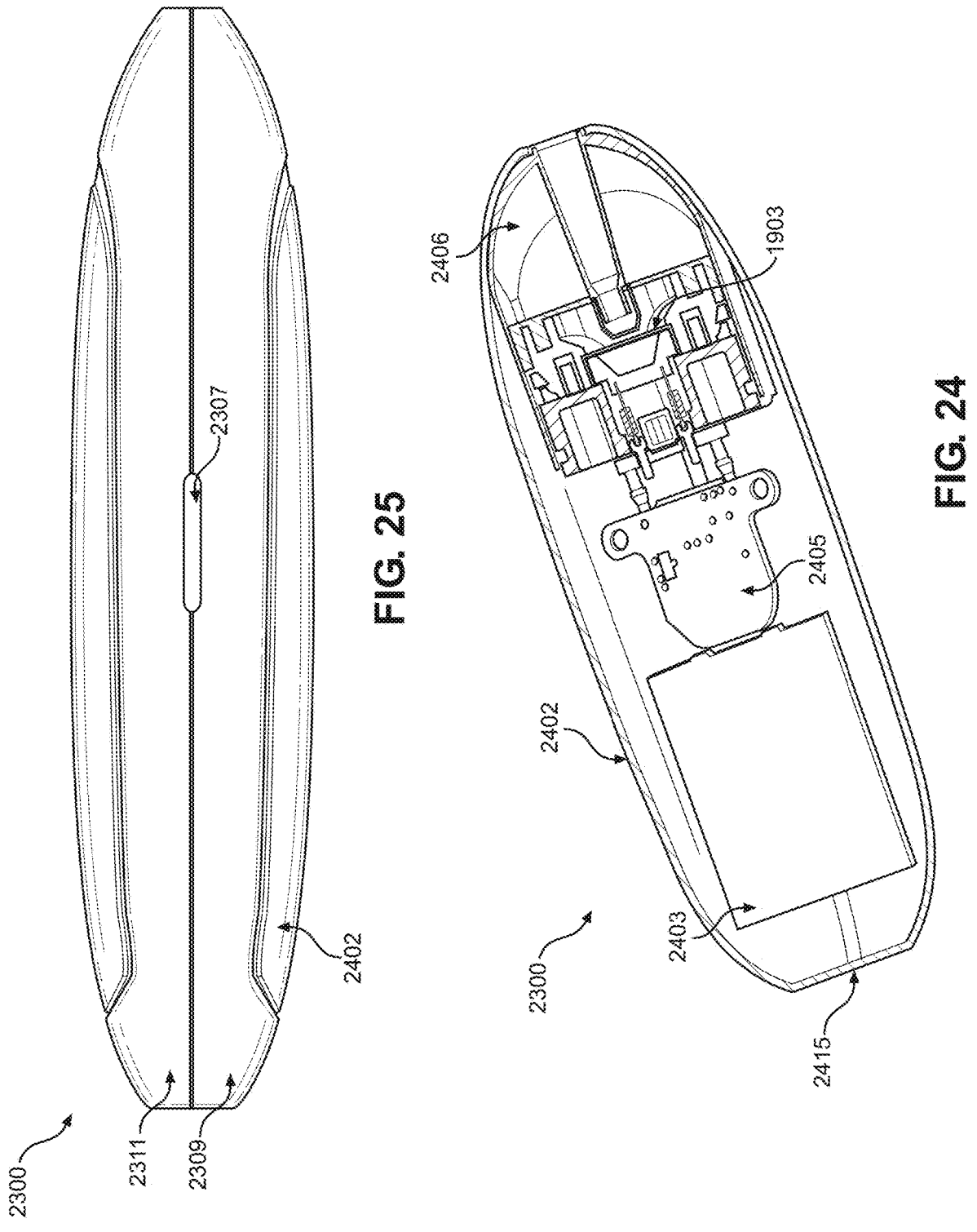
FIG. 24 is a perspective cutaway view of a disposable e-vaping device illustrating internal components housed in the disposable e-vaping device, in accordance with various example embodiments.
FIG. 25 is an exploded view of the disposable e-vaping device including a highly multi-functional seal, in accordance with various example embodiments.
Figure 25:
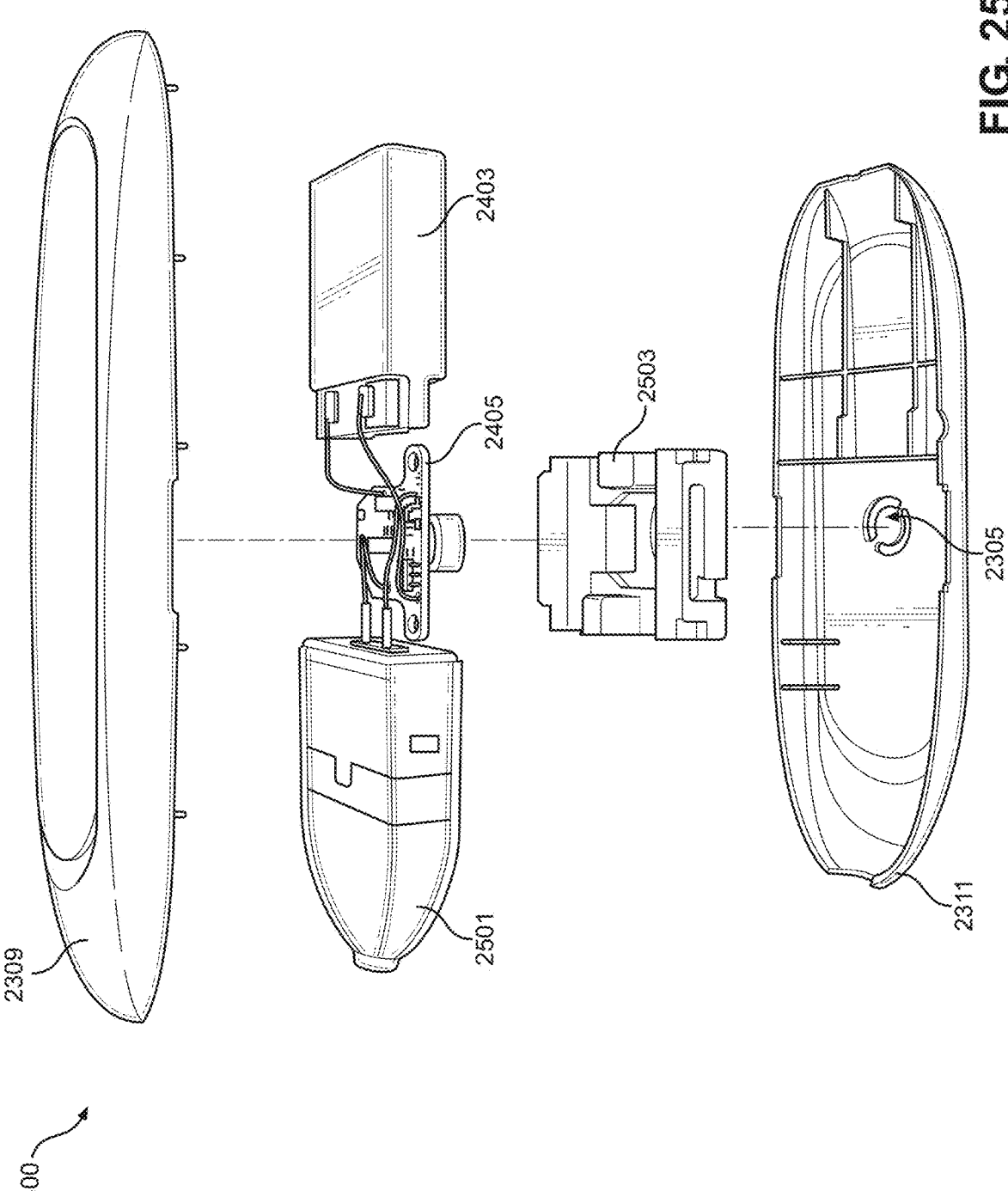

FIGS. 22, 23, and 24 illustrate example embodiments of a clamshell-type wireless disposable e-vaping device, so named because of its shape. A disposable e-vaping device, such as disposable e-vaping device 2300, in various example embodiments, provides the same functionality provided by a reusable e-vaping device docked with a removable e-vaping cartridge. However, in the case of a disposable e-vaping device, the consumable is enclosed in the same housing used to house the e-vaping battery and heating circuitry. Furthermore, in disposable e-vaping devices the consumable is included in the disposable e-vaping device during manufacture, and is not easily replaced by the adult e-vaping consumer.

Referring next to FIG. 22 a disposable e-vaping device 2300 will be discussed in accordance with various example embodiments. Disposable e-vaping device 2300 includes visual display indicator 2305 is shown on a top portion of disposable e-vaping device 2300, but other example embodiments may use different locations. In various example embodiments, visual display indicator 2305 includes a window and an internal LED. The window permits light generated by the internal LED to be viewable outside disposable e-vaping device 2300. In various example embodiments, the visual display indicator 2305 provides visual indications regarding one or more statuses of disposable e-vaping device 2300. For example, visual display indicator 2305 may glow or flash green to indicate an unlocked status, glow or flash red to indicate a locked status, glow or flash yellow in response to detection of a low liquid condition, flash a predetermined pattern or sequence of colors to provide diagnostic codes in response to detection of an error condition, or the like.

Referring next to FIG. 23 a disposable e-vaping device will be discussed in accordance with various example embodiments. In the illustrated example embodiment, disposable e-vaping device 2300 includes a top half 2311 of a clamshell housing 2402, a bottom half 2309 of clamshell housing 2402, and an air inlet 2301 at an intersection of top half 2311 and bottom half 2309. In at least one example embodiment a second air inlet (not illustrated) may be included on the side of e-vaping device 2300 opposite from air inlet 2301. In other embodiments, air inlet 2307 may be positioned elsewhere on the clamshell housing 2402, and/or a different number of air inlets may be provided.

Referring next to FIG. 24, internal components housed in a disposable e-vaping device will be discussed in accordance with various example embodiments. In the illustrated example embodiment, disposable e-vaping device 2300 includes battery 2403, a printed circuit board assembly (PCBA) 2405, heating assembly 1903, and e-liquid chamber 2406 storing a pre-vapor formulation. In example embodiments, e-liquid chamber 2406 may be referred to as a tank. In various example embodiment, e-liquid chamber 2406 be implemented a two distinct chambers, or as a divided chamber having two or more interconnected reservoirs. Also illustrated in FIG. 24 is battery vent 2415, which may serve as an atmospheric pressure reference in addition to providing battery venting.

Referring next to FIG. 25 a disposable e-vaping device 2300 including a highly multi-functional seal 2503 will be discussed in accordance with various example embodiments. In the illustrated example embodiment, disposable e-vaping device 2300 includes bottom half of clamshell housing 2309, top half of clamshell housing 2311, battery 2403, PCBA 2405, on which processing circuitry such as microcontroller 509 (FIGS. 6A and 6B) and a puff sensor may be mounted, internal (non-consumer-replaceable) consumable 2501, and highly multi-functional seal 2503.

In at least some example embodiments, highly multi-functional seal 2503 provides functionality that would otherwise be provided by multiple different components, allowing other clamshell components to be significantly defeatured. Additionally, highly multi-functional seal 2503 may allow increased ease of inspection and improved quality control by reducing the distribution of critical design features from a larger number of different parts to a lesser number of parts. Functions that may be performed by highly multi-functional seal 2503 include, but are not limited, to creating an airflow path separated from a battery compartment, helping to support and align other components during assembly, actings as a vibration dampener for the PCBA during an ultrasonic welding operation used to join the top half of clamshell housing 2311 to the bottom half of clamshell housing 2309 during manufacturing, serve as a light pipe for light generated by an internal LED (not illustrated) positioned on PCBA 2405 to reach window 2305, and/or provide e-liquid traps to help prevent e-liquid migration to pressure sensor.

Figure 26:
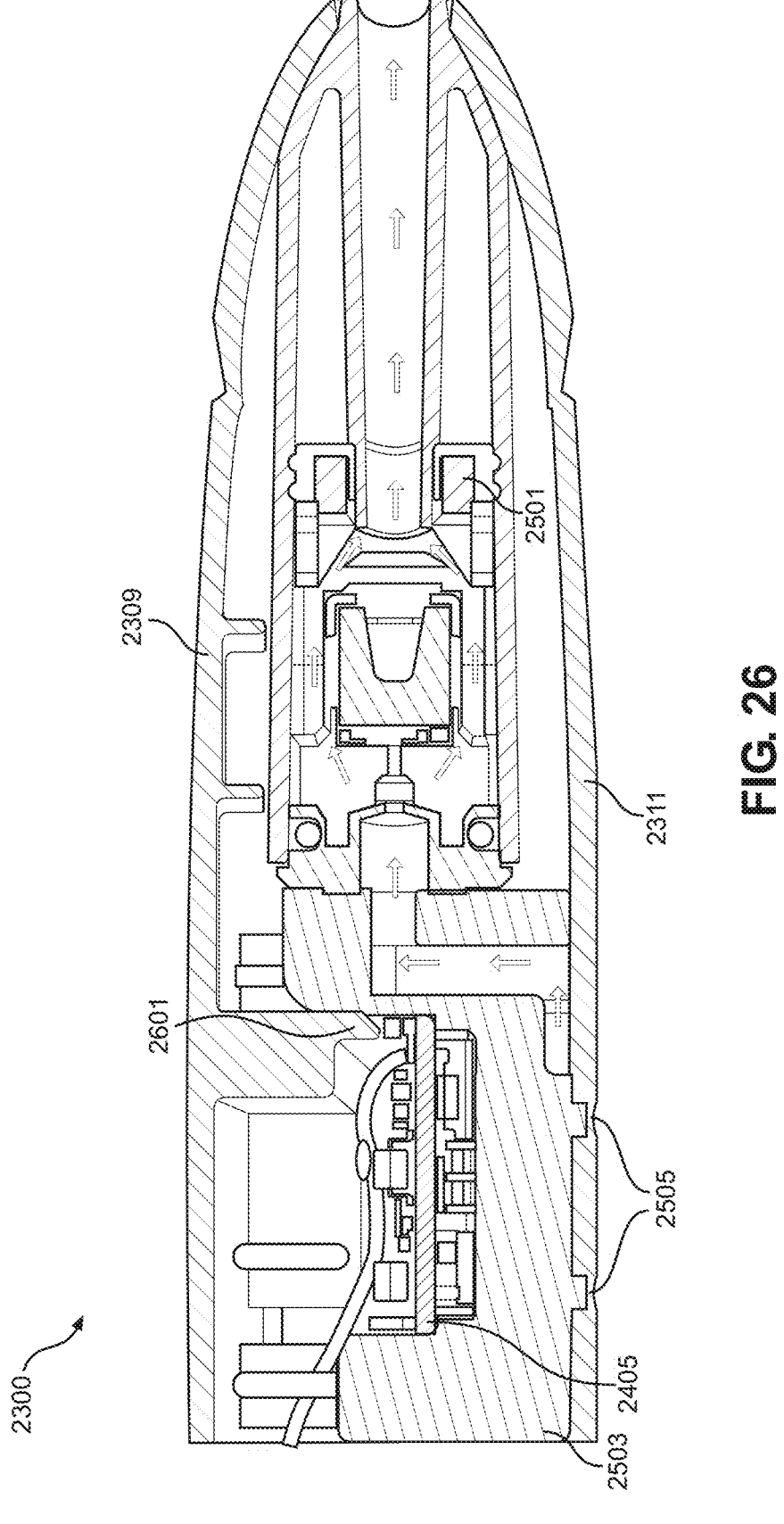
FIG. 26 is a cutaway view of the disposable e-vaping device illustrating interaction of a highly multi-functional seal with portions of an e-vaping device clamshell case, in accordance with various example embodiments.

Referring next to FIG. 26 interaction of a highly multi-functional seal 2503 with portions of a clamshell case of disposable e-vaping device 2300 will be discussed in accordance with various example embodiments. In the illustrated example embodiment, highly multi-functional seal 2503 is formed of a translucent silicone, and passes light from an LED mounted on PCBA 2405 to window 2305, thereby functioning as a light-pipe. An alignment rib 2601 formed on the clamshell housing cooperates with highly multi-functional seal 2503 to seal an interface with consumable 2501. Highly multi-functional seal 2503 also provides desired routing of airflow away from a battery housing (not illustrated outside and to the left of highly multi-functional seal 2503.

Figure 27:
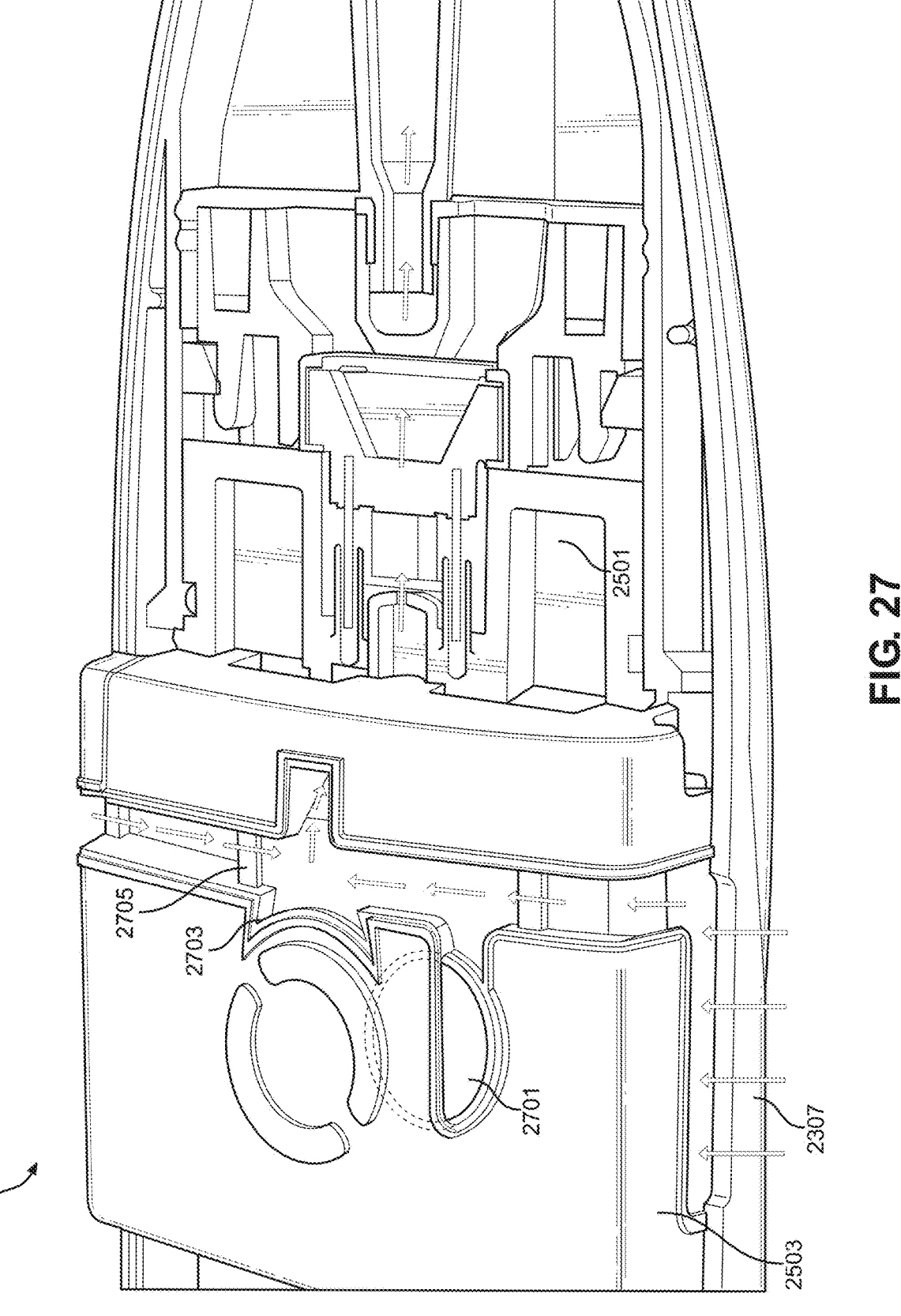
FIG. 27 is a perspective view of a highly multi-functional seal, in accordance with various example embodiments.

Referring next to FIG. 27, a highly multi-functional seal 2503 included in a included in disposable e-vaping device 2300 will be discussed in accordance with various example embodiments. In various example embodiments air flows into air inlets on both sides disposable e-vaping device 2300, and is channeled by highly multi-functional seal 2503 into a negative pressure zone by a puff sensor 2701, and into consumable 2501, bypassing the battery chamber (not illustrated).

In the illustrated example embodiment, highly multi-functional seal 2503 includes choke ribs 2705, which restrict airflow in a region around puff sensor 2701 to create a higher negative pressure area for sensor activation. Highly multi-functional seal 2503 may also include e-liquid traps 2703 to help prevent e-liquid migration to the puff sensor.

Figure 28:
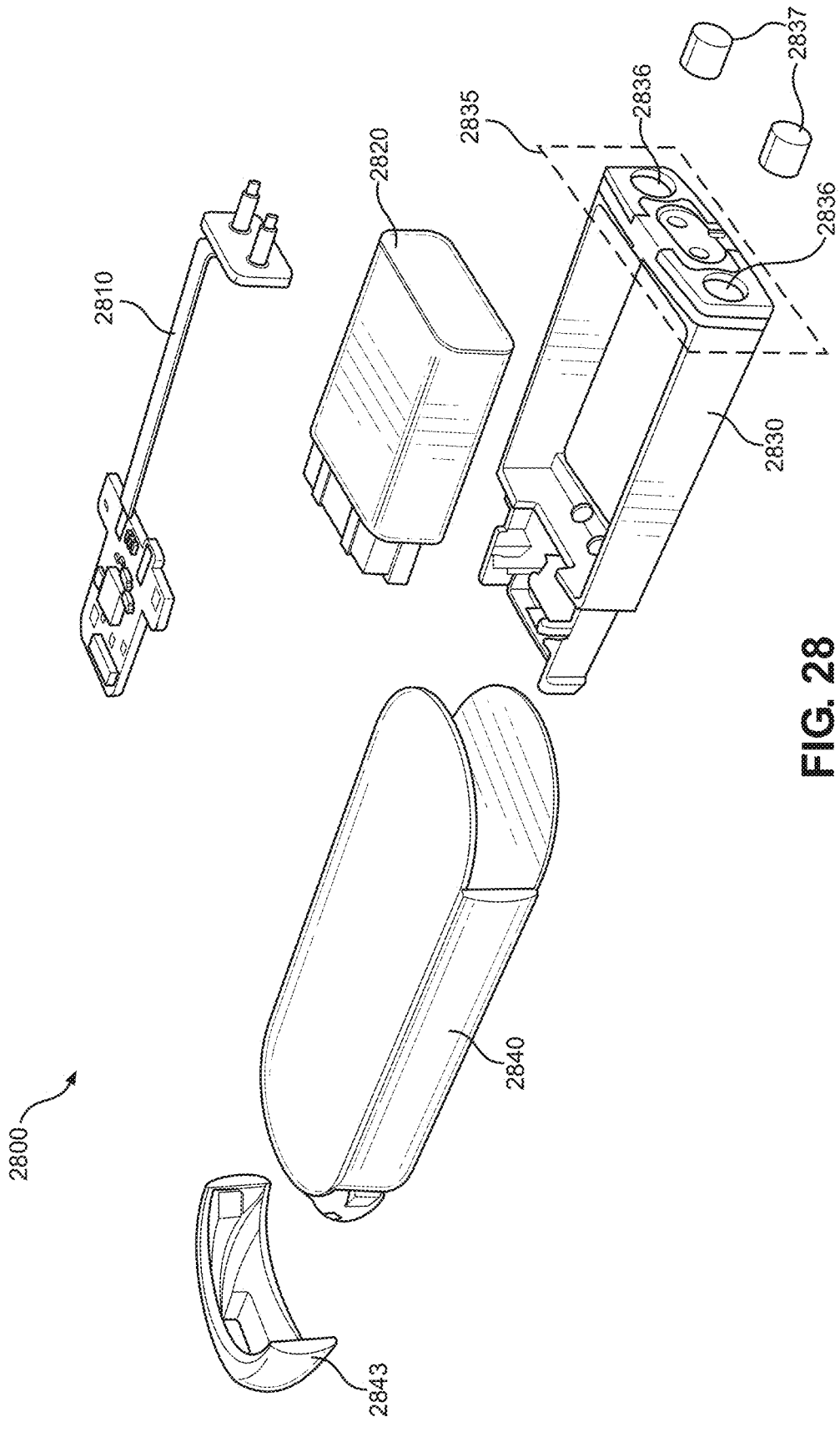
FIG. 28 is an exploded view of a reusable e-vaping device including a rigid-flex printed circuit board assembly (PCBA), in accordance with various example embodiments.

Referring next to FIG. 28 a reusable e-vaping device 2800 including a rigid-flex printed circuit board assembly (PCBA) 2810 will be discussed in accordance with various example embodiments. In various example embodiments, the use of Rigid-flex printed circuit board assemblies (PCBAs) allows hardware systems housed within reusable and/or disposable e-vaping devices to be distributed within the e-vaping device (s). In some example embodiments, distributing the hardware system individually soldered wires to be replaced with low profile, robust electrical connections. For example, use of a rigid flex PCBA allows for the direct connection of pogo pins to the rigid surface of the PCBA, instead of being cantilevered and unsupported. In some example embodiments, the battery is soldered directly to the PCBA in a way that is more rigid than conventional wire routing techniques. The use of the rigid flex design may also allow increased PCBA real estate in the same overall device footprint. The thermal management of the rigid flex PCBA may be increased as well in comparison with other PCBA types.

In the illustrated example embodiment, reusable e-vaping device 2800 includes rigid-flex PCBA 2810, to which various circuitry is mounted, including a wireless enabled microcontroller in some example embodiments; battery 2820; and battery holder 2830, which may include a frame having a cartridge engagement portion 2835 at one end. Cartridge engagement portion 2835 is configured to engage a removable e-vaping cartridge (not illustrated) docked with reusable e-vaping device 2800. In some example embodiments cartridge engagement portion 2835 includes openings 2836 to receive magnets 2837, which may be used to assist in holding docked removable e-vaping cartridges securely in place. In various embodiments reusable e-vaping device 2800 also includes housing 2840, which houses battery holder and end cover 2843.

Figure 29:
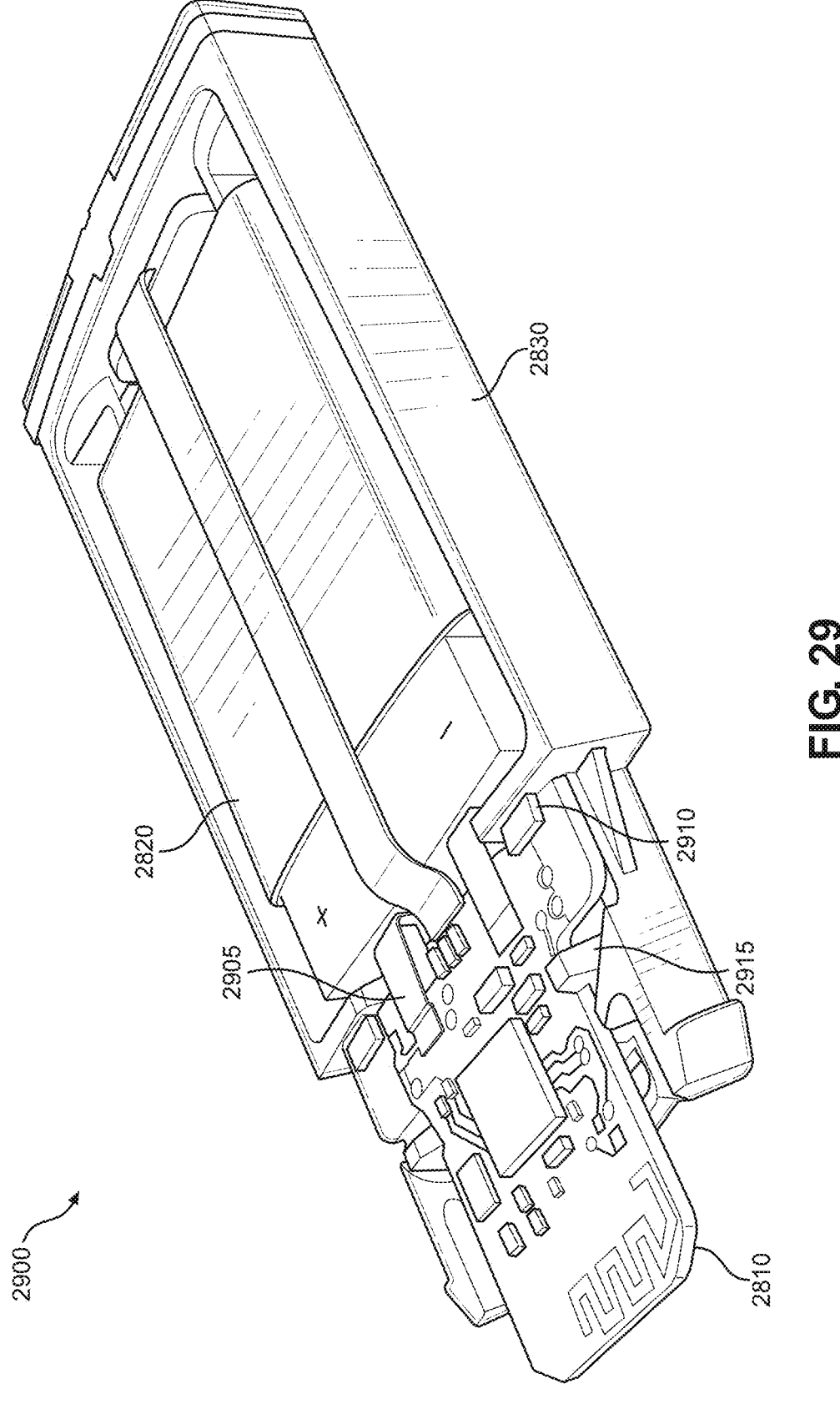
FIG. 29 is perspective view of an assembled battery holder, in accordance with various example embodiments.

Referring next to FIG. 29 an assembled battery holder 2900 will be discussed in accordance with various example embodiments. In the illustrated example embodiment, assembled battery holder 2900 includes battery holder 2830; rigid-flex PCBA 2810, which is held in place by molded tabs 2910 and 2915; and battery 2820 including battery tabs 2950 soldered to rigid-flex PCBA 2810.

Figure 30:
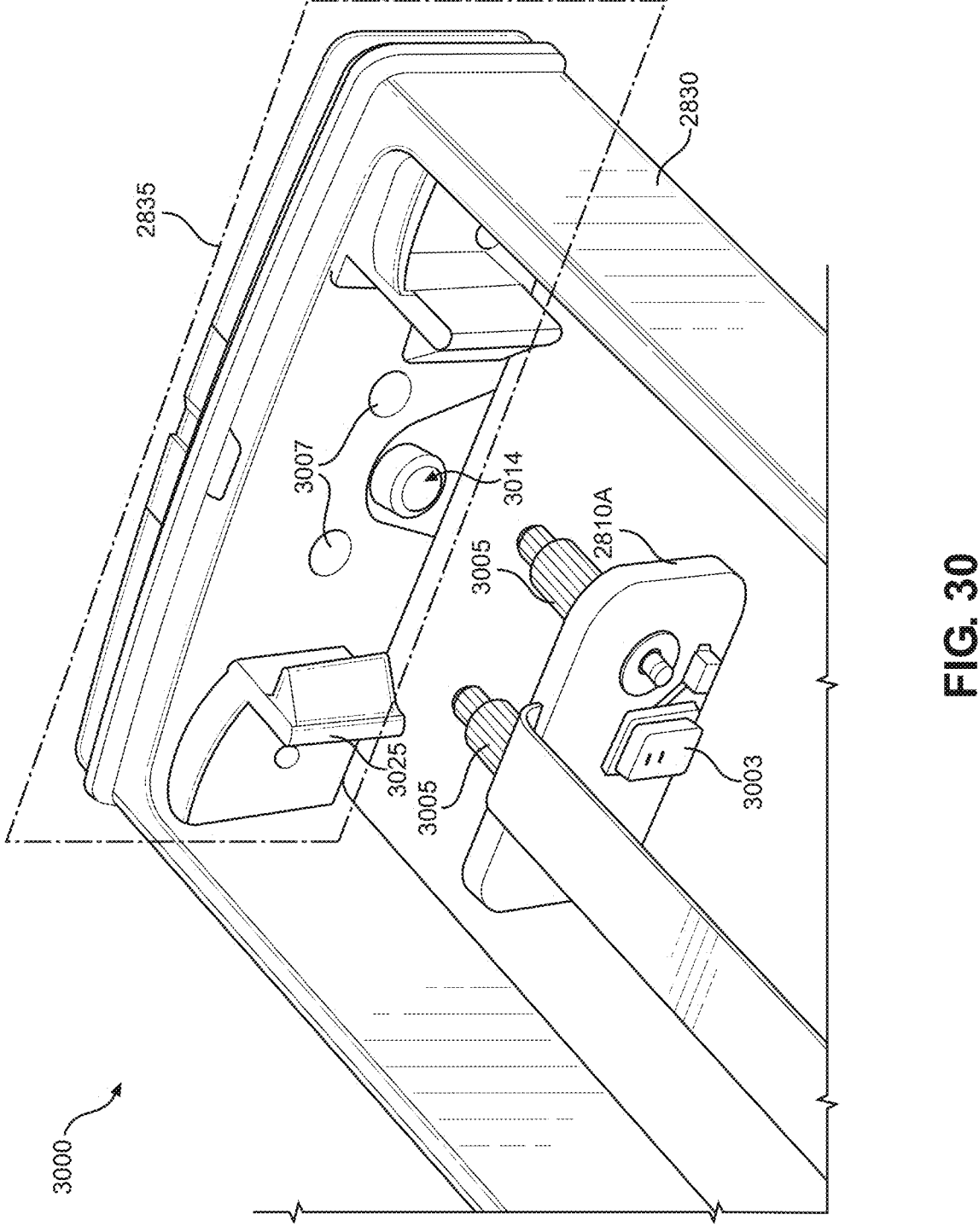
FIG. 30 is an exploded view illustrating a front portion of a rigid flex PCBA aligned for attachment to a cartridge engagement portion of a reusable e-vaping device, in accordance with various example embodiments.

Referring next to FIG. 30, a front portion of a rigid flex PCBA aligned for attachment to a cartridge engagement portion of a reusable e-vaping device will be discussed in accordance with various example embodiments. In various example embodiments, a rigid front portion 2810a of a rigid-flex PCBA includes a MEMS sensor 3003 mounted on a back side of the PCBA over an opening (not illustrated) aligned with a negative pressure port 3014 extending through cartridge engagement portion 2835. Pogo pins 3005, which provide an electrical connection to docked removable e-vaping cartridges (not illustrated), are mounted on rigid front portion 2810a of the rigid-flex PCBA.

Once assembled, pogo pins 3005 will extend through pin openings 3007 in cartridge engagement portion 2835 to protrude beyond a outer surface of the cartridge engagement portion 2835, and negative pressure port 3014 will provide a sealed airpath from MEMS sensor 3003 to the outer surface of the cartridge engagement portion 2835. In the illustrated example embodiment, battery holder 2830 includes molded snap locks that hold rigid front portion 2810a of a rigid-flex PCBA in a fixed position relative the cartridge engagement portion of the battery housing.

Figure 31:
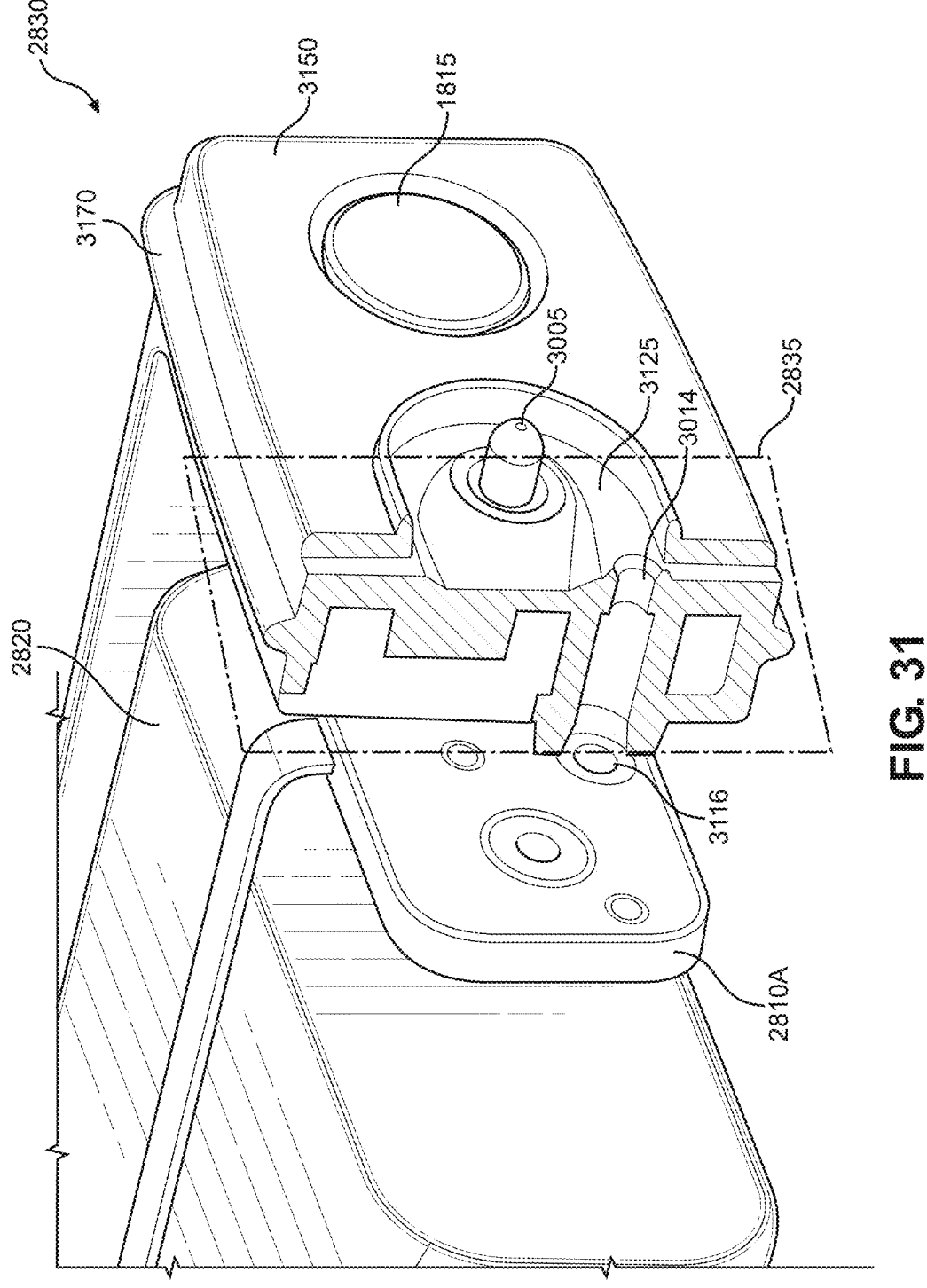
FIG. 31 is a partial cutaway perspective view is a partial cutaway perspective view of a cartridge engagement portion of a reusable e-vaping device, in accordance with various example embodiments.

Referring next to FIG. 31, is a partial cutaway perspective view of a cartridge engagement portion 2835 of battery holder 2830 included in a reusable e-vaping device, in accordance with various example embodiments. In the illustrated example embodiment, cartridge engagement portion 2835 has a cartridge-facing side 3150 configured to mate with a removable cartridge (not illustrated). Cartridge engagement portion 2835 includes magnet 1815 and airway seal 3170, which is configured to form a seal between an air path on the cartridge-facing side 3150 of cartridge engagement portion 2835 and battery 2820. Airway seal 3170 includes an opening through which pogo pin 3005 extends, a negative pressure port 3014, and an excess fluid catch 3125. Negative pressure port 3014 forms a sealed airpath to opening 3116 in rigid front portion 2810a of a rigid-flex PCBA, providing an air path allowing a MEMS sensor (not illustrated) on the back of rigid front portion 2810a to sense negative pressure present at the cartridge-facing side 3150 of cartridge engagement portion 2835. Power connector P1 on rigid front portion 2810a of a rigid-flex PCBA is used to connect a second pogo pin 3005 (not visible in this view).

Figure 32:
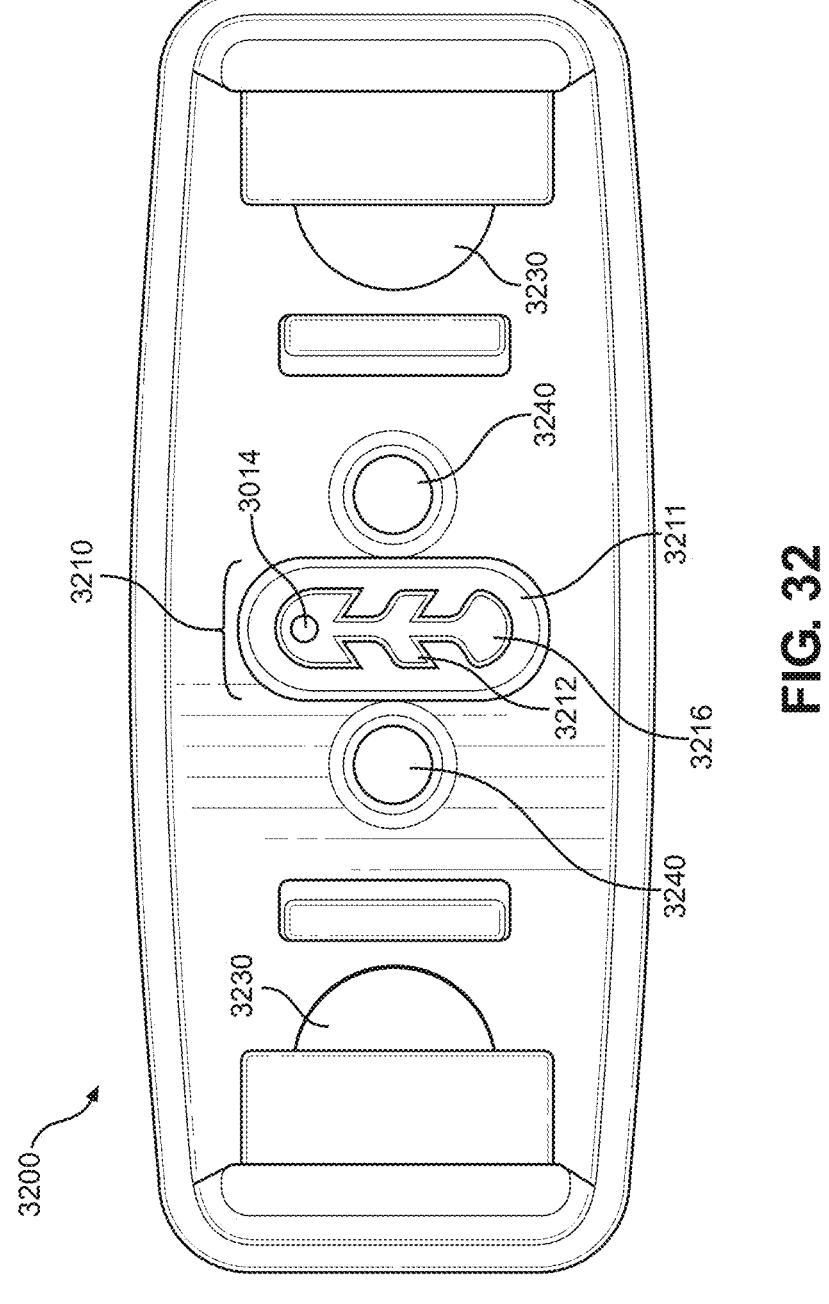
FIG. 32A is a plan view of an airway seal including an elongated liquid trap, in accordance with various example embodiments.
FIG. 32B is a perspective view of a capillary seal, in accordance with various example embodiments.

Referring next to FIG. 32A, an airway seal 3200 including an elongated liquid trap 3210 will be discussed in accordance with various example embodiments. The following discussion frequently references components illustrated in FIG. 31. In various example embodiments, airway seal 3200 is an example of airway seal 3170, shown in FIG. 31. The illustrated embodiment of airway seal 3200 includes openings 3230 to permit insertion of magnets 1815 (FIG. 31) into a cartridge engagement portion 2835 of a battery holder 2830 (FIG. 31) Airway seal 3200 also includes openings 3240 to allow pogo pins 3005 (FIG. 31) to pass through airway seal 3200, and to provide an airtight seal around the pogo pins.

In various example embodiments, airway seal 3200 further includes an elongated liquid trap 3210, which includes an elongated sealing section 3211 configured to press against a PCBA 2810A (FIG. 31) including an opening 3116 (FIG. 31) that provides an air path allowing a sensing portion of pressure sensor 3003 (FIG. 30) to sense pressure via negative pressure port 3014 (FIG. 31) extending through cartridge engagement portion 2835 (FIG. 31). In at least one example embodiment, the opening in the PCBA 2810A is aligned with lower portion 3216 of elongated liquid trap 3210, providing an offset negative pressure air path along the length of the elongated liquid trap 3210. In some example embodiments, elongated liquid trap 3210 includes baffles 3212 or capillary channels similar to those discussed subsequently with reference to FIG. 32B. Baffles 3212 may trap free liquid that enters the offset negative pressure air path formed by elongated liquid trap 3210 through negative pressure port 3014, and aid in preventing that liquid from reaching a diaphragm of pressure sensor 3003 (FIG. 30).

Figure 32B:
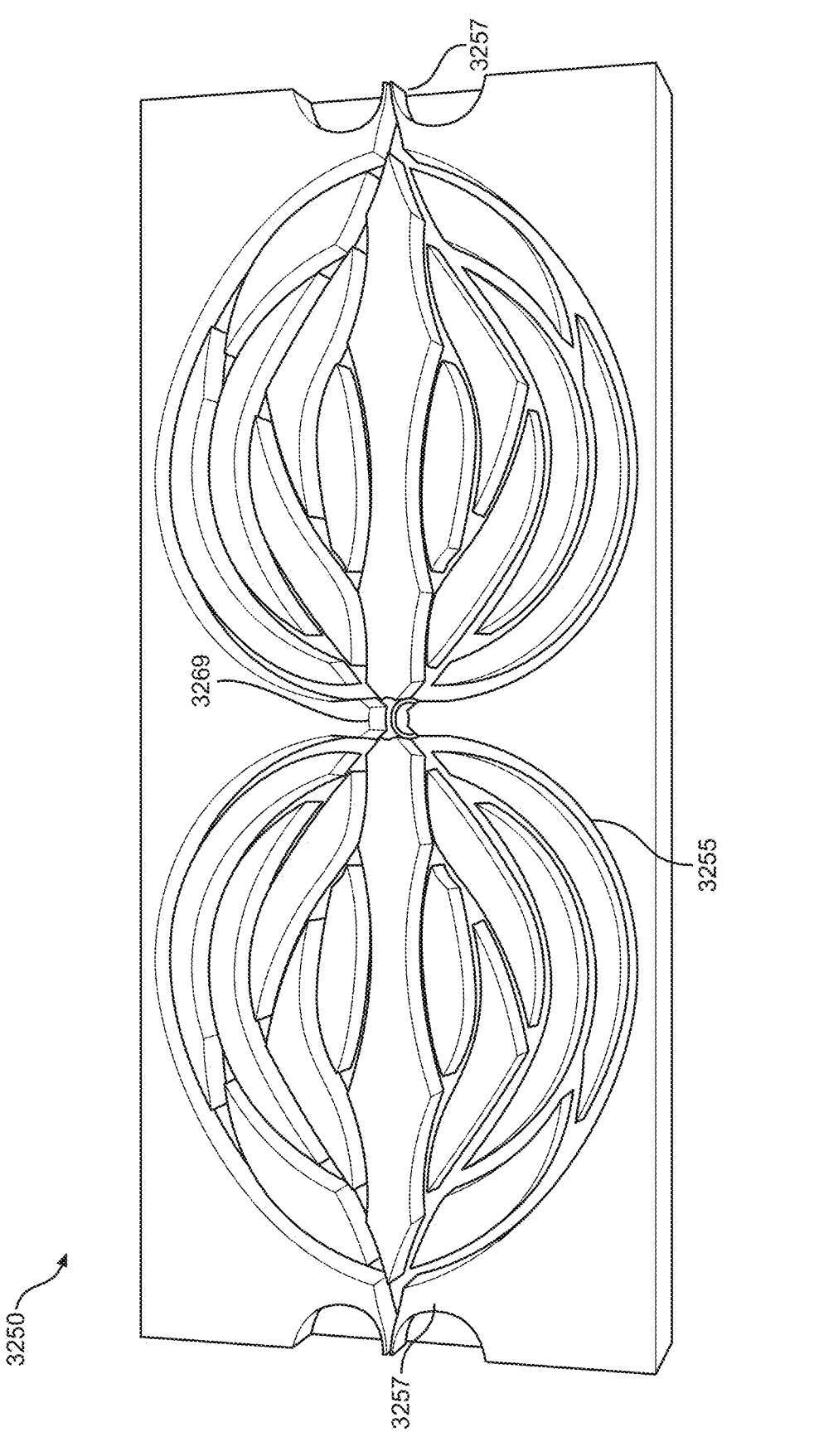

Referring next to FIG. 32B a capillary seal 3250 will be discussed in accordance with various example embodiments. In various example embodiments, capillary seal 3250 includes air inlet hole 3269, capillary channels 3255 and reed valves 3257. Note that the following discussion frequently references components illustrated in FIG. 31.

In some example embodiments, capillary seal 3250 may be an example embodiment of airway seal 3170. In alternate example embodiments, capillary seal 3250 may be used in addition to airway seal 3170, by inserting airway seal 3250 between airway seal 3170 and PCBA 2810A, so that air inlet hole 3269 forms part of a negative pressure air path allowing an air pressure present at negative pressure port 3014 to be sensed by pressure sensor 3003. In yet another example embodiment, the capillary channels 3255 and reed valves 3257 of capillary seal 3250 may be incorporated into airway seal 3170 or airway seal 3200.

In some example embodiments, battery holder 2830, and/or a housing in which battery holder 2830 is housed, may include exhaust ports (not illustrated) in fluid communication with reed valves 3257. In some such embodiments, the exhaust ports may allow fluid trapped in capillary channels 3255 to be expelled outside of an e-vaping device, or expelled into liquid traps within the e-vaping device. These liquid traps may include cavities and/or channels molded into various portions and or components of e-vaping device.

In an example embodiment, during operation of an e-vaping device including capillary seal 3250, a liquid pre-vapor formulation is heated to form an inhalable dispersion in a cavity underneath a heating assembly, but above cartridge-facing side 3150 of cartridge engagement portion 2835 and battery 2820. In some cases, a small amount of liquid pre-vapor formulation may reach negative pressure port 3014. If that happens, the liquid may attempt to flow through negative pressure port 3014 to reach pressure sensor 3003. In various example embodiments, capillary channels 3255 may substantially prevent such liquid from flowing through air inlet 3269 and reaching PCB 2113.

In various example embodiments, capillary channels 3255 may draw liquid out of the air flow pressure path. This may reduce and/or help prevent liquid coming into direct contact with pressure sensor 3003. In some example embodiments, by reducing the amount of "free" liquid in the airpath, pressure sensor 3003 remains unaffected. In various example embodiments, any liquid trapped in the capillary channels 3255 may be evacuated from capillary channels 3255 through reed valves 3257 by a burst of positive pressure provided by an adult e-vaping consumer blowing sharply into the e-vaping assembly.

In various example embodiments, capillary channels 3255 are balanced using surface tension characteristics of a pre-vapor formulation to create a "wicking" motion. In various example embodiments, any liquid pre-vapor formulation that happens to enter the air sensor path is pulled into the capillary channels 3255, away from seal opening 2119 and away from the air sensor path. As more liquid finds its way into the air path, capillary channels 3255 continue to pull in that liquid until capillary channels 3255 are full. At the point where capillary channels 3255 are full, any additional "free" liquid in the airway may begin to affect the function of the pressure sensor. To clear the liquid trapped in capillary channels 3255, an adult e-vaping consumer may blow into the e-vaping assembly, allowing one or more reed valves 3257 molded at exterior ends of the capillary channels 2105 to open, and drain the trapped liquid away from the sensor airway path.

In the illustrated example embodiment, capillary channels 3255 are arranged in a symmetrical pinched bulb pattern around air inlet 3269, with internal ends of the pinched bulbs meeting at air inlet 3269, and external ends of the pinched bulbs terminating in reed valves 3257. The wider, widest part of each pinched bulb is illustrated as being substantially midway between air inlet 3269 and reed valve 3257. Inside of the pinched bulbs, capillary channels 3255 form a tortuous path between air inlet 3269 and reed valves 3257. In some example embodiments, the width of capillary channels may be consistent throughout, wider near the center axis of the pinched bulbs and narrower farther from the center axis, narrower near the center axis of the pinched bulbs and wider farther from the center axis, wider closer to air inlet 3269 and progressively narrower towards reed valves 3257, or the like. In at least some example embodiments, there are no "dead end" paths within the capillary channels 3255. Capillary channel configurations and shapes other than those illustrated in the example embodiment shown in FIG. 32B may be used.

Figure 33:
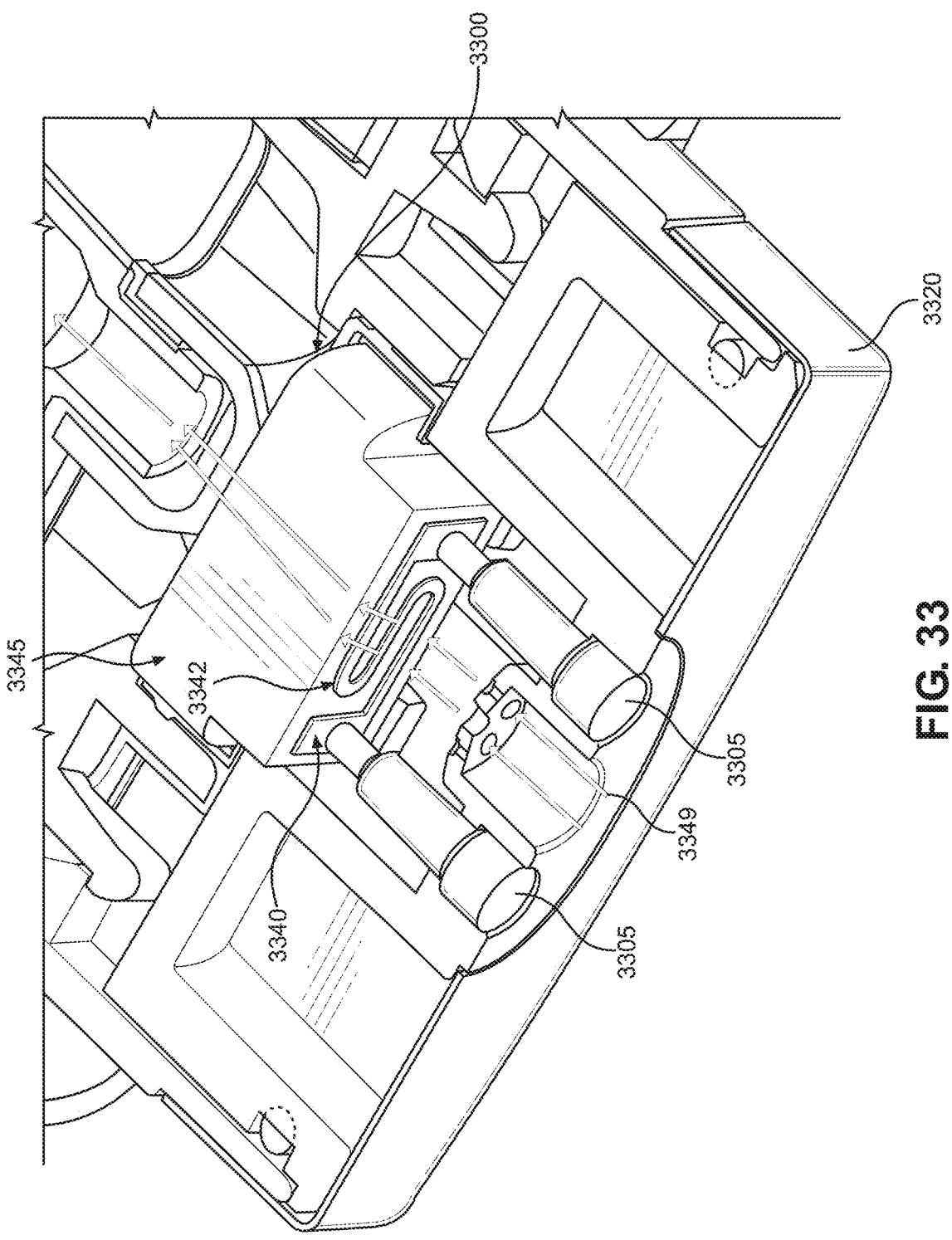
FIG. 33 is a perspective view of a leadless heating assembly, in accordance with various example embodiments.

Referring next to FIG. 33 a leadless heating assembly 3300 will be discussed in accordance with various example embodiments. Although the following example embodiments of leadless heating assembly 3300 focuses on a leadless heating assembly used in a removable e-vaping cartridge, in other example embodiments a leadless heating assembly may be used in a disposable e-vaping device. Other heating assemblies, such as heating assembly 1903, may have thin, wired leads that protrude from a face of the heating assembly. In example embodiments disclosed herein, protruding leads are eliminated from heating assembly 3300, thereby improving manufacturability, and increasing the robustness of the resulting heating assembly. In various example embodiments, a leadless heating assembly 3300 is used in conjunction with an external electrical contact configured to directly engage external power contacts formed on a surface of the heating assembly.

In various example embodiments, a, S-shaped heating element 3342 is formed and/or attached to a surface of ceramic body 3345 of heating assembly 3300. In at least one example embodiment, surface contacts 3340 integral to the heating element 3342 are formed as part of heating element 3342, and/or attached to the ceramic body 3345 of the heating assembly 3300. External contacts 3305 used in conjunction with a leadless heating element can include, but are not limited to POGO pins, which may be fixed in place in a heating assembly holder and use spring pressure to maintain direct contact with the surface contacts 3340 of the heating assembly, and/or cantilever flat spring steel contacts (not illustrated) included in the heating assembly holder 3320. In some example embodiments, power contacts may not be included in a heating assembly holder, nor anywhere in the removable e-vaping cartridge. Instead passages may be formed in the heating assembly holder that allow external electrical contacts, such as long-reach POGO pins included in a reusable e-vaping device, to extend through the passages make direct contact with surface contacts 3340 of the leadless heating assembly 3300. Airflow 3349 around leadless heating assembly 3300 is illustrated by the broken white arrows, and is the same as, or similar to, the airflow around other heating assemblies such as heating assembly 1903

Figure 34A:
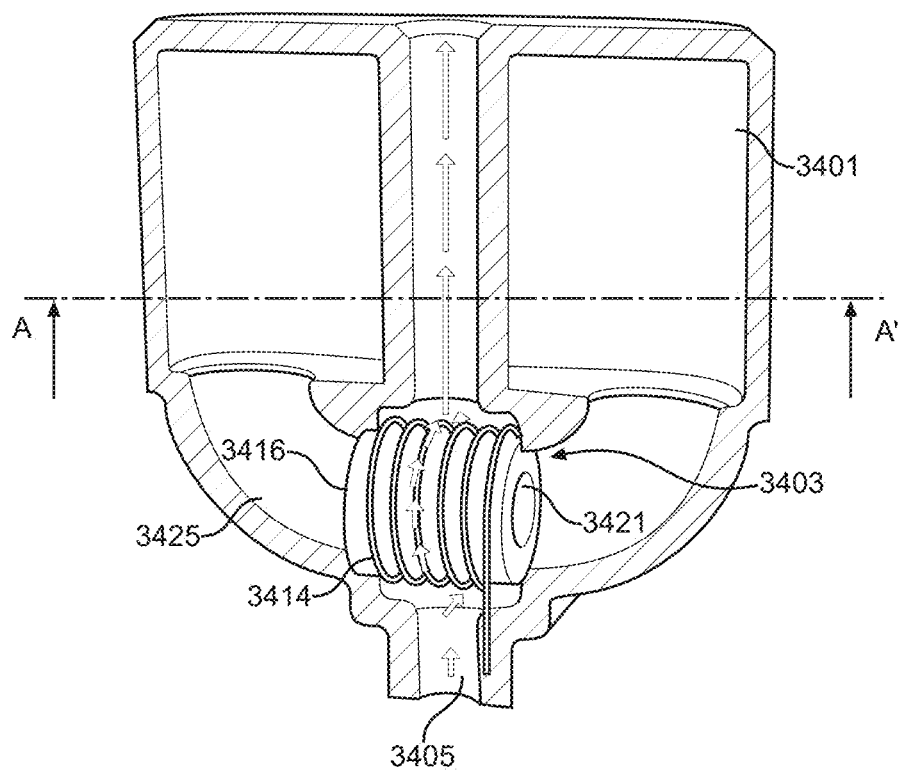
FIG. 34A is a diagram illustrating a cylindrical heating assembly, in accordance with various example embodiments.
Figure 34B:
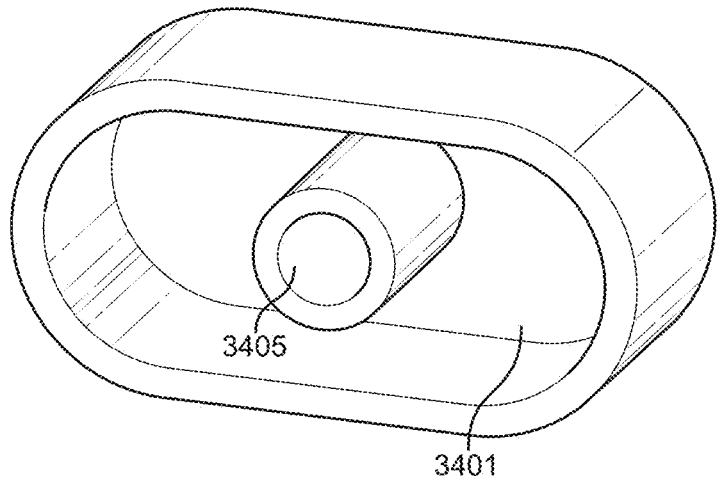
FIG. 34B is a cross section of cylindrical heating assembly along line A-A', in accordance with various example embodiments.

Referring next to FIGS. 34A and 34B a cylindrical heating assembly 3403 will be discussed in accordance with various example embodiments. In at least one example embodiment, a cylindrical ceramic heating assembly 3403 includes heating element 3414 comprising a nichrome wire wrapped around the exterior circumference of a cylindrical ceramic body 3416. In some example embodiments, cylindrical heating assembly 3403 may be placed at an intersection of airpath 3405 and fluid connection path 3425. The cylindrical shape allows pre-vapor formulation to flow freely through a tube 3421 defined by the inside diameter of the cylindrical ceramic body 3416, allowing for increased surface area for atomization. In various example embodiments, the nichrome wire may be connected to POGO pins or other power connectors via mechanical crimping, insulation displacement, or a resistance welding process.

In some example embodiments, the cylindrical heating element 3403 is suspended between two end points near a bottom of fluid connection path 3425. The nichrome wire/ heating element 3414 may be wound radially around the cylindrical ceramic body 3416. The two endpoints from which the cylindrical heating assembly is suspended may be placed in direct contact with external power connectors, in effect rendering the cylindrical heating assembly 3403 an example embodiment of a leadless heating assembly discussed in relationship to FIG. 33.

In various example embodiments, cylindrical heating assembly 3403 functions in a manner similar to other heating assembly embodiments disclosed herein, except for providing additional surface area to heat pre-vapor formulation absorbed by ceramic body 3416. Thus, cylindrical heating assembly 3403 is porous, and absorbs pre-vapor formulation stored in reservoir 340. In response to an adult consumer draw, a puff sensor (not illustrated) connects power to heating element 3414, which heats the absorbed pre-vapor formulation to form an inhalable dispersion. The inhalable dispersion is entrained in the air flowing past cylindrical heating assembly 3403, and proved to the adult consumer drawing on the e-vaping device.

Figure 35:
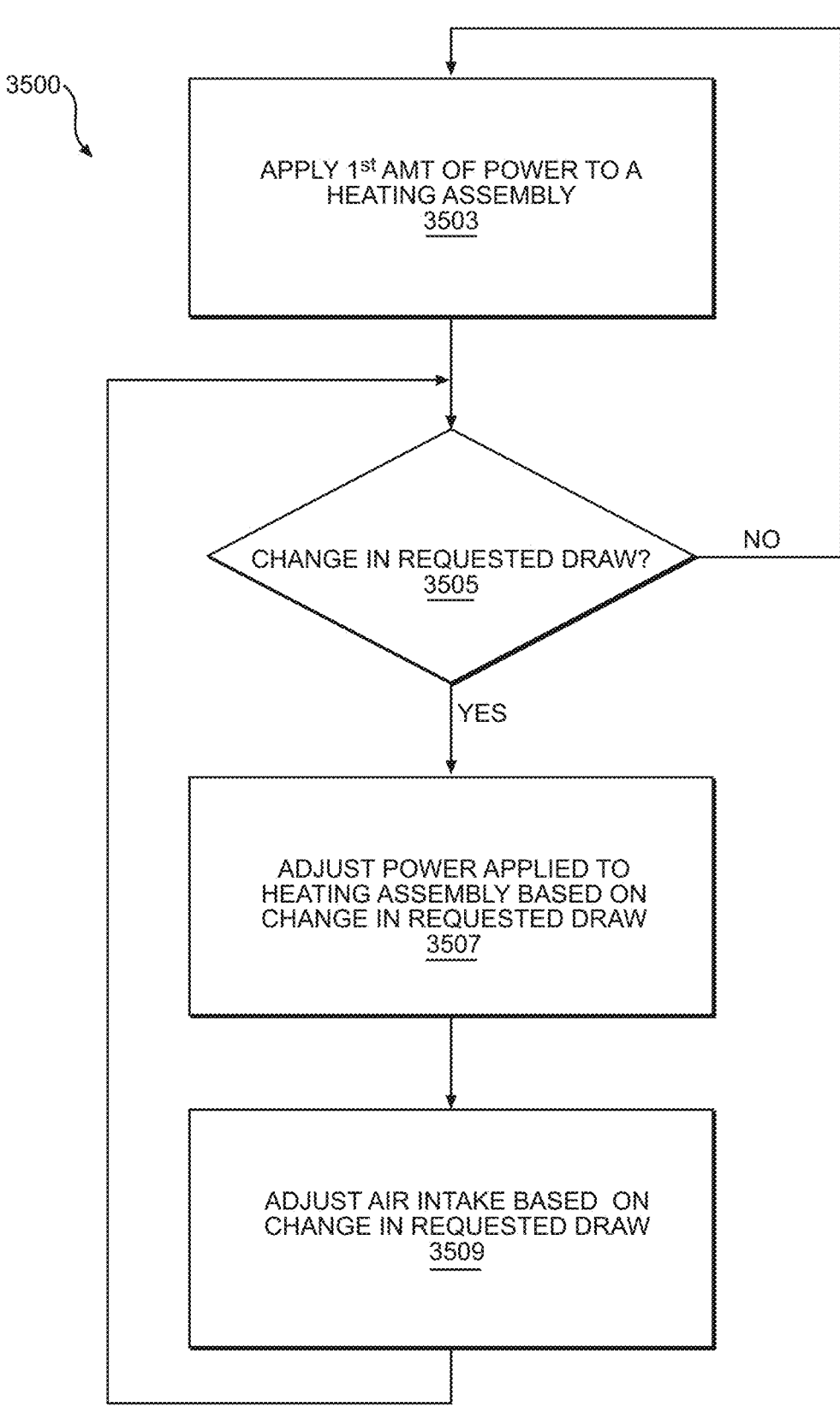
FIG. 35 is a flow diagram illustrating a method of varying air flow and power based on a requested draw, in accordance with various example embodiments.

Referring next to FIG. 35, a method 3500 of varying air flow and power based on a requested draw will be in accordance with various example embodiments. As illustrated by block 3503, a first amount of power is applied to a heating assembly of an e-vaping device. In one or more example embodiments, power is applied in response to detection of a draw by a puff detector for a duration of the draw, or until a maximum draw duration has been reached. As illustrated by block 3505, a check is made to determine if there is a change in a requested draw. In some example embodiments, a puff detector may be used to detect the occurrence of a puff, but may be insufficient to detect the amount of airflow generated by a draw. In some such example embodiments an airflow sensor can be used to determine the amount of airflow generated by a draw. The amount of airflow associated with a draw is sometimes referred to as a requested airflow, or a requested draw.

If it is determined at block 3505 that there is no change in requested draw, method 3500 returns to block 3503. As illustrated by block 3507 if it is determined at block 3505 that the requested draw has changed, the amount of power supplied to the heating assembly may be changed based on the change in the requested draw. In some example embodiments, the change in power supplied to the heating assembly may be adjusted by changing a pulse width modulation of the power supplied to a heating element of the heating assembly, adjusting a magnitude of the power supplied to the heating element, and/or changing the number of active heating elements included in the heating assembly.

As illustrated by block 3509, in response to a change in the requested draw an air intake may be adjusted to change the airflow in response to the change in the requested draw. In at least some example embodiments, the change in the amount of airflow is not linearly related to the requested change in the draw. In at least one example embodiment, the change in the amount of airflow may be controlled, or varied, using mechanical means, including but not limited to using an intake valve including a flexible membrane.

Figures 36A, 36B:
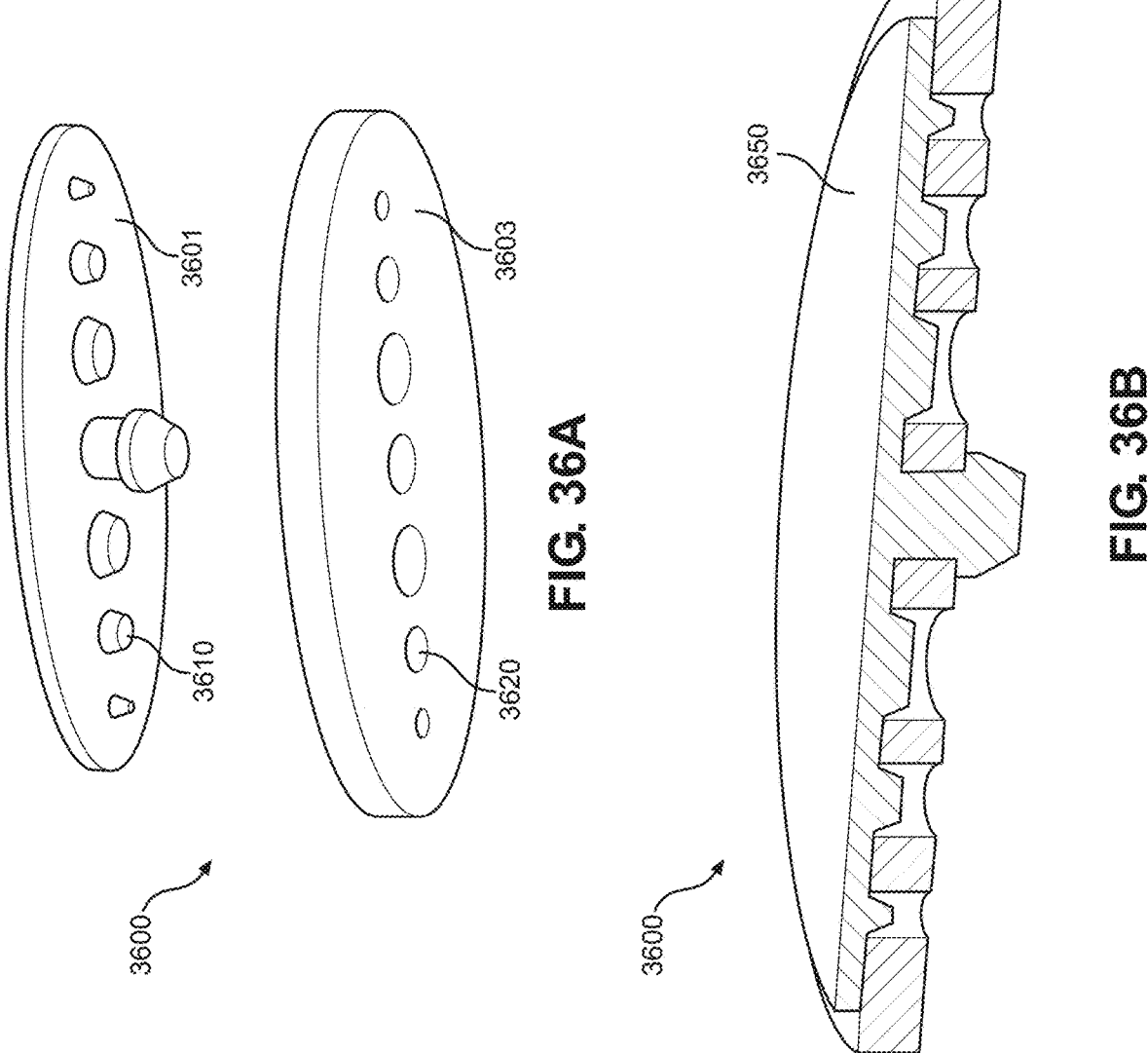
FIG. 36A is an exploded view of an intake port of an e-vaping device including a silicon valve and a rigid valve seat, in accordance with various example embodiments.
FIG. 36B is a perspective view of an assembled intake port of an e-vaping device, in accordance with various example embodiments.
Figures 36C, 36D:
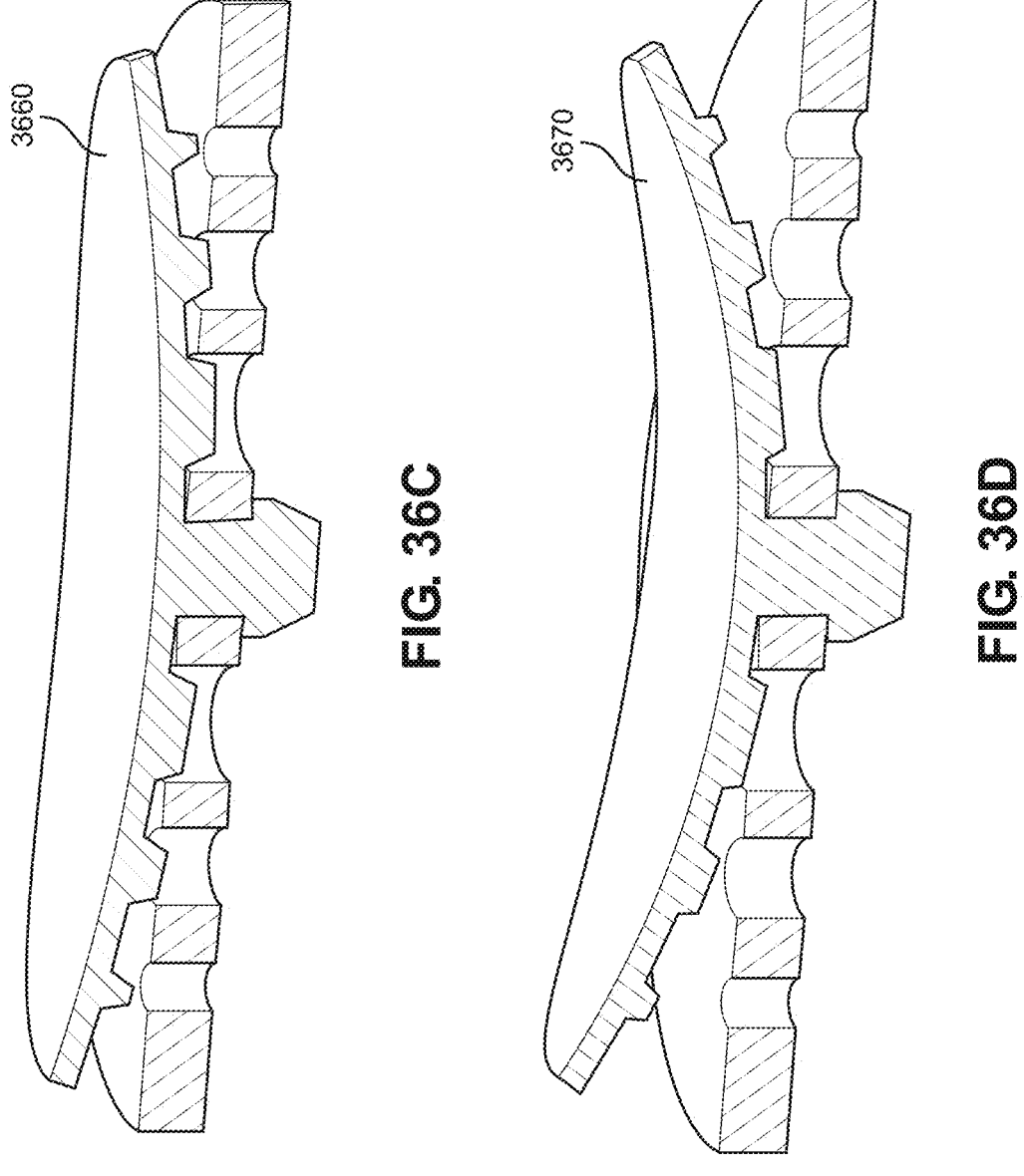
FIG. 36C is a perspective view of a slightly deformed intake port of an e-vaping device, in accordance with various example embodiments.
FIG. 36D is a perspective view of a more fully deformed intake port of an e-vaping device, in accordance with various example embodiments.

Referring next to FIGS. 36A-36D an intake port of an e-vaping device including a silicon valve and a rigid valve seat will be discussed in accordance with various example embodiments. In various example embodiments, intake port 3600 includes silicone valve 3601 includes nubs configured to engage with holes 3620 in a substantially rigid bottom portion 3603, which may be part of a cartridge bottom. FIG. 36B shows assembled intake port 3650 in a fully closed position. FIG. 36C shows assembled intake port 3660 in a slightly open position in response to a low draw. FIG. 36D shows assembled intake port 3670 in a more fully open position in response to a full draw.

Silicone valve 3601 may change its shape based on the adult consumers' requested airflow. As an adult consumer pulls harder on an e-vaping device (increased negative pressure), intake port 3600 deforms to allow increased airflow. In various example embodiments, intake port 3600 may be used in conjunction with an airflow sensor (not illustrated) to adjust the power output to an e-vaping heating assembly. In some example embodiments, using intake port 3600 to control air flow in conjunction with controlling the amount of power supplied to a heating assembly creates a cohesive system that may adjust parameters to give adult consumers a cig-a-like experience. In at least one example embodiment, when an adult consumer pulls/draws harder on the e-vaping device, both the airflow and the TPM increase to create a high-fidelity experience.

In some example embodiments, by adjusting the power output in conjunction with the intake size, it is possible to create an analog experience for the adult consumer. The intake size, as illustrated by FIGS. 36A-36D, may be varied by exposing more holes 3620 by deforming silicone valve 3601. In various example embodiments, the variable intake includes a silicone membrane that is designed to deform at a set negative pressure to allow for an increase in flowrate during deformation. In various example embodiments a flow meter is used to account for the change in airflow, but addition of the flowmeter may permit removal of the pressure sensor from the e-vaping device.

Figure 37:
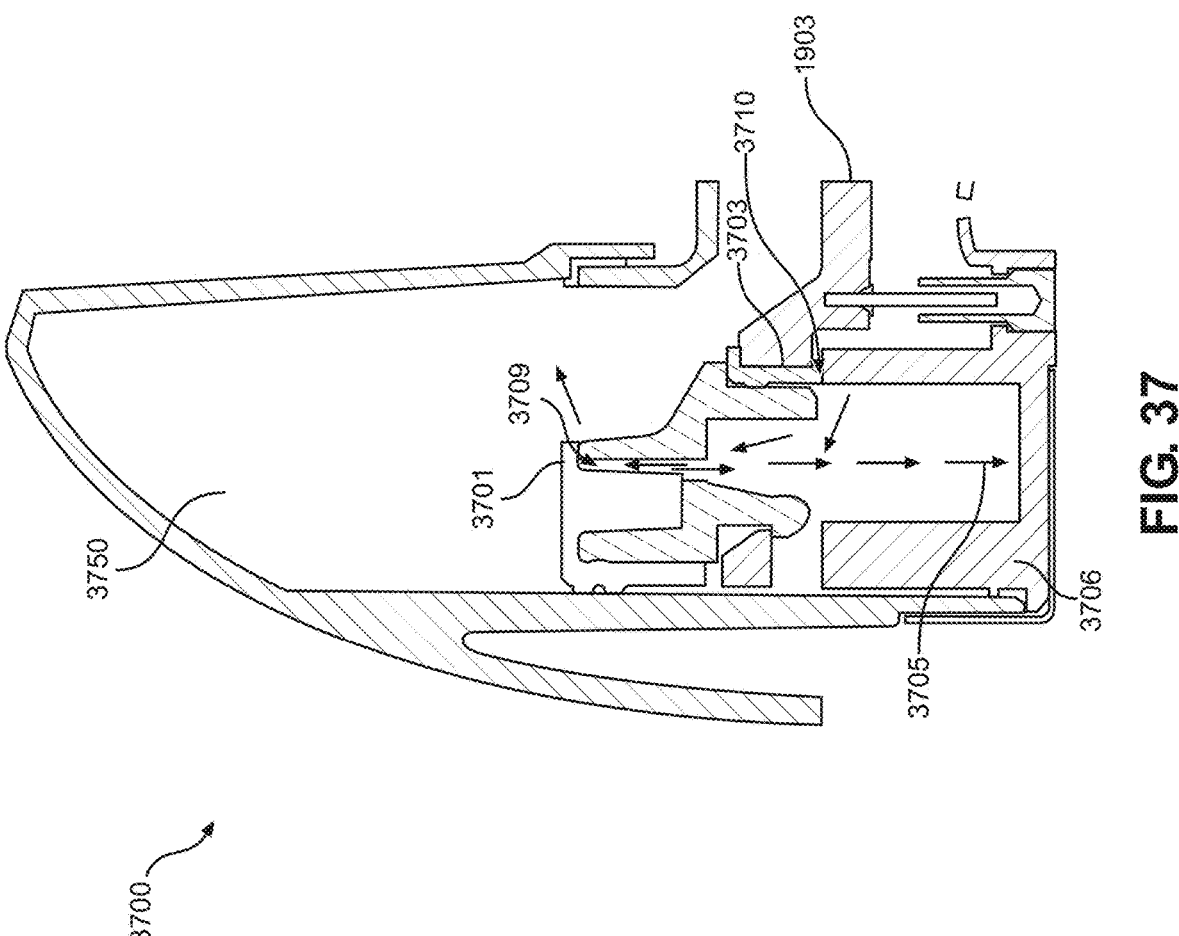
FIG. 37 is a diagram illustrating a liquid trap and tank seal, in accordance with various example embodiments.

Referring next to FIG. 37 a liquid trap 3705 and tank seal 3701 will be discussed in accordance with various example embodiments. Cartridge 3700 includes liquid traps 3705 formed in a bottom cover 3706 of cartridge 3700, and having an opening 3709 at the top covered by tank seal 3701. In some example embodiments, a side opening 3710 of liquid trap 3705 is sealed by a heating assembly seal 3703. Other openings (not illustrated) are open to atmospheric pressure. In the illustrated example embodiment, tank seal 3701 includes a flap that extends over opening 3709, and acts as a check valve. In some example embodiments, when the pressure in tank 3750 drops, for example due to consumption of a pre-vapor formulation stored in tank 3750, the pressure differential between tank 3750 and liquid trap 3705 causes the flap on tank seal 3701 to open, allowing air to flow from liquid trap 3705 into tank 3750.

In some example embodiments, an absorbent may be included in liquid trap 3705 to suspend any leakage in a confined space away from the inhalation air stream. In at least some example embodiments, a current cartridge reservoir pressure equalization circuit is moved from the air channels in the heating assembly seal to an alternate location found in the atomizer cover and tank seal interface. By moving the air path out of the heater assembly/heater assembly seal interface, large negative space cavities in a heating assembly holder to act as liquid traps.

By moving the air path away from the atomizer seal, the geometry of the seal is reduced, allowing for a better seal to the atomizer. Various example embodiments include multiple "check valves" or other similar geometry. Check valves allow burping of the reservoir to equalize the pressure. In some example embodiments, geometries can be made in plastic, or the thicker wall silicone of the tank seal, which are comparatively more dimensionally stable. Furthermore, in at least some example embodiments, current negative space cavities in the heating assembly holder can be inverted and used to as liquid traps containing liquid away from the air stream. In some example embodiments, the liquid traps are a redundancy to be used in the event liquid made it through the "check valve."

Referring next to FIG. 38, a section view illustrating liquid traps and a tank seal will be discussed in accordance with various example embodiments. As illustrated in FIG. 38, tank seal 3801 covers a top opening of liquid trap 3803 formed in bottom cover 3806 of e-vaping cartridge 3800, and acts as a check valve to allow air to flow into tank 3850, while any liquid that may escape through the check valve will flow into liquid trap 3803.

Figure 39:
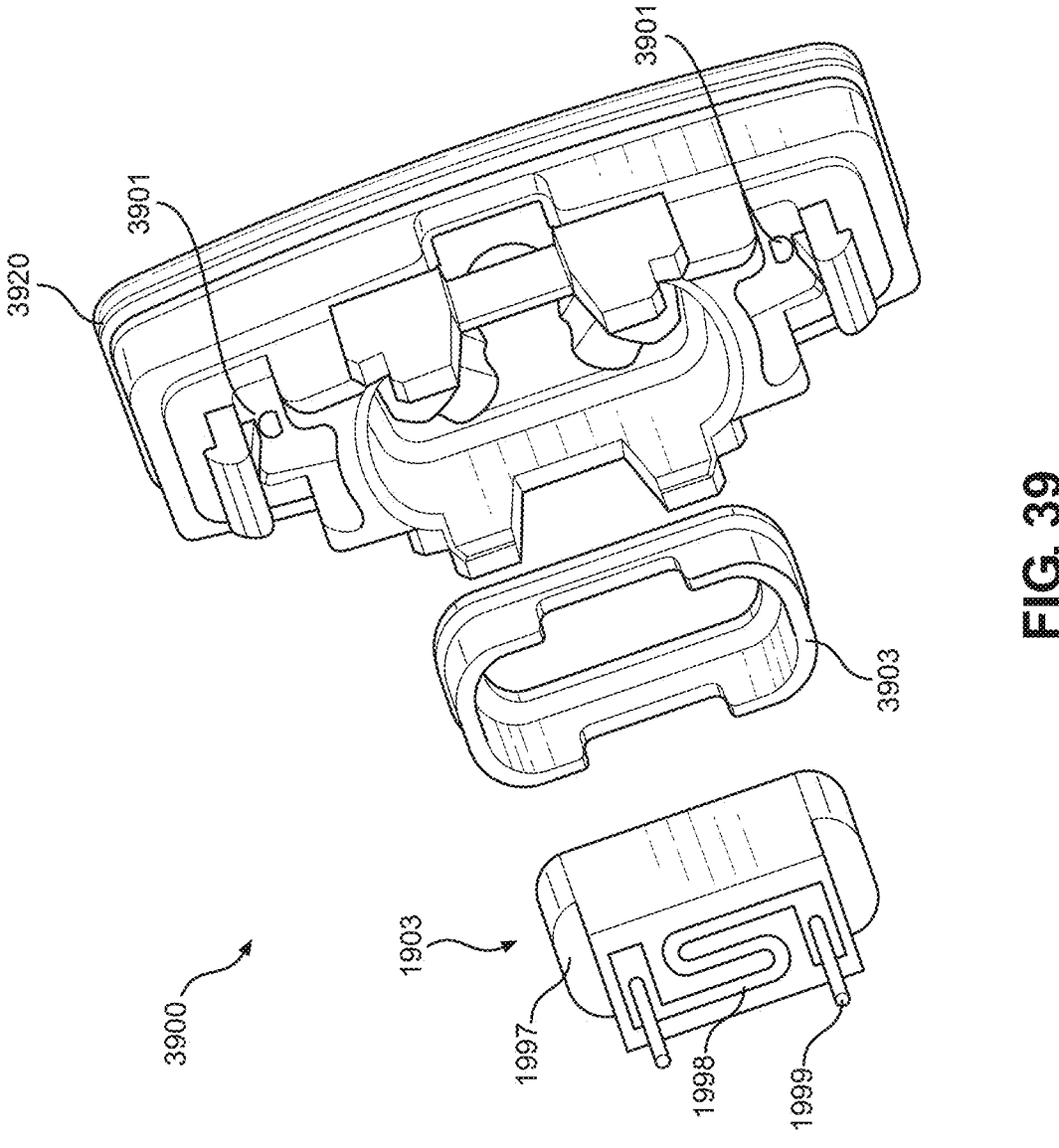
FIG. 39 is an exploded view of a heating assembly, heating assembly seal, and heating assembly holder, in accordance with various example embodiments.

Referring next to FIG. 39, a heating assembly, heating assembly seal, and heating assembly holder will be discussed in accordance with various example embodiments. In various example embodiments, assembly 3900 may be used in conjunction with the example embodiments of FIGS. 37-38. In the illustrated example embodiment, assembly 3900 includes heating assembly 3910, heating assembly seal 3903 and heating assembly holder 3920. In various example embodiments, heating assembly 1903 includes a porous ceramic body 1997, an s-shaped heating conductive element 1998 inlaid in, or otherwise formed on or attached to a side of the porous ceramic body 1997, and heater posts 1999 protruding from, and extending within porous ceramic body 1997.

In at least some example embodiments, airway holes 3901 are formed in heating assembly holder 3920 to provide openings at the top the liquid traps when heating assembly holder 3920 is mated with the bottom cover in which the liquid traps are formed.

Figure 40:
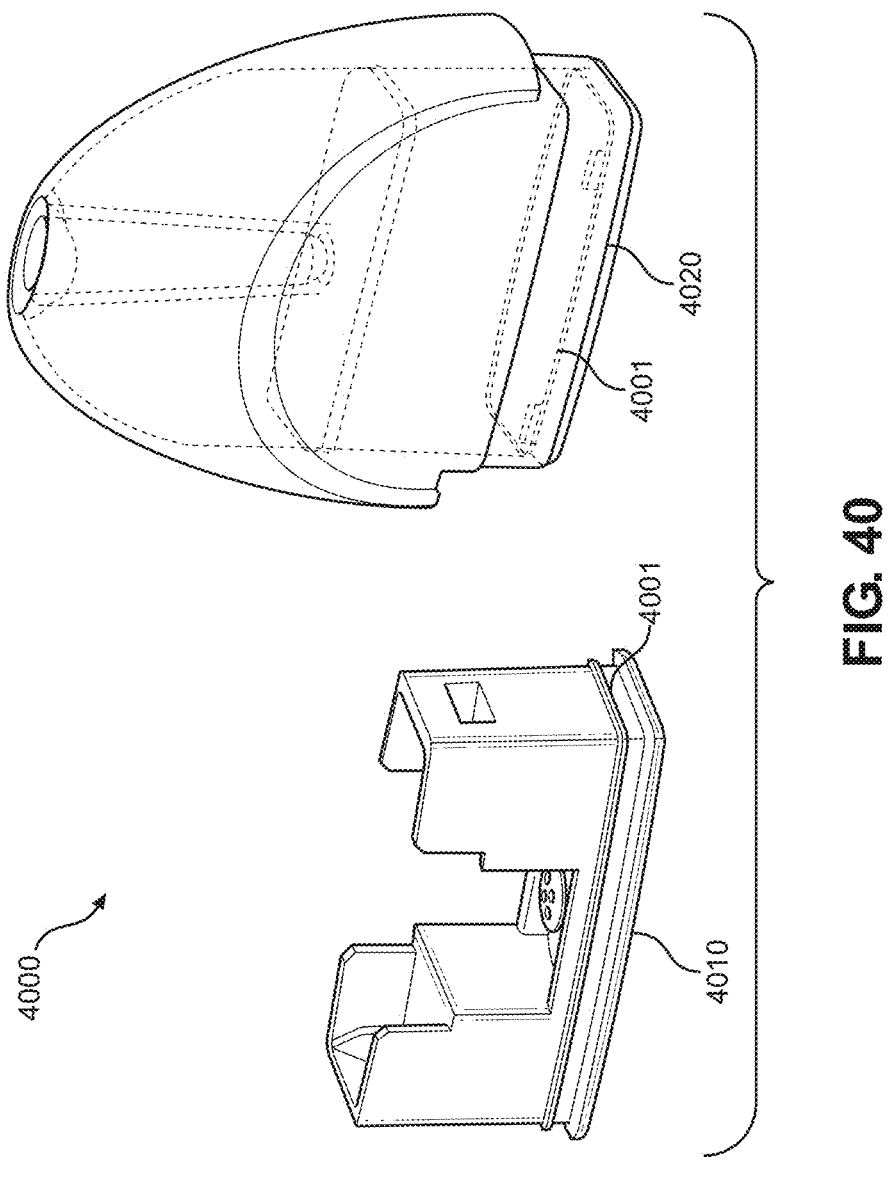
FIG. 40 is a perspective exploded view of a liquid trap assembly including a crush rib and a heating assembly cover, in accordance with various example embodiments.

Referring next to FIG. 40 a perspective exploded view of a liquid trap assembly including a crush rib and a heating assembly cover will be discussed in accordance with various example embodiments. In at least some example embodiments a bottom cover of a reusable cartridge includes a molded crush rib, which deforms to hold bottom cover 4010 in mating engagement with cover 4020.

In various example embodiments, the e-vaping device may include the features set forth in U.S. Pat. No. 10,064,432, issued Sep. 4, 2018, the entire contents of which is incorporated herein by reference. Various examples embodiments and their corresponding features may likewise be applied to e-vaping devices disclosed in U.S. Pat. No. 10,064,432.

It should be understood that the shape of the battery (or batteries) for the power supply may vary. For example, the battery may be cylindrical, prismatic, disc-shaped, a pouch battery, or any other variation of battery shape known in the art. Additionally, it should be understood that the battery may be any of a variety of types. For example, in one embodiment, the battery may be a rechargeable battery (e.g., lithium-ion). In another embodiment, the battery may be a non-rechargeable battery (e.g., alkaline). In yet another embodiment, the battery may include silver oxide, carbon zinc, cadmium, nickel, or any another material known in the art. Furthermore, the battery may include a primary cell and/or a secondary cell. It will be understood by those of ordinary skill in the art that various changes in form and details of the battery may be made without departing from the spirit and the scope of the invention.

As used herein, a pre-vapor formulation refers to, in various embodiments, a substance (e.g., liquid, wax, gel) that may be transformed into a vapor. For example, the pre-vapor formulation may include, but is not limited to, water, solvents, active ingredients, ethanol, plant extracts, natural or artificial flavors, and/or vapor formers such as glycerin and propylene glycol.

It will be understood that plant extracts may include active ingredients as well as their supporting counterparts (e.g., compounds which assist in the absorption of an active ingredient). Active ingredients may include, but are not limited to, nicotine (tobacco derived nicotine, synthetic nicotine, etc.), caffeine, and/or any number of plant extracts including extracts of medicinal plants. Tobacco derived nicotine may be derived from any member of the genus *Nicotiana*, including one or more species of tobacco plants, such as *Nicotiana rustica* and *Nicotiana tabacum*, and may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The extract of a medicinal plant may be a naturally occurring constituent or extract of a medicinal plant that has a medically accepted physiological effect (e.g., therapeutic effect, prophylactic effect). For instance, the medicinal plant may be a *cannabis* plant or a cannabimimetic plant (i.e., a plant with similar pharmacological effects to those of *cannabis*). For a *cannabis* plant, the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). For a cannabimimetic plant, the compound may be a cannabimimetic agent. Cannabimimetic agents interact with receptors in the body to produce similar pharmacological effects as cannabinoids.

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD).

In some example embodiments, in addition to active ingredients, the pre-vapor formulation may include flavorants from natural and/or artificial sources, such as plant extracts (e.g., tobacco extract, *cannabis* extract, cannabimimetic extract), menthol, mint, and/or vanilla.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

While the term "same" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

The controller may include processing circuitry such as hardware including logic circuits; a hardware/software combination such as a processor executing software stored in a memory; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

53

54

What is claimed is:

1. An e-vaping device, comprising:

a memory;

wireless communications circuitry; and processing circuitry coupled to the wireless communications circuitry and the memory, the processing circuitry configured to receive authorization information via the wireless communications circuitry from a computing device, the authorization information including an approved list of one or more cartridge identifiers associated with one or more authorized removable cartridges, store the authorization information in the memory, obtain a cartridge identifier directly from a docked removable cartridge, determine whether the cartridge identifier obtained from the docked removable cartridge is included in the approved list stored in the memory, and conditionally activate the docked removable cartridge based on whether the cartridge identifier obtained from the docked removable cartridge is included in the approved list.

2. The e-vaping device of claim 1, wherein the authorization information further includes an authorization time limit associated with the one or more authorized removable cartridges, and the processing circuitry is further configured to, delete or mark the authorization information as stale upon expiration of the authorization time limit.

3. The e-vaping device of claim 2, wherein the processing circuitry is further configured to:

obtain an onboard cartridge identifier of the docked removable cartridge from the docked removable cartridge; and permit power to be delivered to the docked removable cartridge in response to determining that the cartridge identifier of the docked removable cartridge obtained from the docked removable cartridge is included in the approved list; and prevent power from being delivered to the docked removable cartridge in response to determining that the cartridge identifier of the docked removable cartridge obtained from the docked removable cartridge is not included in the approved list.

4. The e-vaping device of claim 2, wherein the processing circuitry is further configured to:

obtain updated authorization information via the wireless communications circuitry in response to determining that the cartridge identifier of the docked removable cartridge is not included in the approved list; and conditionally permit power to be delivered to the docked removable cartridge based on the updated authorization information.

5. The e-vaping device of claim 2, wherein the processing circuitry is further configured to:

receive the authorization information, via the wireless communications circuitry and from an adult consumer mobile device connected to a server device hosting an account associated with an authenticated adult consumer of the e-vaping device.

6. The e-vaping device of claim 1, wherein the processing circuitry is further configured to:

receive the authorization information via a personal area network established between the wireless communications circuitry and the computing device.

7. The e-vaping device of claim 1, wherein the processing circuitry is further configured to:

control a feedback element, the feedback element providing at least one of a tactile, auditory, or visual indication indicating an activation status of the docked removable cartridge, wherein the activation status indicates whether the cartridge identifier obtained from the docked removable cartridge is included in the approved list.

8. The e-vaping device of claim 1, wherein the processing circuitry is further configured to:

determine whether to activate the docked removable cartridge in response to each docking event by, obtaining the cartridge identifier from the docked removable cartridge upon detecting the docking event; and determining whether the cartridge identifier obtained from the docked removable cartridge is included in the approved list stored in the memory.

9. The e-vaping device of claim 1, wherein the processing circuitry is further configured to:

obtain, via a removable cartridge identification interface, an onboard the cartridge identifier of the docked removable cartridge directly from the docked removable cartridge.

10. The e-vaping device of claim 9, wherein the removable cartridge identification interface includes:

at least one of a radio frequency identification (RFID) chip reader configured to wirelessly read the cartridge identifier from an RFID chip in the docked removable cartridge, a near-field communication (NFC) chip reader configured to wirelessly read the cartridge identifier from an NFC chip in the docked removable cartridge, or a contact reader configured to read the cartridge identifier from a memory in the docked removable cartridge via physical contact.

* * * * *